United States Patent
Ichikawa et al.

(10) Patent No.: US 10,138,593 B2
(45) Date of Patent: Nov. 27, 2018

(54) SIZING AGENT-COATED CARBON FIBERS, PROCESS FOR PRODUCING SIZING AGENT-COATED CARBON FIBERS, PREPREG, AND CARBON FIBER REINFORCED COMPOSITE MATERIAL

(71) Applicant: TORAY INDUSTRIES, INC., Tokyo (JP)

(72) Inventors: Tomoko Ichikawa, Ehime (JP); Makoto Endo, Ehime (JP); Hiroshi Taiko, Ehime (JP); Masanobu Kobayashi, Ehime (JP); Nobuyuki Arai, Ehime (JP); Jun Misumi, Ehime (JP)

(73) Assignee: Toray Industries, Inc., Tokyo (JP)

( * ) Notice: Subject to any disclaimer, the term of this patent is extended or adjusted under 35 U.S.C. 154(b) by 545 days.

(21) Appl. No.: 14/369,136

(22) PCT Filed: Dec. 18, 2012

(86) PCT No.: PCT/JP2012/082823
§ 371 (c)(1),
(2) Date: Jun. 26, 2014

(87) PCT Pub. No.: WO2013/099707
PCT Pub. Date: Jul. 4, 2013

(65) Prior Publication Data
US 2014/0329075 A1 Nov. 6, 2014

(30) Foreign Application Priority Data

Dec. 27, 2011 (JP) .................. 2011-285052
Jul. 27, 2012 (JP) .................. 2012-166594
Sep. 14, 2012 (JP) .................. 2012-203377

(51) Int. Cl.
| | | |
|---|---|---|
| *D06M 13/11* | (2006.01) | |
| *D01F 11/14* | (2006.01) | |
| *C08J 5/24* | (2006.01) | |
| *C08J 5/06* | (2006.01) | |
| *D06M 15/55* | (2006.01) | |
| *D06M 101/40* | (2006.01) | |

(52) U.S. Cl.
CPC .............. *D06M 15/55* (2013.01); *C08J 5/06* (2013.01); *C08J 5/24* (2013.01); *D01F 11/14* (2013.01); *D06M 13/11* (2013.01); *C08J 2363/00* (2013.01); *D06M 2101/40* (2013.01); *Y10T 428/249944* (2015.04); *Y10T 428/2918* (2015.01)

(58) Field of Classification Search
CPC .................. C08J 5/042; C08J 5/06; C08J 5/24
See application file for complete search history.

(56) References Cited

U.S. PATENT DOCUMENTS

| | | |
|---|---|---|
| 3,957,716 A | 5/1976 | Weldy |
| 4,555,446 A | 11/1985 | Sumida et al. |
| 5,462,799 A | 10/1995 | Kobayashi et al. |
| 5,587,240 A | 12/1996 | Kobayashi et al. |
| 5,589,055 A | 12/1996 | Kobayashi et al. |
| 5,691,055 A | 11/1997 | Kobayashi et al. |
| 9,435,057 B2* | 9/2016 | Watanabe .............. D06M 13/11 |
| 2004/0191511 A1* | 9/2004 | Sugiura .................. D06M 7/00 428/357 |
| 2006/0154039 A1* | 7/2006 | Suzuki ............... C08G 59/1461 428/292.1 |
| 2008/0166511 A1 | 7/2008 | Honma et al. |
| 2010/0159243 A1* | 6/2010 | Inoue .................... C03C 25/285 428/378 |
| 2012/0058325 A1 | 3/2012 | Honma et al. |
| 2015/0184333 A1* | 7/2015 | Arai ....................... C08G 59/38 428/327 |
| 2015/0210813 A1* | 7/2015 | Arai ........................ C08J 5/24 428/298.7 |

(Continued)

FOREIGN PATENT DOCUMENTS

| | | |
|---|---|---|
| CN | 1946780 A | 4/2007 |
| EP | 0 436 377 A2 | 7/1991 |
| EP | 0 640 702 A1 | 3/1995 |

(Continued)

OTHER PUBLICATIONS

Mitsubishi Chemical, JER Resin, http://www.m-kagaku.co.jp/english/products/business/function/specialty2/details/1194653_3409.html, accessed Feb. 22, 2017.*

International Search Report issued in PCT/JP2012/082823, dated Jan. 22, 2013.

Written Opinion of the International Searching Authority issued in PCT/JP2012/082823, dated Jan. 22, 2013.

European Office Action dated Apr. 21, 2016, for European Application No. 12863928.3.

Extended European Search Report, dated Aug. 31, 2015, for European Application No. 12863928.3.

(Continued)

*Primary Examiner* — Jennifer A Steele

(74) *Attorney, Agent, or Firm* — Birch, Stewart, Kolasch & Birch, LLP

(57) ABSTRACT

Sizing agent-coated carbon fibers includes: a sizing agent including an aliphatic epoxy compound (A) and at least containing an aromatic epoxy compound (B1) as an aromatic compound (B); and carbon fibers coated with the sizing agent, wherein the sizing agent-coated carbon fibers have an (a)/(b) ratio of 0.50 to 0.90 where (a) is a height (cps) of a component at a binding energy (284.6 eV) assigned to CHx, C—C, and C═C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°.

15 Claims, No Drawings

(56) References Cited

U.S. PATENT DOCUMENTS

| | | | |
|---|---|---|---|
| 2015/0247025 A1* | 9/2015 | Ichikawa | C09C 3/08 |
| | | | 428/220 |
| 2015/0252184 A1* | 9/2015 | Arai | C08J 5/24 |
| | | | 523/434 |

FOREIGN PATENT DOCUMENTS

| | | |
|---|---|---|
| JP | 57-128266 A | 8/1982 |
| JP | 57-171767 A | 10/1982 |
| JP | 58-41973 A | 3/1983 |
| JP | 59-71479 A | 4/1984 |
| JP | 61-28074 A | 2/1986 |
| JP | 62-33872 A | 2/1987 |
| JP | 63-14114 B2 | 3/1988 |
| JP | 1-272867 A | 10/1989 |
| JP | 2-307979 A | 12/1990 |
| JP | 4-361619 A | 12/1992 |
| JP | 7-9444 A | 1/1995 |
| JP | 7-279040 A | 10/1995 |
| JP | 8-113876 A | 5/1996 |
| JP | 2000-336577 A | 12/2000 |
| JP | 2002-146679 A | 5/2002 |
| JP | 2002-173873 A | 6/2002 |
| JP | 2002-220785 A | 8/2002 |
| JP | 2002-309487 A | 10/2002 |
| JP | 2005-179826 A | 7/2005 |
| JP | 2005-179828 A | 7/2005 |
| JP | 2005-213687 A | 8/2005 |
| JP | 2005-256226 A | 9/2005 |
| JP | 2008-280624 A | 11/2008 |
| KR | 10-2005-0096966 A | 10/2005 |
| WO | WO 03/010383 A1 | 2/2003 |
| WO | WO 2005/082982 A1 | 9/2005 |

OTHER PUBLICATIONS

European Office Action dated May 9, 2017 for Application No. 12863928.3.

Korean Notification of Reason for Refusal, dated Dec. 19, 2017, for Korean Application No. 10-2014-7017543, along with a Machine translation.

* cited by examiner

SIZING AGENT-COATED CARBON FIBERS, PROCESS FOR PRODUCING SIZING AGENT-COATED CARBON FIBERS, PREPREG, AND CARBON FIBER REINFORCED COMPOSITE MATERIAL

FIELD

The present invention relates to sizing agent-coated carbon fibers suitably used for aircraft members, spacecraft members, automobile members, ship members, sporting goods such as golf shafts and fishing rods, and other general industrial applications and also relates to a process for producing the sizing agent-coated carbon fibers, a prepreg, and a carbon fiber reinforced composite material. More specifically, the present invention relates to sizing agent-coated carbon fibers that have excellent mechanical properties in tough environments such as a low temperature environment, have excellent adhesion between the carbon, fibers and a matrix resin that is an epoxy resin suitable for a structural material, and can suppress the reduction in physical properties during a long-term storage. The present invention also relates to a process for producing the sizing agent-coated carbon fibers, a prepreg, and a carbon fiber reinforced composite material.

BACKGROUND

Carbon fibers are lightweight and excellent in strength and elastic modulus, and thus are combined with various matrix resins to form composite materials, which are used in various fields including aircraft members, spacecraft members, automobile members, ship members, constructional materials, and sporting goods. In order to impart excellent characteristics of carbon fibers to a composite material including the carbon fibers, excellent adhesion between the carbon fibers and a matrix resin is important.

In order to improve the adhesion between carbon fibers and a matrix resin, the carbon fibers are typically subjected to oxidation such as gas phase oxidation and liquid phase oxidation, and thus oxygen-containing functional groups are introduced to the surface of the carbon fibers. For example, a disclosed method includes subjecting carbon fibers to electrolysis to improve interlaminar shear strength as an index of the adhesion (see Patent Literature 1). However, as a composite material has been required to have higher characteristics in recent years, the adhesion achieved by such an oxidation alone is becoming insufficient.

Carbon fibers are brittle and poor in bindability and abrasion resistance and thus readily generate fluffs or broken threads in a high-order processing step. To address this issue, methods of coating carbon fibers have been disclosed (see Patent Literatures 2 and 3).

For example, a disclosed sizing agent is an aliphatic compound having a plurality of epoxy groups (see Patent Literatures 4, 5, and 6). Separately, a disclosed method includes applying, as a sizing agent, an epoxy adduct of polyalkylene glycol onto carbon fibers (see Patent Literatures 7, 8, and 9).

Another disclosed method includes applying, as an aromatic sizing agent, a diglycidyl ether of bisphenol A onto carbon fibers (see Patent Literatures 2 and 3). Another disclosed method includes applying, as a sizing agent, a polyalkylene oxide adduct of bisphenol A onto carbon fibers (see Patent Literatures 10 and 11). Another disclosed method includes applying, onto carbon fibers, a sizing agent that is obtained by adding an epoxy group to a polyalkylene oxide adduct of bisphenol A (see Patent Literatures 12 and 13).

Although the sizing agents above can impart adhesiveness and bindability to carbon fibers, a sizing agent including one epoxy compound is insufficient, and thus, in recent years, a technique of using two or more epoxy compounds in combination has been developed depending on an intended function.

For example, a disclosed sizing agent includes two or more epoxy compounds each having a defined surface free energy (see Patent Literatures 14 to 17). Patent Literature 14 discloses a combination of an aliphatic epoxy compound and an aromatic epoxy compound. Patent Literature 14 describes that a sizing agent present in the outer layer in a large amount has an effect of shielding another sizing agent present in the inner layer in a large amount from air, and this prevents the epoxy group form undergoing ring-opening by water in air. Patent Literature 14 also describes that the sizing agent preferably contains the aliphatic epoxy compound and the aromatic epoxy compound in a ratio of 10/90 to 40/60, and the aromatic epoxy compound is preferably contained in a larger amount.

Patent Literatures 16 and 17 disclose a sizing agent including two or more epoxy compounds having different surface free energies. Patent Literatures 16 and 17 mainly aim to improve permeability of a matrix resin by the sizing agent including two or more epoxy compounds having different surface free energies, but do not limit the combination of two or more epoxy compounds to the combination of an aromatic epoxy compound and an aliphatic epoxy compound, and describe no typical example of the aliphatic epoxy compound selected in view of adhesion.

Another disclosed sizing agent contains a bisphenol A epoxy compound and an aliphatic polyepoxy resin in a mass ratio of 50/50 to 90/10 (see Patent Literature 18). However, the sizing agent disclosed in Patent Literature 18 also contains the bisphenol A epoxy compound as an aromatic epoxy compound in a large amount.

A disclosed sizing agent specifying the combination of an aromatic epoxy compound and an aliphatic epoxy compound is a combination of a multifunctional aliphatic compound on the surface of carbon fiber bundles and an epoxy resin, a condensate of an alkylene oxide adduct with an unsaturated dibasic acid, and an alkylene oxide adduct of a phenol on the surface of the multifunctional aliphatic compound (see Patent Literature 19).

A disclosed combination of two or more epoxy compounds is a combination of an aliphatic epoxy compound and a bisphenol A epoxy compound as an aromatic epoxy compound. The aliphatic epoxy compound is a cyclic aliphatic epoxy compound and/or a long chain aliphatic epoxy compound (see Patent Literature 20).

A combination of epoxy compounds having different properties has also been disclosed. A disclosed combination contains two epoxy compounds that are liquid and solid at 25° C. (see Patent Literature 21). Furthermore, a combination of epoxy resins having different molecular weights and a combination of a monofunctional aliphatic epoxy compound and an epoxy resin have been developed (see Patent Literatures 22 and 23).

However, the sizing agents (for example, Patent Literatures 20 to 23) containing two or more components practically fail to achieve both the adhesion and the stability of a prepreg during long-term storage. The reason is considered as follows: The following three requirements are needed to be satisfied in order to simultaneously achieve the high adhesion and the suppression of the reduction in physical properties of a prepreg during long-term storage, but a conventional combination of any epoxy resins has failed to satisfy these requirements. Of the tree requirements, the first is that an epoxy component having high adhesion is present in the inner side (carbon fiber side) of a sizing layer, and the carbon fibers and the epoxy compound in the sizing interact strongly; the second is that the surface layer (matrix resin side) of the sizing layer has a function of suppressing the reaction between a matrix resin and the epoxy compound that is present in the inner layer and that has high adhesion to carbon fibers; and the third is that the surface layer (matrix resin side) of the sizing agent necessitates a chemical composition capable of strongly interacting with a matrix resin in order to improve the adhesion to the matrix resin.

For example, Patent Literature 14 discloses a sizing agent having an inclined structure for increasing the adhesion between carbon fibers and the sizing agent, but Patent Literature 14 and any other literatures (for example, Patent Literatures 15 to 18) have no idea that the sizing layer surface simultaneously suppresses the reaction between an epoxy compound having high adhesion to carbon fibers and a component in a matrix and achieves high adhesion to the matrix resin.

Patent Literature 19 discloses a sizing agent including an inner layer containing a multifunctional aliphatic compound and an outer layer containing an aromatic epoxy resin and an aromatic reaction product each having low reactivity. The sizing agent should prevent a prepreg stored for a long period of time from suffering change with time, but the surface layer of the sizing agent contains no multifunctional aliphatic compound having high adhesion, and this makes it difficult to achieve high adhesion to a matrix resin.

CITATION LIST

Patent Literature

Patent Literature 1: Japanese Patent Application Laid-open No. 04-361619
Patent Literature 2: U.S. Pat. No. 3,957,716, description
Patent Literature 3: Japanese Patent Application Laid-open No. 57-171767
Patent Literature 4: Japanese Examined Patent Application Publication No. 63-14114
Patent Literature 5: Japanese Patent Application Laid-open No. 7-279040
Patent Literature 6: Japanese Patent Application Laid-open No. 8-113876
Patent Literature 7: Japanese Patent Application Laid-open No. 57-128266
Patent Literature 8: U.S. Pat. No. 4,555,446, description
Patent Literature 9: Japanese Patent Application Laid-open No. 62-033872
Patent Literature 10: Japanese Patent Application Laid-open No. 07-009444
Patent Literature 11: Japanese Patent Application Laid-open No. 2000-336577
Patent Literature 12: Japanese Patent Application Laid-open No. 61-028074
Patent Literature 13: Japanese Patent Application Laid-open No. 01-272867
Patent Literature 14: Japanese Patent Application Laid-open No. 2005-179828
Patent Literature 15: Japanese Patent Application Laid-open No. 2005-256226
Patent Literature 16: International Publication WO 03/010383
Patent Literature 17: Japanese Patent Application Laid-open No. 2008-280624
Patent Literature 18: Japanese Patent Application Laid-open No. 2005-213687
Patent Literature 19: Japanese Patent Application Laid-open No. 2002-309487
Patent Literature 20: Japanese Patent Application Laid-open No. 02-307979
Patent Literature 21: Japanese Patent Application Laid-open No. 2002-173873
Patent Literature 22: Japanese Patent Application Laid-open No. 59-71479
Patent Literature 23: Japanese Patent Application Laid-open No. 58-41973

SUMMARY

Technical Problem

In view of the above-described disadvantages, it is an object of the present invention to provide sizing agent-coated carbon fibers that have excellent adhesion and storage stability and can yield a carbon fiber reinforced composite material having excellent heat resistance and excellent mechanical strength in tough usage environments such as a low temperature environment, a process for producing the sizing agent-coated carbon fibers, a prepreg, and a carbon fiber reinforced composite material.

Solution to Problem

To solve the above-described problem and achieve the object, sizing agent-coated carbon fibers according to the present invention includes carbon fibers coated with a sizing agent including an aliphatic epoxy compound (A) and at least an aromatic epoxy compound (B1) as an aromatic compound (B). The sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°.

In the above-described sizing agent-coated carbon fibers according to the present invention, each of the aliphatic epoxy compound (A) and the aromatic epoxy compound (B1) has a surface tension of 35 to 45 $mJ/m^2$ at 125° C.

In the above-described sizing agent-coated carbon fibers according to the present invention, when the sizing agent-coated carbon fibers are subjected to ultrasonication in a mixed solvent of acetonitrile and chloroform to extract the applied sizing agent, the aliphatic epoxy compound (A) is extracted in a ratio of 0.3 part by mass or less relative to 100 parts by mass of the sizing agent-coated carbon fibers.

In the above-described sizing agent-coated carbon fibers according to the present invention, the sizing agent applied onto the carbon fibers has an epoxy equivalent of 350 to 550 g/eq.

In the above-described sizing agent-coated carbon fibers according to the present invention, the sizing agent at least contains the aliphatic epoxy compound (A) in an amount of 35 to 65% by mass and the aromatic compound (B) in an amount of 35 to 60% by mass relative to a total amount of the sizing agent except a solvent.

In the above-described sizing agent-coated carbon fibers according to the present invention, the sizing agent contains the aliphatic epoxy compound (A) and the aromatic epoxy compound (B1) in a mass ratio of 52/48 to 80/20.

In the above-described sizing agent-coated carbon fibers according to the present invention, the aliphatic epoxy compound (A) is a polyether polyepoxy compound having two or more epoxy groups in a molecule and/or a polyol polyepoxy compound having two or more epoxy groups in a molecule.

In the above-described sizing agent-coated carbon fibers according to the present invention, the aliphatic epoxy compound (A) is a glycidyl ether epoxy compound obtained by a reaction of epichlorohydrin with ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, or arabitol.

In the above-described sizing agent-coated carbon fibers according to the present invention, the aromatic epoxy compound (B1) is a bisphenol A epoxy compound or a bisphenol F epoxy compound.

In the above-described sizing agent-coated carbon fibers according to the present invention, the sizing agent contains an ester compound (C) having no epoxy group in a molecule in an amount of 2 to 35% by mass relative to the total amount of the sizing agent except the solvent.

In the above-described sizing agent-coated carbon fibers according to the present invention, relation (III):

$$0.50 \leq (I) \leq 0.90 \text{ and } 0.6 < (II)/(I) < 1.0 \quad (III)$$

is satisfied where (I) is a value of (a)/(b) of a surface of the sizing agent-coated carbon fibers before ultrasonication, (II) is the value of (a)/(b) of the surface of the sizing agent-coated carbon fibers of which an adhesion amount of the sizing agent is reduced to 0.09 to 0.20% by mass by ultrasonic cleaning of the sizing agent-coated carbon fibers in an acetone solvent, (a) is the height (cps) of a component at a binding energy (284.6 eV) assigned to CHx, C—C, and C=C, and (b) is the height (cps) of a component at a binding energy (286.1 eV) assigned to C—O in a $C_{1s}$ core spectrum of the sizing agent-coated carbon fibers analyzed by X-ray photoelectron spectroscopy using an X-ray at 400 eV at a photoelectron takeoff angle of 55°.

In the above-described sizing agent-coated carbon fibers according to the present invention, the aliphatic epoxy compound (A) adheres onto the carbon fibers in an amount of 0.2 to 2.0% by mass relative to the sizing agent-coated carbon fibers.

In the above-described sizing agent-coated carbon fibers according to the present invention, the carbon fibers have a surface carboxy group concentration COOH/C of 0.003 to 0.015 and a surface hydroxy group concentration COH/C of 0.001 to 0.050 determined by chemical modification X-ray photoelectron spectroscopy.

A process for producing the sizing agent-coated carbon fibers according to the present invention produces sizing agent-coated carbon fibers by coating the carbon fibers with any one of the above-described sizing agent, and then applying heat to the carbon fibers at a temperature ranging from 160 to 260° C. for 30 to 600 seconds.

In the above-described process for producing the sizing agent-coated carbon fibers according to the present invention, the carbon fibers are coated with a sizing agent-containing liquid prepared by mixing a water emulsion liquid at least containing the aromatic epoxy compound (B1) with a composition at least containing the aliphatic epoxy compound (A).

In the above-described process for producing the sizing agent-coated carbon fibers according to the present invention, the carbon fibers are subjected to liquid phase electrolytic oxidation in an alkaline electrolytic solution, and the sizing agent is then applied.

A prepreg according to the present invention includes: the sizing agent-coated carbon fibers according to any one of the above or sizing agent-coated carbon fibers produced by the process for producing the sizing agent-coated carbon fibers according to any one of the above; and a thermosetting resin.

In the prepreg according to the present invention, the thermosetting resin contains an epoxy compound (D) and a latent hardener (E).

In the prepreg according to the present invention, the latent hardener (E) is an aromatic amine hardener (E1).

In the prepreg according to the present invention, the aromatic amine hardener (E1) is an aromatic amine hardener containing a diphenyl sulfone skeleton.

In the prepreg according to the present invention, the latent hardener (E) is dicyandiamide or a derivative (E2) of the dicyandiamide.

In the prepreg according to the present invention, the thermosetting resin contains a urea compound (F1) as a hardening accelerator (F).

In the prepreg according to the present invention, the sizing agent and the aromatic amine hardener (E1) are used in a combination to give an increase in glass transition point of 25° C. or less after the sizing agent and the aromatic amine hardener (E1) are mixed in an amine equivalent/epoxy equivalent ratio of 0.9 and then are stored in an atmosphere at and 60% RH for 20 days.

In the prepreg according to the present invention, the sizing agent and the dicyandiamide or the derivative (E2) of the dicyandiamide are used in a combination to give an increase in glass transition point of 10° C. or less after the sizing agent and the dicyandiamide or the derivative (E2) of the dicyandiamide are mixed in an amine equivalent/epoxy equivalent ratio of 1.0 and then are stored in an atmosphere at 25° C. and 60% RH for 20 days.

In the prepreg according to the present invention, the epoxy compound (D) contains an aromatic epoxy compound (D1) having at least one glycidylamine skeleton and three or more functional groups in an amount of 50% by mass or more.

A carbon fiber reinforced composite material according to the present invention is produced by molding the prepreg according to any one of the above.

A carbon fiber reinforced composite material according to the present invention includes: the sizing agent-coated carbon fibers according to any one of the above or sizing agent-coated carbon fibers produced by the process for producing the sizing agent-coated carbon fibers according to any one of the above; and a hardened product of a thermosetting resin.

In the above-described carbon fiber reinforced composite material according to the present invention, expression (1):

$$((c)-(d))/(c) < 8\% \quad (1)$$

is satisfied where (c) is a 0° tensile strength MPa of the carbon fiber reinforced composite material that is produced by impregnating the sizing agent-coated carbon fibers with the thermosetting resin to prepare a prepreg and then hardening the prepreg within 24 hours and (d) is a 0° tensile strength MPa of the carbon fiber reinforced composite material that is produced by hardening the prepreg after storage at a temperature of 25° C. and at 60% RH for 20 days.

Advantageous Effects of Invention

The present invention can provide sizing agent-coated carbon fibers that have excellent adhesion to a matrix resin, undergo a small change with time during storage, and can yield a carbon fiber reinforced composite material having excellent heat resistance and strength characteristics.

DESCRIPTION OF EMBODIMENTS

Embodiments for achieving sizing agent-coated carbon fibers and a process for producing the sizing agent-coated carbon fibers of the present invention will now be described in more detail.

The present invention provides sizing agent-coated carbon fibers including a sizing agent that includes an aliphatic epoxy compound (A) and an aromatic compound (B) at least containing an aromatic epoxy compound (B1), and carbon fibers coated with the sizing agent. The sizing agent-coated carbon fibers have an (a)/(b) ratio of 0.50 to 0.90 where (a) is the height (cps) of a component at a binding energy (284.6 eV) assigned to CHx, C—C, and C=C and (h) is the height (ops) of a component at a binding energy (286.1 eV) assigned to C—O in a $C_{1s}$ core spectrum of the surface of the sizing agent on the carbon fibers analyzed by X-ray photoelectron spectroscopy using $AlK\alpha_{1,2}$ as the X-ray source at a photoelectron takeoff angle of 15°.

First, the sizing agent used in the present invention will be described. The sizing agent of the present invention includes an aliphatic epoxy compound (A) and an aromatic compound (B) at least containing an aromatic epoxy compound (B1).

On the basis of findings by the inventors of the present invention, a sizing agent within the range has excellent interfacial adhesion between carbon-fibers and a matrix, and the sizing agent-coated carbon fibers are used to prepare a prepreg, which undergoes a small change with time during storage. The sizing agent is thus preferably used for carbon fibers for a composite material.

When the sizing agent of the present invention is applied to carbon fibers, the inner side (carbon fiber side) of the sizing layer contains the aliphatic epoxy compound (A) in a larger amount, and thus the carbon fibers and the aliphatic epoxy compound (A) strongly interact to increase the adhesion. The surface layer (matrix resin side) of the sizing layer contains the aromatic compound (B) containing the aromatic epoxy compound (B1) in a larger amount, and this prevents the aliphatic epoxy compound (A) in the inner layer from reacting with a matrix resin. In addition, the surface layer (matrix resin side) of the sizing layer contains the aromatic epoxy compound (B1) containing a certain number of epoxy groups and the aliphatic epoxy compound (A) containing a certain number of epoxy groups in a certain ratio as a chemical composition capable of achieving strong interaction with the matrix resin, and this also improves the adhesion to the matrix resin.

A sizing agent containing the aromatic epoxy compound (B1) alone but containing no aliphatic epoxy compound (A) advantageously has low reactivity with a matrix resin, and a prepreg to be prepared undergoes a small change in physical properties during long-term storage. Such a sizing agent also has an advantage of capable of forming a rigid interface layer. However, the aromatic epoxy compound (B1), which is a rigid compound, is ascertained to be slightly inferior in the adhesion between carbon fibers and a matrix resin to the aliphatic epoxy compound (A).

When coated with a sizing agent containing the aliphatic epoxy compound (A) alone, the carbon fibers are ascertained to have high adhesion to a matrix resin. Although not certain, the mechanism is supposed as follows: the aliphatic epoxy compound (A) has a flexible skeleton and a structure having a high degree of freedom; and thus the aliphatic epoxy compound (A) can form a strong interaction with functional groups such as a carboxy group and a hydroxy group on the surface of carbon fibers. However, the aliphatic epoxy compound (A) exhibits high adhesion due to the interaction with the carbon fiber surface but has high reactivity with a compound having a functional group, such as a hardener in the matrix resin. If the aliphatic epoxy compound (A) is stored in a prepreg state for a long period of time, it is ascertained that the interaction between the matrix resin and the sizing agent changes the structure of an interface layer, and this unfortunately reduces physical properties of a carbon fiber reinforced composite material obtained from the prepreg, In the present invention, when the aliphatic epoxy compound (A) is mixed with the aromatic compound (B), the following phenomenon occurs: the aliphatic epoxy compound (A) having higher polarity is likely to be present in the carbon fiber side in a larger amount, and the aromatic compound (B) having lower polarity is likely to be present in a larger amount in the outermost layer of the sizing layer opposite to the carbon fibers. As a result of this inclined structure of the sizing layer, the aliphatic epoxy compound (A) present near the carbon fibers has a strong interaction with the carbon fibers and thus can increase the adhesion between the carbon fibers and a matrix resin. In addition, when the sizing agent-coated carbon fibers are processed into a prepreg, the aromatic compound (B) present in the outer layer in a large amount plays a roll of blocking the aliphatic epoxy compound (A) from a matrix resin. This prevents the aliphatic epoxy compound (A) from reacting with a component having high reactivity in the matrix resin, thus achieving stability during long-term storage. If the aliphatic epoxy compound (A) is almost completely covered with the aromatic compound (B), the interaction between the sizing agent and a matrix resin is reduced to lower the adhesion, and thus the ratio of the aliphatic epoxy compound (A) and the aromatic compound (B) present on the surface of the sizing agent is thus important.

The sizing agent of the present invention preferably, at least contains the aliphatic epoxy compound (A) in an amount of 35% to 65% by mass and the aromatic compound (B) in an amount of 35 to 60% by mass relative to the total amount of the sizing agent except solvents. If containing 35% by mass or more of the aliphatic epoxy compound (A) relative to the total amount of the sizing agent except solvents, the sizing agent improves the adhesion. If containing 65% by mass or less of the aliphatic epoxy compound (A), the sizing agent can contain additional components except the aliphatic epoxy compound (A). Even when a prepreg prepared by using carbon fibers coated with such a sizing agent is stored in a long period of time, a carbon fiber reinforced composite material subsequently produced obtains good physical properties. The amount of the aliphatic epoxy compound (A) is more preferably 38% by mass or more and even more preferably 40% by mass or more.

The amount of the aliphatic epoxy compound (A) is more preferably 60% by mass or less and even more preferably 55% by mass or less.

If the sizing agent of the present invention contains 35% by mass or more of the aromatic compound (B) relative to the total amount of the sizing agent except solvents, the outer layer of the sizing agent can maintain the aromatic compound (B) at a high composition, and this can suppress the deterioration of physical properties of a prepreg prepared by using the sizing agent-coated carbon fibers during long-term storage due to the reaction of the aliphatic epoxy compound (A) having high reactivity with a reactive compound in the matrix resin. If containing 60% by mass or less of the aromatic compound (B), the sizing agent can achieve an inclined structure in the sizing layer and thus can maintain the adhesion. The amount of the aromatic compound (B) is more preferably 37% by mass or more and even more preferably 39% by mass or more. The amount of the aromatic compound (B) is more preferably 55% by mass or less and even more preferably 45% by mass or less.

The sizing agent in the present invention includes, as epoxy components, an aromatic epoxy compound (B1) as the aromatic compound (B) in addition to the aliphatic epoxy compound (A). The mass ratio (A)/(B1) of the aliphatic epoxy compound (A) and the aromatic epoxy compound (B1) is preferably 52/48 to 80/20. A sizing agent having a ratio (A)/(B1) of 52/48 or more increases the ratio of the aliphatic epoxy compound (A) present on the surface of carbon fibers, and this improves the adhesion between the carbon fibers and a matrix resin. As a result, a carbon fiber reinforced composite material to be produced obtains higher composite physical properties such as tensile strength. A sizing agent having a ratio (A)/(i) of 80/20 or less reduces the amount of the aliphatic epoxy compound (A) having high reactivity present on the surface of carbon fibers, and this can suppress the reactivity with a matrix resin. Such a ratio is thus preferred. The mass ratio (A)/(B1) is more preferably 55/45 or more and even more preferably 60/40 or more. The mass ratio (A)/(B1) is more preferably 75/35 or less and even more preferably 73/37 or less.

In the present invention, each of the aliphatic epoxy compound (A) and the aromatic epoxy compound (B1) preferably has a surface tension of 35 to 45 mJ/m$^2$ at 125° C. A combination of the aliphatic epoxy compound (A) and the aromatic epoxy compound (B1) having similar surface tensions allows the two compounds to be well mixed and can prevent components in the sizing agent from causing bleed out or other defects during the storage of sizing agent-coated carbon fibers to be produced.

Here, in the present invention, the surface tension values of the aliphatic epoxy compound (A) and the aromatic epoxy compound (B1) at 125° C. can be determined by the Wilhelmy method with a platinum plate in accordance with the procedure below.

When a platinum plate is brought into contact with a sizing solution containing each component alone at a controlled temperature of 125° C., the sizing solution wets up on the platinum plate. This generates surface tension around the plate, and the surface tension works to bring the plate into the sizing solution. This force is read and calculated. For example, a surface tensiometer, DY-500 manufactured by Kyowa Interface Science Co., Ltd. is used to determine the force as a static surface tension.

The aliphatic epoxy compound (A) used in the present invention is an epoxy compound containing no aromatic ring. The epoxy compound, which has a flexible skeleton with a high degree of freedom, can have strong interaction with carbon fibers. As a result, the epoxy compound can improve the adhesion between carbon fibers coated with the sizing agent and a matrix resin.

In the present invention, the aliphatic epoxy compound (A) has one or more epoxy groups in the molecule. This allows a strong binding to be formed between carbon fibers and the epoxy group in the sizing agent. The number of the epoxy groups in the molecule is preferably two or more and more preferably three or more. In the aliphatic epoxy compound (A) that is an epoxy compound having two or more epoxy groups in the molecule, even when one epoxy group forms a covalent bond with an oxygen-containing functional group on the surface of carbon fibers, remaining epoxy groups can form a covalent bond or a hydrogen bond with a matrix resin, and this can further improve the adhesion. Although the upper limit of the number of epoxy groups is not particular limited, a compound having ten epoxy groups is sufficient for the adhesion.

In the present invention, the aliphatic epoxy compound (A) is preferably an epoxy compound having two or more types of functional groups, where the number of the functional groups is three or more. The aliphatic epoxy compound (A) is more preferably an epoxy compound having two or more types of functional groups, where the number of the functional groups is four or more. The functional group contained in the epoxy compound is, in addition to the epoxy group, preferably selected from a hydroxy group, an amido group, an imido group, a urethane group, a urea group, a sulfonyl group, or a sulfo group. In the aliphatic epoxy compound (A) that is an epoxy compound having three or more epoxy groups or other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion. Although the upper limit of the number of functional groups including epoxy groups is not particular limited, a compound having ten functional groups is sufficient for the adhesion.

The aliphatic epoxy compound (A) used in the present invention preferably has an epoxy equivalent of less than 360 g/eq., more preferably less than 270 g/eq., and even more preferably less than 180 g/eq. An aliphatic epoxy compound (A) having an epoxy equivalent of less than 360 g/eq. forms an interaction with carbon fibers at high-density and further improves the adhesion between the carbon fibers and a matrix resin. Although the lower limit of the epoxy equivalent is not particularly limited, an aliphatic epoxy compound having an epoxy equivalent of 90 g/eq. or more is sufficient for the adhesion.

In the present invention, specific examples of the aliphatic epoxy compound (A) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include glycidyl ether epoxy compounds obtained by reaction of polyols with epichlorohydrin. The glycidyl ether epoxy compound is exemplified by a glycidyl ether epoxy compound obtained by reaction of epichlorohydrin with a polyol selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. The glycidyl ether epoxy compound is also exemplified by glycidyl ether epoxy compounds having a dicyclopentadiene skeleton.

Examples of the glycidylamine epoxy compound include 1,3-bis(aminomethyl)cyclohexane.

Examples of the glycidyl ester epoxy compound include glycidyl ester epoxy compounds obtained by reaction of dimer acids with epichlorohydrin.

Examples of the epoxy compound obtained by oxidation of a compound having a plurality of double bonds in the molecule include epoxy compounds having an epoxycyclohexane ring in the molecule. The epoxy compound is specifically exemplified by epoxidized soybean oil.

In addition to these epoxy compounds, the aliphatic epoxy compound (A) used in the present invention is exemplified by epoxy compounds such as triglycidyl isocyanurate.

The aliphatic epoxy compound (A) of the present invention preferably has one or more epoxy groups and at least one or More functional groups selected from a hydroxy group, an amido group, an imido group, a urethane group, a urea group, a sulfonyl group, a carboxy group, an ester group, and a sulfo group. Specific examples of the functional group of the aliphatic epoxy compound (A) include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aliphatic epoxy compound (A) having a hydroxy group in addition to an epoxy group include sorbitol polyglycidyl others and glycerol polyglycidyl ethers and specifically include "Denacol (registered trademark)" EX-611, EX-612, EX-614, EX-614B, EX-622, EX-512, EX-521, EX-421, EX-313, EX-314, and EX-321 (manufactured by Nagase ChemteX Corporation).

Examples of the aliphatic epoxy compound (A) having an amido group in addition to an epoxy group include amide-modified epoxy compounds. The amide-modified epoxy can be obtained by reaction of a carboxy group of an aliphatic dicarboxylic acid amide with an epoxy group of an epoxy compound having two or more epoxy groups.

Examples of the aliphatic epoxy compound (A) having an urethane group in addition to an epoxy group include urethane-modified epoxy compounds and specifically include "Adeka Resin (registered trademark)" EPU-78-13S, EPU-6, EPU-11, EPU-15, EPU-16A, EPU-16N, EPU-17T-6, EPU-1348, and EPU-1395 (manufactured by ADEKA). In addition, the compound can be prepared by reacting the terminal hydroxy group of a polyethylene oxide monoalkyl ether with a polyvalent isocyanate in an amount equivalent to that of the hydroxy group and then reacting the isocyanate residue of the obtained reaction product with a hydroxy group of a polyvalent epoxy compound. Examples of the polyvalent isocyanate used here include hexamethylene diisocyanate, isophorone diisocyanate, and norbornane diisocyanate.

Examples of the aliphatic epoxy compound (A) having a urea group in addition to an epoxy group include urea-modified epoxy compounds. The urea-modified epoxy compound can be prepared by reacting a carboxy group of an aliphatic dicarboxylic acid urea with an epoxy group of an epoxy compound having two or more epoxy groups.

Among the compounds described above, from the viewpoint of high adhesion, the aliphatic epoxy compound (A) used in the present invention is more preferably a glycidyl ether epoxy compound obtained by reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, glycerol, diglycerol, polyglycerol, trimethylolpropane, pentaerythritol, sorbitol, and arabitol.

Among them, the aliphatic epoxy compound (A) in the present invention is preferably a polyether polyepoxy compound and/or a polyol polyepoxy compound having two or more epoxy groups in the molecule from the viewpoint of high adhesion.

In the present invention, the aliphatic epoxy compound (A) is more preferably polyglycerol polyglycidyl ether.

In the present invention, the aromatic compound (B) has one or more aromatic rings in the molecule. The aromatic ring may be an aromatic hydrocarbon ring containing carbons alone or may be a heteroaromatic ring containing a hetero atom including nitrogen and oxygen, such as Loran, thiophene, pyrrole, and imidazole. The aromatic ring may also be polycyclic aromatic rings such as naphthalene and anthracene. In a carbon fiber reinforced composite material including carbon fibers coated with a sizing agent and a matrix resin, what is called an interface layer near the carbon fibers is affected by the carbon fibers or the sizing agent and thus may have different characteristics from those of the matrix resin. When the sizing agent contains the aromatic compound (B) having one or more aromatic rings, a rigid interface layer is formed to improve the stress transmission capacity between the carbon fibers and the matrix resin, and this improves mechanical characteristics such as 0° tensile strength of a fiber-reinforced composite material. Due to the hydrophobicity of the aromatic ring, the aromatic compound (B) has a lower interaction with carbon fibers than that of the aliphatic epoxy compound (A). As a result of the interaction with carbon fibers, the carbon fiber side contains the aliphatic epoxy compound (A) in a larger amount, and the outer layer of the sizing layer contains the aromatic compound (B) in a larger amount. This is preferred because the aromatic compound (B) prevents the aliphatic epoxy compound (A) from reacting with a matrix resin, and this can suppress a change during long-term storage of a prepreg prepared by using carbon fibers coated with the sizing agent of the present invention. By selecting an aromatic compound (B) having two or more aromatic rings, long-term stability of a prepreg to be prepared can be further improved. Although the upper limit of the number of aromatic rings is not particularly limited, an aromatic compound having ten aromatic rings is sufficient for mechanical characteristics and suppression of the reaction with a matrix resin.

In the present invention, the aromatic compound (B) may have one or more types of functional groups in the molecule. A single type of aromatic compound (B) may be used, or a plurality of compounds may be used in combination. The aromatic compound (B) at least contains an aromatic epoxy compound (B1) having one or more epoxy groups and one or more aromatic rings in the molecule. The functional group except the epoxy group is preferably selected from a hydroxy group, an amido group, an imido group, a urethane group, a urea group, a sulfonyl group, a carboxy group, an ester group, and a sulfo group, and two or more types of functional groups may be contained in one molecule. The aromatic compound (B) preferably contains, in addition to the aromatic epoxy compound (B1), an aromatic ester compound and an aromatic urethane compound because such a compound is stable and improves high-order processability.

In the present invention, the aromatic epoxy compound (B1) preferably has two or more epoxy groups and more preferably three or more epoxy groups. The aromatic epoxy compound (B1) preferably has ten or less epoxy groups.

In the present invention, the aromatic epoxy compound (B1) is preferably an epoxy compound having two or more types of functional groups, where the number of the functional groups is three or more. The aromatic epoxy compound (B1) is more preferably an epoxy compound having two or more types of functional groups, where the number of the functional groups is four or more. The functional group of the aromatic epoxy compound (B1) is preferably, in addition to the epoxy group, a functional group selected from a hydroxy group, an amido group, an imido group, a urethane group, a urea group, a sulfonyl group, and a sulfo group. In the aromatic epoxy compound (B1) that is an epoxy compound having three or more epoxy groups or having an epoxy group and two or more other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion. Although the upper limit of the number of functional groups including epoxy groups is not particular limited, a compound having ten functional groups is sufficient for the adhesion.

In the present invention, the aromatic epoxy compound (B1) preferably has an epoxy equivalent of less than 360 g/eq., more preferably less than 270 g/eq., and even more preferably less than 180 g/eq. An aromatic epoxy compound (B1) having an epoxy equivalent of less than 360 g/eq. forms a covalent bond at high density and further improves the adhesion between carbon fibers and a matrix resin. Although the lower limit of the epoxy equivalent is not particularly limited, an aromatic epoxy compound having an epoxy equivalent of 90 g/eq. or more is sufficient for the adhesion.

In the present invention, specific examples of the aromatic epoxy compound (B1) include glycidyl ether epoxy compounds derived from aromatic polyols, glycidylamine epoxy compounds derived from aromatic amines having a plurality of active hydrogens, glycidyl ester epoxy compounds derived from aromatic polycarboxylic acids, and epoxy compounds obtained by oxidation of aromatic compounds having a plurality of double bonds in the molecule.

The glycidyl ether epoxy compound is exemplified by a glycidyl ether epoxy compound obtained by reaction of epichlorohydrin with a compound selected from bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. The glycidyl ether epoxy compound is also exemplified by a glycidyl ether epoxy compound having a biphenylaralkyl skeleton.

Examples of the glycidylamine epoxy compound include N,N-diglycidylaniline, N,N-diglycidyl-o-toluidine, and glycidyl ether epoxy compounds obtained by reaction of epichlorohydrin with a compound selected from m-xylylenediamine, m-phenylenediamine, 4,4'-diaminodiphenylmethane, and 9,9-bis(4-aminophenyl)fluorene.

The glycidylamine epoxy compound is also exemplified by an epoxy compound obtained by reaction of epichlorohydrin with both a hydroxy group and an amino group of an aminophenol such as m-aminophenol, p-aminophenol, and 4-amino-3-methylphenol.

Examples of the glycidyl ester epoxy compound include glycidyl ester epoxy compounds obtained by reaction of epichlorohydrin with phthalic acid, terephthalic acid, and hexahydrophthalic acid.

Examples of the aromatic epoxy compound (B1) used in the present invention include, in addition to these epoxy compounds, epoxy compounds synthesized from the epoxy compound exemplified above as a raw material, and the epoxy compound is exemplified by an epoxy compound synthesized by an oxazolidone ring formation reaction of bisphenol A diglycidyl ether and tolylene diisocyanate.

In the present invention, the aromatic epoxy compound (B1) preferably has, in addition to one or more epoxy groups, at least one or more functional groups selected from a hydroxy group, an amido group, an imido group, a urethane group, a urea group, a sulfonyl group, a carboxy group, an ester group, and a sulfo group. Examples of the compound include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aromatic epoxy compound (B1) having an amido group in addition to an epoxy group include glycidylbenzamide and amide-modified epoxy compounds. The amide-modified epoxy can be obtained by reaction of a carboxy group of a dicarboxylic amide containing an aromatic ring with an epoxy group of an epoxy compound having two or more epoxy groups.

Examples of the aromatic epoxy compound (B1) having an imido group in addition to an epoxy group include glycidylphthaimide. Specific examples of the compound include "Denacol (registered trademark)" EX-731 (manufactured by Nagase ChemteX Corporation).

The aromatic epoxy compound (B1) having a urethane group in addition to an epoxy group can be prepared by reacting the terminal hydroxy group of a: polyethylene oxide monoalkyl ether with a polyvalent isocyanate having an aromatic ring in an amount equivalent to that of the hydroxy group and then reacting the isocyanate residue of the obtained reaction product with a hydroxy group of a polyvalent epoxy compound. Examples of the polyvalent isocyanate used here include 2,4-tolylene diisocyanate, m-phenylene diisocyanate, p-phenylene diisocyanate, diphenylmethane diisocyanate, triphenylmethane triisocyanate, and biphenyl-2,4,4'-triisocyanate.

Examples of the aromatic epoxy compound (B1) having a urea group in addition to an epoxy group include urea-modified epoxy compounds. The urea-modified epoxy can be prepared by reacting a carboxy group of a dicarboxylic acid urea with an epoxy group of an aromatic ring-containing epoxy compound having two or more epoxy groups Examples of the aromatic epoxy compound (B1) having a sulfonyl group in addition to an epoxy group include bisphenol S epoxy.

Examples of the aromatic epoxy compound (B1) having a sulfo group in addition to an epoxy group include glycidyl p-toluenesulfonate and glycidyl 3-nitrobenzenesulfonate.

In the present invention, the aromatic epoxy compound (B1) is preferably any of a phenol novolac epoxy compound, a cresol novolac epoxy compound, and tetraglycidyldiaminodiphenylmethane. These epoxy compounds have a large number of epoxy groups, a small epoxy equivalent, and two or more aromatic rings, thus improve the adhesion between carbon fibers and a matrix resin, and also improve the mechanical characteristics such as 0° tensile strength of a fiber-reinforced composite material. The aromatic epoxy compound (B1) is more preferably a phenol novolac epoxy compound and a cresol novolac epoxy compound.

In the present invention, the aromatic epoxy compound (B1) is preferably a phenol novolac epoxy compound, a cresol novolac epoxy compound, tetraglycidyldiaminodiphenylmethane, a bisphenol A epoxy compound, or a bisphenol F epoxy compound from the viewpoint of the stability of a prepreg during long-term storage and adhesiveness, and is more preferably a bisphenol A epoxy compound or a bisphenol F epoxy compound.

The sizing agent used in the present invention may further include one or more components in addition to the aliphatic epoxy compound (A) and the aromatic epoxy compound (B1) as the aromatic compound (B). If including an adhesion promoting component that improves the adhesion between carbon fibers and the sizing agent or including a material that imparts bindability or flexibility to sizing agent-coated carbon fibers, the sizing agent can increase handleability, abrasion resistance, and fuzz resistance and can improve impregnation properties of a matrix resin. In the present invention, in order to improve the long-term stability of a prepreg, the sizing agent may contain additional compounds except the compounds (A) and (B1). The sizing agent may contain auxiliary components such as a dispersant and a surfactant in order to stabilize the sizing agent.

The sizing agent used in the present invention may include, in addition to the aliphatic epoxy compound (A) and the aromatic epoxy compound (B1), an ester compound (C) having no epoxy group in the molecule. The sizing agent of the present invention can contain the ester compound (C) in an amount of 2 to 35% by mass relative to the total amount of the sizing agent except solvents. The amount is more preferably 15 to 30% by mass. If including the ester compound (C), the sizing agent can improve the bindability and the handling properties and can suppress the deterioration of physical properties of a prepreg during long-term storage due to a reaction of a matrix resin with the sizing agent.

The ester compound (C) may be an aliphatic ester compound having no aromatic ring or may be an aromatic ester compound having one or more aromatic rings in the molecule. When an aromatic ester compound (C1) is used as the ester compound (C), the aromatic ester compound (C1) is included in both the ester compound (C) having no epoxy compound in the molecule and the aromatic compound (B) in the present invention. In such a case, the aromatic compound (B) is not composed of the aromatic ester compound (C1) alone, but the aromatic compound (B) includes the aromatic epoxy compound (B1) and the aromatic ester compound (C1). When the aromatic ester compound (C1) is used as the ester compound (C), the sizing agent-coated carbon fibers obtain higher handling properties, and the aromatic ester compound (C1), which has a small interaction with carbon fibers, is present in the outer layer of a matrix resin, and this improves the suppressive effect of deterioration of physical properties of a prepreg during long-term storage. The aromatic ester compound (C1) may have, in addition to the ester group, any functional groups except the epoxy group, such as a hydroxy group, an amido group, an imido group, a urethane group, a urea group, a sulfonyl group, a carboxy group, and a sulfo group. Specifically, the aromatic ester compound (C1) preferably used is an ester compound that is a condensate of an unsaturated dibasic acid and an alkylene oxide adduct of a bisphenol. The unsaturated dibasic acid includes lower alkyl esters of acid anhydrides, and fumaric acid, maleic acid, citraconic acid, and itaconic acid are preferably used, for example. Preferably used alkylene oxide adducts of bisphenols are an ethylene oxide adduct of bisphenol, a propylene oxide adduct of bisphenol, and a butylene oxide adduct of bisphenol, for example. Among the condensates, condensates of fumaric acid or maleic acid with an ethylene oxide adduct or/and a propylene oxide adduct of bisphenol A are preferably used.

The addition method of an alkylene oxide to a bisphenol is not limited, and a known method can be employed. The unsaturated dibasic acid may partly contain a saturated dibasic acid or a small amount of a monobasic acid, as necessary, as long as adhesiveness and other characteristics are not impaired. The alkylene oxide adduct of a bisphenol may contain, for example, a common glycol, a common polyether glycol, a small amount of a polyhydric alcohol, and a small amount of a monovalent alcohol as long as adhesiveness and other characteristics are not impaired. The alkylene oxide adduct of a bisphenol with the unsaturated dibasic acid may be condensed by a known method.

In order to increase the adhesion between carbon fibers and an epoxy compound in the sizing agent, the sizing agent of the present invention can contain at least one compound selected from tertiary amine compounds and/or tertiary amine salts, quaternary ammonium salts having a cation site, and quaternary phosphonium salts and/or phosphine compounds as a component accelerating the adhesion. The sizing agent of the present invention preferably contains the compound in an amount of 0.1 to 25% by mass relative to the total amount of the sizing agent except solvents. The amount is more preferably 2 to 8% by mass.

When the sizing agent containing the aliphatic epoxy compound (A) and the aromatic epoxy compound (B1) and further containing at least one compound selected from tertiary amine compounds and/or tertiary amine salts, quaternary ammonium salts having a cation site, and quaternary phosphonium salts and/or phosphine compounds as the adhesion promoting component is applied to carbon fibers and subjected to heat treatment under particular conditions, the adhesiveness is further improved. Although not certain, the mechanism is supposed as follows: First, the compound reacts with an oxygen-containing functional group such as a carboxy group and a hydroxy group of carbon fibers used in the present invention and abstracts a hydrogen ion contained in the functional group to form an anion; and then the anionic functional group undergoes a nucleophilic reaction with an epoxy group contained in the aliphatic epoxy compound (A) or the aromatic epoxy compound (B1). This is supposed to generate a strong binding between the carbon fibers used in the present invention and the epoxy group in the sizing agent, thus improving the adhesion.

Specific examples of the adhesion promoting component preferably include N-benzylimidazole, 1,8-diazabicyclo[5,4,0]-7-undecene (DBU) and salts thereof, and 1,5-diazabicyclo[4,3,0]-5-nonene (DBN) and salts thereof. In particular, 1,8-diazabicyclo[5,4,0]-7-undecene (DBU) and salts thereof and 1,5-diazabicyclo[4,3,0]-5-nonene (DBN) and salts thereof are preferred.

Specific examples of the DBU salt include a phenolate of DBU (U-CAT SA1, manufactured by San-Apro Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

In the present invention, the adhesion promoting component to be added to the sizing agent is preferably tributylamine, N,N-dimethylbenzylamine, diisopropylethylamine, triisopropylamine, dibutylethanolamine, diethylethanolamine, triisopropanolamine, triethanolamine, and N,N-diisopropylethylamine and particularly preferably triisopropylamine, dibutylethanolamine, diethylethanolamine, triisopropanolamine, and diisopropylethylamine.

In addition to the compounds above, examples of the additive such as a surfactant include nonionic surfactants including polyalkylene oxides such as polyethylene oxide and polypropylene oxide; adducts of higher alcohols, polyhydric alcohols, alkylphenols, styrenated phenols, and other adduct compounds with polyalkylene oxides such as polyethylene oxide and polypropylene oxide; and block copolymers of ethylene oxide and propylene oxide. A polyester resin, an unsaturated polyester compound, and other additives may be appropriately added to an extent not impairing the effect of the present invention.

Next, the carbon fibers used in the present invention will be described. Examples of the carbon fibers used in the present invention include polyacrylonitrile (PAN) carbon fibers, rayon carbon fibers, and pitch carbon fibers. Among them, the PAN carbon fibers are preferably used due to excellent balance between strength and elastic modulus.

The carbon fibers of the present invention give carbon fiber bundles that preferably have a strand strength of 3.5 GPa or more, more preferably 4 GPa or more, and even more preferably 5 GPa or more. The obtained carbon fiber bundles preferably have a strand elastic modulus of 220 GPa or more, more preferably 240 GPa or more, and even more preferably 280 GPa or more.

In the present invention, the strand tensile strength and the elastic modulus of carbon fiber bundles can be determined by the test method of resin-impregnated strand described in JIS-R-7608 (2004) in accordance with the procedure below. The resin formulation is "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions are at normal pressure at 130° C. for 30 minutes. Ten strands of carbon fiber bundles are tested, and mean values are calculated as the strand tensile strength and the strand elastic modulus.

The carbon fibers used in the present invention preferably have a surface roughness (Ra) of 6.0 to 100 nm. The surface roughness (Ra) is more preferably 15 to 80 nm and even more preferably 30 to 60 nm. Carbon fibers having a surface roughness (Ra) of 6.0 to 60 nm have a surface with a highly active edge part, which increases the reactivity with an epoxy group and other functional groups of the sizing agent described above. This can improve the interfacial adhesion, and such carbon fibers are thus preferred. Carbon fibers having a surface roughness (Ra) of 6.0 to 100 am have an uneven surface, which can improve the interfacial adhesion due to an anchor effect of the sizing agent. Such carbon fibers are thus preferred.

The average roughness (Ra) of the surface of carbon fibers can be determined by using an atomic force microscope (AFM). For example, carbon fibers are cut into pieces having a length of several millimeters; then the fiber pieces are fixed onto a substrate (silicon wafer) with a silver paste; and a three-dimensional surface shape image of the central part of each single fiber is observed under an atomic force microscope (AFM). Usable examples of the atomic force microscope include NanoScope IIIa with Dimension 3000 stage system manufactured by Digital Instruments, and the observation can be performed in the following observation conditions:

Scan mode: tapping mode
Probe: silicon cantilever
Scan field: 0.6 µm×0.6 µm
Scan speed: 0.3 Hz
Number of pixels: 512×512
Measurement environment: at room temperature in the atmosphere For each sample, in the image obtained by the observation of a single area on an individual single fiber, the curve of the fiber cross section is approximated with a three-dimensional curved surface. From the obtained whole image, the average roughness (Re) is calculated. It is preferable that the average roughness (Ra) of five single fibers be determined, and the average is evaluated.

In the present invention, the carbon fibers preferably have a total fineness of 400 to 3,000 tex. The carbon fibers preferably have a filament number of 1,000 to 100,000 and more preferably 3,000 to 50,000.

In the present invention, the carbon fibers preferably have a single fiber diameter of 4.5 to 7.5 µm. If having a single fiber diameter of 7.5 µm or less, the carbon-fibers can have high strength and high elastic modulus and thus are preferred. The single fiber diameter is more preferably 6 µm or less and even more preferably 5.5 µm or less. If having a single fiber diameter of 4.5 µm or more, the carbon fibers are unlikely to cause single fiber breakage and to reduce the productivity and thus are preferred.

In the present invention, the carbon fibers preferably have a surface oxygen concentration (O/C) ranging from 0.05 to 0.50, more preferably ranging from 0.06 to 0.30, and even more preferably ranging from 0.07 to 0.25, where the surface oxygen concentration (O/C) is the ratio of the number of oxygen (O) atoms and that of carbon (C) atoms on the surface of the fibers and is determined by X-ray photoelectron spectroscopy. If having a surface oxygen concentration (O/C) of 0.05 or more, the carbon fibers maintain an oxygen-containing functional group on the surface of the carbon fibers and thus can achieve a strong adhesion to a matrix resin. If having a surface oxygen concentration (O/C) of 0.50 or less, the carbon fibers can suppress the reduction in strength of the carbon fiber itself by oxidation.

The surface oxygen concentration of carbon fibers is determined by X-ray photoelectron spectroscopy in accordance with the procedure below. First, a solvent is used to remove dust and the like adhering to the surface of carbon fibers; then the carbon fibers are cut into 20-mm pieces; and the pieces are spread and arranged on a copper sample holder. The measurement is carried out by using AlKα$_{1,2}$ as the X-ray source while the inside of a sample chamber is maintained at $1\times10^{-8}$ Torr. The photoelectron takeoff angle is adjusted to 90°. As the correction value for the peak associated with electrification during measurement, the binding energy value of the main peak (peak top) of $C_{1s}$ is set to 284.6 eV, The $C_{1s}$ peak area is determined by drawing a straight base line in a range from 282 to 296 eV. The $O_{1s}$ peak area is determined by drawing a straight base line in a range from 528 to 540 eV. The surface oxygen concentration (O/C) is expressed as an atom number ratio calculated by dividing the ratio of the $C_{1s}$ peak area by a sensitivity correction value inherent in an apparatus. For ESCA-1600 manufactured by Ulvac-Phi, Inc. used as the X-ray photoelectron spectrometer, the sensitivity correction value inherent in the apparatus is 2.33.

The carbon fibers used in the present invention preferably have a surface carboxy group concentration (COOH/C) ranging from 0.003 to 0.015, where the surface carboxy group concentration (COOH/C) is expressed by the ratio of the numbers of atoms of the carboxy group (COOH) and the carbon (C) on the surface of carbon fibers determined by chemical Modification X-ray photoelectron spectroscopy. The carboxy group concentration (COOH/C) on the surface of carbon fibers is more preferably in a range from 0.004 to 0.010. The carbon fibers used in the present invention preferably have a surface hydroxy group concentration (COH/C) ranging from 0,001 to 0.050, where the surface hydroxy group concentration (COH/C) is expressed by the ratio of the numbers of atoms of the hydroxy group (OH) and the carbon (C) on the surface of carbon fibers determined by chemical modification X-ray photoelectron spectroscopy. The surface hydroxy group concentration (COH/C) on the surface of carbon fibers is more preferably in a range from 0.010 to 0.040.

The surface carboxy group concentration (COOH/C) and the hydroxy group concentration (COH/C) of carbon fibers are determined by X-ray photoelectron spectroscopy in accordance with the procedure below.

The surface hydroxy group concentration (COH/C) is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are exposed to a dry nitrogen gas containing 0.04 mol/liter of trifluoroacetic anhydride gas at room temperature for 10 minutes, undergoing chemical modification treatment. Then, the treated pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area $[C_{1s}]$ is determined by drawing a straight base line in a range from 282 to 296 eV, and the $F_{1s}$ peak area $[F_{1s}]$ is determined by drawing a straight base line in a range from 682 to 695 eV. The reaction rate r can be determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C=\{[F_{1s}]/(3k[C_{1s}]2[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The surface carboxy group concentration (COOH/C) is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are exposed to air containing 0.02 mol/liter of trifluoroethanol gas, 0.001 mol/liter of dicyclohexylcarbodiimide gas, and 0.04 mol/liter of pyridine gas at 60° C. for 8 hours, undergoing chemical modification treatment. Then, the treated pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area $[C_{1s}]$ is determined by drawing a straight base line in a range from 282 to 296 eV, and the $F_{1s}$ peak area $[F_{1s}]$ is determined by drawing a straight base line in a range from 682 to 695 eV. The reaction rate r can be determined from $C_{1s}$ peak splitting of polyacrylic acid simultaneously subjected to chemical modification treatment, and the residual rate m of a dicyclohexylcarbodiimide derivative can be determined from $O_{1s}$ peak splitting.

The surface carboxy group concentration COOH/C is expressed by the value calculated in accordance with the equation below.

$$COOH/C=\{[F_{1s}]/(3k[C_{1s}]-(2+13m)[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The carbon fibers used in the present invention preferably have a polar component of surface free energy of 8 mJ/m² or more and 50 mS/m² or less. Carbon fibers having a polar component of surface free energy of 8 mJ/m² or more are preferred because the aliphatic epoxy compound (A) comes closer to the surface of carbon fibers to improve the adhesion, and a sizing layer has an uneven structure. Carbon fibers having a polar component of surface free energy of 50 mJ/m² or less are preferred because the bindability among carbon fibers increases to improve impregnation properties with a matrix resin, and this expands the application of a composite material to be produced.

The surface of carbon fibers more preferably has a polar component of surface free energy of 15 mJ/m² or more and 45 mJ/m² or less and most preferably 25 mJ/m² or more and 40 mJ/m² or less. The polar component of surface free energy of carbon fibers is the polar component of surface free energy calculated by using the Owens equation for approximation on the basis of the contact angle of carbon fibers with a corresponding liquid of water, ethylene glycol, and tricresyl phosphate determined by the Wilhelmy method.

The aliphatic epoxy compound (A) used in the present invention preferably has a polar component of surface free energy of 9 mJ/m² or more and 50 mJ/m² or less. The aromatic epoxy compound (B1) preferably has a polar component of surface free energy of 0 mJ/m² or more and less than 9 mJ/m².

The polar components of surface free energy of the aliphatic epoxy compound (A) and the aromatic epoxy compound (B1) are determined as follows: carbon fiber bundles are immersed in a solution containing the aliphatic epoxy compound (A) or the aromatic epoxy compound (B1) alone and pulled up; the carbon fiber bundles are dried at 120 to 150° C. for 10 minutes; and each polar component of surface free energy is calculated by using the Owens equation for approximation on the basis of each contact angle of the carbon fiber bundles with a corresponding liquid of water, ethylene glycol, and tricresyl phosphate determined by the Wilhelmy method as described above.

In the present invention, the polar component of surface free energy of carbon fibers, $E_{CF}$, the polar component of surface free energy of an aliphatic epoxy compound (A), $E_A$, and the polar component of surface free energy of an aromatic epoxy compound (B1), $E_{B1}$, are preferably satisfy the relation, $E_{CF} \geq E_A > E_{B1}$.

A method for producing the PAN carbon fibers will next be described.

Usable examples of the spinning method for preparing precursor fibers of carbon fibers include dry spinning, wet spinning, and dry-wet spinning. To readily produce high-strength carbon fibers, the wet spinning or the dry-wet spinning is preferably employed. In particular, the dry-wet spinning is more preferably employed because carbon fibers having high strength can be produced.

In order to further improve the adhesion between carbon fibers and a matrix resin, the carbon fibers preferably have a surface roughness (Ra) of 6.0 to 100 nm, and in order to prepare carbon fibers having such a surface roughness, the wet spinning is preferably employed to spin precursor fibers.

A spinning solution to be used may be a solution in which a homopolymer or copolymer of polyacrylonitrile is dissolved in a solvent. The solvent used is an organic solvent such as dimethyl sulfoxide, dimethylformamide, and dimethylacetamide or an aqueous solution of an inorganic compound such as nitric acid, sodium rhodanate, zinc chloride, and sodium thiocyanate. Preferred solvents are dimethyl sulfoxide and dimethylacetamide.

The spinning solution is passed through a spinneret for spinning, discharged into a spinning bath or air, and then solidified in the spinning bath. The spinning bath to be used may be an aqueous solution of the same solvent as the solvent used for the spinning solution. The spinning liquid preferably contains the same solvent as the solvent for the spinning solution, and an aqueous dimethyl sulfoxide solution and an aqueous dimethylacetamide solution are preferred. The fibers solidified in the spinning bath are subjected to water-washing and drawing to yield precursor fibers. The obtained precursor fibers are subjected to flame resistant treatment and carbonization treatment and, if desired, further subjected to graphite treatment, yielding carbon fibers. The carbonization treatment and the graphite treatment are preferably carried out under conditions of a maximum heat treatment temperature of 1,100° C. or more and more preferably 1,400 to 3,000° C.

To improve the adhesion to a matrix resin, the obtained carbon fibers are typically subjected to oxidation treatment, which introduces an oxygen-containing functional group. The oxidation treatment method may be gas phase oxidation, liquid phase oxidation, and liquid phase electrolytic oxidation, and the liquid phase electrolytic oxidation is preferably employed from the viewpoint of high productivity and uniform treatment.

In the present invention, the electrolytic solution used for the liquid phase electrolytic oxidation is exemplified by an acid electrolytic solution and an alkaline electrolytic solution. From the viewpoint of adhesion, carbon fibers are more preferably subjected to the liquid phase electrolytic oxidation in an alkaline electrolytic solution and then coated with a sizing agent.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid, which exhibit strong acidity, are preferably used.

Examples of the alkaline electrolytic solution specifically include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used electrolytic solutions are aqueous solutions of ammonium carbonate and ammonium hydrogen carbonate because such a solution is free from an alkali metal that interferes with the hardening of a matrix resin, or an aqueous solution of tetraalkylammonium hydroxide exhibiting strong alkalinity is preferably used.

The electrolytic solution used in the present invention preferably has a concentration ranging from 0.01 to 5 mol/L and more preferably ranging from 0.1 to 1 mol/L. If the electrolytic solution has a concentration of 0.01 mol/L or more, the electrolytic treatment can be performed at a lower electrical voltage, which is advantageous in operating cost. An electrolytic solution having a concentration of 5 mol/L, or less is advantageous in terms of safety.

The electrolytic solution used in the present invention preferably has a temperature ranging from 10 to 100° C. and more preferably ranging from 10 to 40° C. An electrolytic solution having a temperature of 10° C. or more improves the efficiency of electrolytic treatment, and this is advantageous in operating cost. An electrolytic solution having a temperature of less than 100° C. is advantageous in terms of safety.

In the present invention, the quantity of electricity during liquid phase electrolytic oxidation is preferably optimized depending on the carbonization degree of carbon fibers, and the treatment of carbon fibers having a high elastic modulus necessitates a larger quantity of electricity.

In the present invention, the current density during liquid phase electrolytic oxidation is preferably in a range from 1.5 to 1,000 A/m$^2$ and more preferably from 3 to 500 A/m relative to 1 m$^2$ of the surface area of carbon fibers in an electrolytic treatment solution. If the current density is 1.5 A/m$^2$ or more, the efficiency of electrolytic treatment is improved, and this is advantageous in operating cost. A current density of 1,000 A/m$^2$ or less is advantageous in terms of safety.

In the present invention, the carbon fibers after electrolytic treatment are preferably washed with water and dried. The washing method may be dipping or spraying, for example. Among them, from the viewpoint of easy washing, the dipping is preferably employed, and the dipping is preferably performed while carbon fibers are vibrated by ultrasonic waves. An excessively high drying temperature readily causes thermal decomposition of a functional group on the outermost surface of carbon fibers, thus decomposing the functional group. The drying is thus preferably performed at a temperature as low as possible. Specifically, the drying temperature is preferably 250° C. or less and more preferably 210° C. or less. In consideration of drying efficiency, the drying temperature is preferably 110° C. or more and more preferably 140° C. or more.

Next, sizing agent-coated carbon fibers prepared by coating the carbon fibers with a sizing agent will be described. The sizing agent of the present invention includes the aliphatic epoxy compound (A) and the aromatic compound (B) at least containing the aromatic epoxy compound (B1) and may contain additional components.

In the present invention, each of the aliphatic epoxy compound (A) and the aromatic epoxy compound (B1) preferably has a surface tension of 35 to 45 mJ/m² at 125° C.

In the present invention, the method of coating carbon fibers with the sizing agent is preferably a method by single coating using a sizing agent-containing liquid in which the aliphatic epoxy compound (A), the aromatic compound (B) at least containing the aromatic epoxy compound (B1), and other components are simultaneously dissolved or dispersed in a solvent and a method by multiple coating of carbon fibers using sizing agent-containing liquids in which any of the compounds (A), (B1), and (B) and other components are selected and dissolved or dispersed in corresponding solvents. The present invention more preferably employs one step application of single coating of carbon fibers with a sizing agent-containing liquid containing all the components of the sizing agent in terms of effect and simple treatment.

The sizing agent of the present invention can be used as a sizing agent-containing liquid prepared by diluting sizing agent components with a solvent. Examples of the solvent include water, methanol, ethanol, isopropanol, acetone, methyl ethyl ketone, dimethylformamide, and dimethylacetamide. Specifically, an aqueous dispersion emulsified with a surfactant or an aqueous solution is preferably used from the viewpoint of handleability and safety.

The sizing agent-containing liquid is prepared by emulsifying components at least containing the aromatic compound (B) with a surfactant to yield a water emulsion liquid and mixing a solution at least containing the aliphatic epoxy compound (A). For a water-soluble aliphatic epoxy compound (A), a method of previously dissolving the aliphatic epoxy compound (A) in water to give an aqueous solution and mixing a water emulsion, liquid at least containing the aromatic compound (B) is preferably employed from the viewpoint of emulsion stability. Alternatively, a method of using a water dispersant in which the aliphatic epoxy compound (A), the aromatic compound (B), and other components are emulsified with a surfactant is preferably employed from the viewpoint of long-term stability of the sizing agent.

The sizing agent-containing liquid typically contains the sizing agent at a concentration ranging from 0.2% by mass to 20% by mass.

Examples of the method of applying a sizing agent onto carbon fibers (the method of coating carbon fibers with a sizing agent) include a method of immersing carbon fibers in a sizing agent-containing liquid through a roller, a method of bringing carbon fibers into contact with a roller onto which a sizing agent-containing liquid adheres, and a method of spraying a sizing agent-containing liquid onto carbon fibers. The method of applying a sizing agent may be either a batch-wise manner or a continuous manner, and the continuous manner is preferably employed due to good productivity and small variation. During the application, in order to uniformly apply an active component in the sizing agent onto carbon fibers within an appropriate amount, the concentration and temperature of a sizing agent-containing liquid, the thread tension, and other conditions are preferably controlled. During the application of a sizing agent, carbon fibers are preferably vibrated by ultrasonic waves.

During the coating of carbon fibers with the sizing solution, the sizing agent-containing liquid preferably has a liquid temperature ranging from 10 to 50° C. in order to suppress a concentration change of the sizing agent due to the evaporation of a solvent. Furthermore, by adjusting a throttle for extracting an excess sizing agent-containing liquid after applying the sizing agent-containing liquid, the adhesion amount of the sizing agent can be controlled, and the sizing agent can be uniformly infiltrated into carbon fibers.

After coated with a sizing agent, the carbon fibers are preferably heated at a temperature ranging from 160 to 260° C. for 30 to 600 seconds. The heat treatment conditions are preferably at a temperature ranging from 170 to 250° C. for 30 to 500 seconds and more preferably at a temperature ranging from 180 to 240° C. for 30 to 300 seconds. Heat treatment under conditions at lower than 160° C. and/or for less than 30 seconds fails to accelerate the interaction between the aliphatic epoxy compound (A) in the sizing agent and an oxygen-containing functional group on the surface of carbon fibers, and this may result in insufficient adhesion between the carbon fibers and a matrix resin or may insufficiently dry carbon fibers and remove a solvent. Heat treatment under conditions at higher than 260° C. and/or for more than 600 seconds causes the sizing agent to decompose and volatilize and thus fails to accelerate the interaction with carbon fibers, and this may result in insufficient adhesion between the carbon fibers and a matrix resin.

The heat treatment can be performed by microwave irradiation and/or infrared irradiation. When sizing agent-coated carbon fibers are treated with heat by microwave irradiation and/or infrared irradiation, microwaves enter the carbon fibers and are absorbed by the carbon fibers, and this can heat the carbon fibers as an object to be heated to an intended temperature in a short period of time. The microwave irradiation and/or the infrared irradiation can rapidly heat the inside of the carbon fibers. This can reduce the difference in temperature between the inner side and the outer side of carbon fiber bundles, thus reducing the uneven adhesion of a sizing agent.

The sizing agent-coated carbon fibers of the present invention produced as above are characterized by having an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using $AlK\alpha_{1,2}$ as the X-ray source at a photoelectron takeoff angle of 15°. When the (a)/(b) ratio is within a particular range, that is, in a range from 0.50 to 0.90, the sizing agent-coated carbon fibers have excellent adhesion to a matrix resin and undergo a small deterioration of physical properties even when stored in a prepreg state for a long period of time, and on the basis of the findings, the present invention is accomplished.

The sizing agent-coated carbon fibers of the present invention preferably have an (a)/(b) ratio of 0.55 or more and more preferably 0.57 or more where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy at a photoelectron takeoff angle of 15°. The (a)/(b) ratio is preferably 0.80 or less and more preferably 0.74 or less. A larger (a)/(b) ratio indicates that the surface contains larger amounts of compounds derived from aromatics and smaller amounts of compounds derived from aliphatics.

The X-ray photoelectron spectroscopy is an analytical method by irradiating carbon fibers as a sample with X-rays in an ultrahigh vacuum and analyzing the kinetic energy of photoelectrons liberated from the surface of carbon fibers with what is called an energy analyzer. A binding energy can be calculated from the kinetic energy value of the photoelectrons and the energy value of X-rays incident on the carbon fibers as the sample. On the basis of the binding energy and a photoelectron intensity, the types, concentrations, and chemical states of elements present in the outermost layer (the order of nanometers) of the sample can be analyzed.

In the present invention, the peak ratio of (a) and (b) of the surface of the sizing agent on sizing agent-coated carbon fibers can be determined by X-ray photoelectron spectroscopy in accordance with the procedure below. The measurement is carried out at a photoelectron takeoff angle of 15°. Sizing agent-coated carbon fibers are cut into 20-mm pieces, and the pieces are spread and arranged on a copper sample holder. AlK$\alpha_{1,2}$ is used as the X-ray source, and the measurement is carried out while the inside of a sample chamber is maintained at $1\times10^{-8}$ Torr. As the correction for the peak associated with electrification during measurement, the binding energy value of the main peak of $C_{1s}$ is set to 286.1 eV, first. At this time, the $C_{1s}$ peak area is determined by drawing a straight base line in a range from 282 to 296 eV. The straight base line from 282 to 296 eV for calculating the $C_{1s}$ peak area is defined as the origin point (zero point) for photoelectron intensity, then the height (b) (cps: photoelectron intensity per unit time) of the peak at a binding energy of 286.1 eV assigned to a C—O component and the height (a) (cps) of the peak at a binding energy of 284.6 eV assigned to CHx, C—C, and C=C are determined, and the (a)/(b) ratio is calculated.

The sizing agent-coated carbon fibers of the present invention preferably satisfy the relation (III) where (I) and (II) are determined from the (a)/(b) ratio, (a) is the height (cps) of a component at a binding energy (284.6 eV) assigned to CHx, C—C, and C=O, and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using an X-ray at 400 eV at a photoelectron takeoff angle of 55°.

$$0.50 \leq (I) \leq 0.90 \text{ and } 0.6 < (II)/(I) < 1.0 \quad (III)$$

where (I) is the value of (a)/(b) of the surface of sizing agent-coated carbon fibers before ultrasonication; and (II) is the value of (a)/(b) of the surface of sizing agent-coated carbon fibers that have been washed to have a sizing agent adhesion amount of 0.09 to 0.20% by mass by ultrasonication of the sizing agent-coated carbon fibers in an acetone solvent.

The value (I) as the value of (a)/(b) of the surface of sizing agent-coated carbon fibers before ultrasonication falling within the range indicates that the surface of the sizing agent contains larger amounts of compounds derived from aromatics and smaller amounts of compounds derived from aliphatics. The value (I) as the value of (a)/(b) before ultrasonication is preferably 0.55 or more and more preferably 0.57 or more. The value (I) as the value of (a)/(b) before ultrasonication is preferably 0.80 or less and more preferably 0.74 or less.

The ratio (II)/(1) as the ratio of the values of (a)/(b) of the surface of sizing agent-coated carbon fibers before and after ultrasonication falling within the range indicates that larger amounts of compounds derived from aliphatics are present in the inner layer of the sizing agent than in the surface of the sizing agent. The ratio (II)/(I) is preferably 0.65 or more. The ratio (II)/(I) is preferably 0.85 or less.

If the values (I) and (II) satisfy the relation (III), the sizing agent-coated carbon fibers have excellent adhesion to a matrix resin and undergo a small deterioration of physical properties even when stored in a prepreg state for a long period of time. Such carbon fibers are thus preferred. Here, the ultrasonication means the treatment by subjecting 2 g of sizing agent-coated carbon fibers immersed in 50 ml of acetone to ultrasonic cleaning for 30 minutes three times, subsequently immersing the carbon fibers in 50 ml of methanol, then subjecting the carbon fibers to ultrasonic cleaning for 30 minutes once, and drying the carbon fibers.

In the present invention, the sizing agent applied onto carbon fibers preferably has an epoxy equivalent of 350 to 550 g/eq. A sizing agent having an epoxy equivalent of 550 g/eq. or less improves the adhesion between carbon fibers coated with the sizing agent and a matrix resin. When the carbon fibers coated with a sizing agent having an epoxy equivalent of 350 g/eq. or more are used to prepare a prepreg, the reaction between a matrix resin component used in the prepreg and the sizing agent can be suppressed, and thus a carbon fiber reinforced composite material to be produced has good physical properties even when the prepreg is stored in a long period of time. Such a sizing agent is thus preferred. The sizing agent applied preferably has an epoxy equivalent of 360 g/eq. or more and more preferably 380 g/eq. or more. The sizing agent applied preferably has an epoxy equivalent of 530 g/eq. or less and more preferably 500 g/eq. or less. In order to give a sizing agent applied having an epoxy equivalent within the range, a sizing agent having an epoxy equivalent of 180 to 470 g/eq. is preferably applied. If the epoxy equivalent is 313 g/eq. or less, the adhesion between carbon fibers coated with the sizing agent and a matrix resin is improved. If carbon fibers coated with a sizing agent having an epoxy equivalent of 222 g/eq. or more is used to prepare a prepreg, the reaction between a resin component used in the prepreg and the sizing agent can be suppressed, and thus a carbon fiber reinforced composite material to be produced has good physical properties even when the prepreg is stored in a long period of time.

The epoxy equivalent of the sizing agent in the present invention can be determined by dissolving a sizing agent from which a solvent is removed in a solvent typified by N,N-dimethylformamide, then cleaving the epoxy group with hydrochloric acid, and carrying out acid-base titration. The epoxy equivalent is preferably 220 g/eq. or more and more preferably 240 g/eq. or more. The epoxy equivalent is preferably 310 g/eq. or less and more preferably 280 g/eq. or less. The epoxy equivalent of the sizing agent applied to carbon fibers in the present invention can be determined by immersing sizing agent coated carbon fibers in a solvent typified by N,N-dimethylformamide, carrying out ultrasonic cleaning to extract the sizing agent from the fibers, then cleaving the epoxy group with hydrochloric acid, and carrying out acid-base titration. The epoxy equivalent of the sizing agent applied to carbon fibers can be controlled by, for example, the epoxy equivalent of a sizing agent to be applied and heat history during drying or other steps after coating.

In the present invention, the adhesion amount of the sizing agent to carbon fibers is preferably in a range from 0.1 to 10.0% by mass and more preferably from 0.2 to 3.0% by mass relative to the sizing agent-coated carbon fibers. If coated with the sizing agent in an amount of 0.1% by mass or more, the sizing agent-coated carbon fibers can withstand friction with metal guides or the like through which the carbon fibers pass during preparing a prepreg and weaving, and this prevents fluffs from generating; thus producing a carbon fiber sheet having excellent quality such as smoothness. If the adhesion amount of the sizing agent is 10.0% by mass or less, a matrix resin can infiltrate into carbon fibers without interference by a sizing agent coating around the sizing agent-coated carbon fibers. This prevents voids from generating in an intended composite material, and thus the composite material has excellent quality and excellent mechanical characteristics.

The adhesion amount of the sizing agent is a value (% by mass) calculated by weighing about 2±0.5 g of sizing agent-coated carbon fibers, subjecting the carbon fibers to heat treatment at 450° C. for 15 minutes in a nitrogen atmosphere, determining the change in mass before and after the heat treatment, and dividing the change in mass by the mass before the heat treatment.

In the present invention, the sizing agent layer applied onto carbon fibers and dried preferably has a thickness ranging from 2.0 to 20 nm and a maximum thickness of less than twice a minimum thickness. A sizing agent layer having such a uniform thickness can stably achieve a large adhesion improvement effect and can stably achieve excellent high-order processability.

In the present invention, the adhesion amount the aliphatic epoxy compound (A) to carbon fibers is preferably in a range from 0.05 to 5.0% by mass and more preferably from 0.2 to 2.0% by mass relative to the sizing agent-coated carbon fibers. The amount is more preferably 0.3 to 1.0% by mass. If the adhesion amount of the aliphatic epoxy compound (A) is 0.05% by mass or more, the adhesion between the sizing agent-coated carbon fibers and a matrix resin is improved, and thus such an amount is preferred.

In the present invention, the aliphatic epoxy compound (A) is preferably extracted in a ratio of 0.3 part by mass or less relative to 100 parts by mass of the sizing agent-coated carbon fibers from the sizing agent-coated carbon fibers in a mixed solvent of acetonitrile and chloroform. If the sizing agent-coated carbon fibers of the present invention having an extraction amount of the aliphatic epoxy compound (A) of 0.3 part by mass or less are used together with a thermosetting resin to prepare a prepreg, the reaction between a resin component in the thermosetting resin and the sizing agent can be suppressed, and thus such an amount is preferred. On this account, the ratio of the aliphatic epoxy compound (A) extracted is more preferably 0.1 part by mass or less and even more preferably 0.05 part by mass or less relative to 100 parts by mass of the sizing agent-coated carbon fibers.

The ratio of the aliphatic epoxy compound (A) extracted can be determined as follows: test pieces of sizing agent-coated carbon fibers are immersed in a mixed solution of acetonitrile and chloroform (a volume ratio of 9/1) and are subjected to ultrasonic cleaning for 20 minutes to extract the sizing agent in the mixed solution of acetonitrile and chloroform, yielding a dissolution solution; and the dissolution solution is analyzed by liquid chromatography in the conditions below.

Analytical column: Chromolith Performance RP-18e (4.6×100 mm)

Mobile phase: a water/acetonitrile system is used; from the start of analysis to 7 minutes, the mobile phase is changed from water/acetonitrile=60%/40% to acetonitrile 100%; to 12 minutes, acetonitrile 100% is maintained; then to 12.1 minutes, the mobile phase is changed to water/acetonitrile=60%/40%; and to 17 minutes, water/acetonitrile=60%/40% is maintained.

Flow rate: 2.5 mL/min

Column temperature: 45° C.

Detector: evaporative light scattering detector (ELSD)

Detector temperature: 60° C.

In the process for producing the sizing agent-coated carbon fibers of the present invention, carbon fibers having a polar component of surface free energy of 8 mJ/m$^2$ or more and 50 mJ/m$^2$ or less are preferably coated with the sizing agent. Carbon fibers having a polar component of surface free energy of 8 mJ/m$^2$ or more are preferred because the aliphatic epoxy compound (A) comes closer to the surface of carbon fibers to improve the adhesion, and the sizing layer has an uneven structure. Carbon fibers having a polar component of surface free energy of 50 mJ/m$^2$ or less are preferred because the bindability among carbon fibers increases to improve impregnation properties with a matrix resin, and this expands the application of a composite material to be produced. The polar component of surface free energy of the surface of carbon fibers is more preferably 15 mJ/m$^2$ or more and 45 mJ/m$^2$ or less and most preferably 25 mJ/m$^2$ or more and 40 mJ/m$^2$ or less.

The sizing agent-coated carbon fibers of the present invention are used in shapes, for example, tows, woven fabrics, knits, braids, webs, mats, and chopped strands. In particular, for an application necessitating high specific strength and specific modulus, a tow prepared by arranging carbon fibers in one direction is most preferred, and a prepreg prepared by further impregnation with a matrix resin is preferably used.

Next, a prepreg and a carbon fiber reinforced composite material in the present invention will be described.

In the present invention, a prepreg includes the sizing agent-coated carbon fibers described above or sizing agent-coated carbon fibers produced by the method above and a matrix resin.

In the present invention, the matrix resin used may be a thermosetting resin or a thermoplastic resin (the resin described here may be a resin composition), but a thermosetting resin can be preferably used.

The thermosetting resin used in the present invention may be any resin that undergoes cross-linking reaction by heat and at least partially forms a three-dimensional cross-linked structure. Examples of such a thermosetting resin include epoxy resins, unsaturated polyester resins, vinyl ester resins, benzoxazine resins, phenol resins, urea resins, melamine resins, and thermosetting polyimide resins and also include modified resins thereof and blending resins of two or more of them. These thermosetting resins may be self-curable by heat and may contain a hardener, a hardening accelerator, and other additives.

Any epoxy compound (D) can be used in the epoxy resin, and the epoxy compound may be one or more compounds selected from bisphenol epoxy compounds, amine epoxy compounds, phenol novolac epoxy compounds, cresol novolac epoxy compounds, resorcinol epoxy compounds, phenol aralkyl epoxy compounds, naphthol aralkyl epoxy compounds, dicyclopentadiene epoxy compounds, epoxy compounds having a biphenyl skeleton, isocyanate-modified epoxy compounds, tetraphenylethane epoxy compounds, and triphenyl methane epoxy compounds.

Here, in the bisphenol epoxy compound, two phenolic hydroxy groups on a bisphenol compound are glycidylated, and examples of the bisphenol epoxy compound include bisphenol A epoxy compounds, bisphenol F epoxy compounds, bisphenol AD epoxy compounds, bisphenol S epoxy compounds, and halogenated, alkyl-substituted, and hydrogenated products of these bisphenol epoxy compounds. The bisphenol epoxy compound is not limited to monomers, and a polymer having a plurality of repeating units can also be preferably used.

Examples of the commercially available bisphenol A epoxy compound include "jER (registered trademark)" 825, 828, 834, 1001, 1002, 1003, 1003F, 1004, 1004AF, 1005F, 1006FS, 1007, 1009, and 1010 (manufactured by Mitsubishi Chemical Corporation). Examples of the brominated bisphenol A epoxy compound include "jER (registered trademark)" 505, 5050, 5051, 5054, and 5057 (manufactured by Mitsubishi Chemical Corporation). Examples of the commercially available hydrogenated bisphenol A epoxy compound include ST5080, ST4000D, ST4100D, and ST5100 (manufactured by Nippon Steel Chemical Co., Ltd.).

Examples of the commercially available bisphenol F epoxy compound include "jER (registered trademark)" 806, 807, 4002P, 4004P, 4007P, 4009P, and 4010P (manufactured by Mitsubishi Chemical Corporation), "EPICLON (registered trademark)" 830 and 835 (manufactured by DIC Corporation), and "EPOTOHTO (registered trademark)" YDF2001 and YDP2004 (manufactured by Nippon Steel Chemical Co., Ltd.). Examples of the tetramethyl bisphenol F epoxy compound include YSLV-80XY (manufactured by Nippon Steel Chemical Co., Ltd.).

Examples of the bisphenol S epoxy compound include "EPICLON (registered trademark)" EXA-154 (manufactured by DIC Corporation).

Examples of the amine epoxy compound include tetraglycidyldiaminodiphenylmethane, triglycidylaminophenol, triglycidylaminocresol, tetraglycidylxylylenediamine, and halogenated, alkynol-substituted, and hydrogenated products of them.

Examples of the commercially available tetraglycidyidiaminodiphenylmethane include "SUMI-EPOXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720 and MY721 (manufactured by Huntsman Advanced Materials). Examples of the commercially available triglycidylaminophenol and triglycidylaminocresol include "SUMI-EPOXY (registered trademark)" ELM100 and ELM120 (manufactured by Sumitomo Chemical Co., Ltd.), "Araldite (registered trademark)" MY0500, MY0510, and MY0600 (manufactured by Huntsman Advanced Materials), and "jER (registered trademark)" 630 (manufactured by Mitsubishi Chemical Corporation).

Examples of the commercially available tetraglycidylxylylenediamine and hydrogenated products thereof include TETRAD-X and TETRAD-C (manufactured by Mitsubishi Gas Chemical Company).

Examples of the commercially available phenol novolac epoxy compound include "jER (registered trademark)" 152 and 154 (manufactured by Mitsubishi Chemical Corporation) and "EPICLON (registered trademark)" N-740, N-770, and N-775 (manufactured by DIC Corporation).

Examples of the commercially available cresol novolac epoxy compound include "EPICLON (registered trademark)" N-660, N-665, N-670, N-673, and N-695 (manufactured by DIC Corporation), EOCN-1020, EOCN-102S, and EOCN-104 S (manufactured by Nippon Kayaku Co., Ltd.).

Examples of the commercially available resorcinol epoxy compound include "Denacol (registered trademark)" EX-201 (manufactured by Nagase ChemteX Corporation).

Examples of the commercially available glycidyl aniline epoxy compound include GAN and GOT (manufactured by Nippon Kayaku Co., Ltd.).

Examples of the commercially available epoxy compound having a biphenyl skeleton include "jER (registered trademark)" YX4000H, YX4000, and 116616 (manufactured by Mitsubishi Chemical Corporation), and NC-3000 (manufactured by Nippon Kayaku Co., Ltd.).

Examples of the commercially available dicyclopentadiene epoxy compound include "EPICLON (registered trademark)" HP7200L (an epoxy equivalent of 245 to 250, a softening point of 54 to 58), "EPICLON (registered trademark)" HP7200 (an epoxy equivalent of 255 to 260, a softening point of 59 to 63), "EPICLON (registered trademark)" HP7200H (an epoxy equivalent of 275 to 280, a softening point of 80 to 85), "EPICLON (registered trademark)" HP7200HH (an epoxy equivalent of 275 to 280, a softening point of 87 to 92) (manufactured by Dainippon Ink and Chemicals, Inc.), XD-1000-L (an epoxy equivalent of 240 to 255, a softening point of 60 to 70), XD-1000-2L (an epoxy equivalent of 235 to 250, a softening point of 53 to 63) (manufactured by Nippon Kayaku Co., Ltd.), and "Tactix (registered trademark)" 556 (an epoxy equivalent of 0.215 to 235, a softening point of 79° C.) (manufactured by Vantico Inc.).

Examples of the commercially available isocyanate-modified epoxy compound include XAC4151 and AER4152 (manufactured by Asahi Kasei Epoxy Co., Ltd.) and ACR1348 (manufactured by ADEKA), which have an oxazolidone ring.

Examples of the commercially available tetraphenylethane epoxy compound include "jER (registered trademark)" 1031 (manufactured by Mitsubishi Chemical Corporation) as a tetrakis(glycidyloxyphenyl)ethane epoxy compound.

Examples of the commercially available triphenylmethane epoxy compound include "Tactix (registered trademark)" 742 (manufactured by Huntsman Advanced Materials).

The unsaturated polyester resin is exemplified by a solution of an unsaturated polyester obtained by reaction of an alcohol with an acid component containing an $\alpha,\beta$-unsaturated dicarboxylic acid, in a polymerizable unsaturated monomer. Examples of the $\alpha,\beta$-unsaturated dicarboxylic acid include maleic acid, fumaric acid, itaconic acid, and derivatives such as acid anhydrides of them, and these acids may be used in combination of two or more of them: As necessary, the $\alpha,\beta$-unsaturated dicarboxylic acid may be used in combination with an additional acid component except the $\alpha,\beta$-unsaturated dicarboxylic acid, such as saturated dicarboxylic acids including phthalic acid, isophthalic acid, terephthalic Acid, tetrahydrophthalic acid, adipic acid, sebacic acid, and derivatives, for example, acid anhydrides of them.

Examples of the alcohol include aliphatic glycols such as ethylene glycol, diethylene glycol, propylene glycol, dipropylene glycol, 1,2-propanediol, 1,2-butanediol, 1,3-butanediol, and 1,4-butanediol; alicyclic diols such as cyclopentanediol and cyclohexanediol; aromatic diols such as hydrogenated bisphenol A, a bisphenol A-propylene oxide (1 to 100 mol) adduct, and xylene glycol; and polyhydric alcohols such as trimethylolpropane and pentaerythritol. These alcohols may be used in combination of two or more of them.

Specific examples of the unsaturated polyester resin include a condensate of fumaric acid or maleic acid with a bisphenol A-ethylene oxide (hereinafter abbreviated as EO) adduct, a condensate of fumaric acid or maleic acid with a bisphenol A-propylene oxide (hereinafter abbreviated as PO) adduct, and a condensate of fumaric acid or maleic acid with a bisphenol A-EO or -PO adduct (the adducts with EO and PO may be either a random adduct or a block adduct). These condensates may be dissolved in a monomer such as styrene, as necessary. Examples of the commercially available unsaturated polyester resin include "U-PiCA (registered trademark)" (manufactured by Japan U-PiCA Company, Ltd.), "Rigolac (registered trademark)" (manufactured by Showa Denko K.K.), and "Polyset (registered trademark)" (manufactured by Hitachi Chemical Co., Ltd.).

Examples of the vinyl ester resin include an epoxy (meth)acrylate obtained by esterification of the epoxy compound with an α,β-unsaturated monocarboxylic acid. Examples of the α,β-unsaturated monocarboxylic acid include acrylic acid, methacrylic acid, crotonic acid, tiglic acid, and cinnamic acid, and these unsaturated monocarboxylic acids may be used in combination of two or more of them. Specific examples of the vinyl ester resin include a bisphenol epoxy compound-(meth)acrylate modified product (for example, a terminal (meth)acrylate-modified resin obtained by reaction of an epoxy group of a bisphenol A epoxy compound with a carboxy group of (meth)acrylic acid), and these modified products may be dissolved in a monomer such as styrene, as necessary. Examples of the commercially available vinyl ester resin include "Diclite (registered trademark)" (manufactured by DIC Corporation), "Neopor (registered trademark)" (manufactured by Japan U PICA Company, Ltd.), and "Ripoxy (registered trademark)" (manufactured by Showa Highpolymer Co., Ltd.).

Examples of the benzoxazine resin include o-cresol-aniline benzoxazine resins, m-cresol-aniline benzoxazine resins, p-cresol-aniline benzoxazine resins, phenol-aniline benzoxazine resins, phenol-methylamine benzoxazine resins, phenol-cyclohexylamine benzoxazine resins, phenol-m-toluidine benzoxazine resins, phenol-3,5-dimethylaniline-benzoxazine resins, bisphenol A-aniline benzoxazine resins, bisphenol A-amine benzoxazine resins, bisphenol F-aniline benzoxazine resins, bisphenol S-aniline benzoxazine resins, dihydroxydiphenylsulfone-aniline benzoxazine resins, dihydroxydiphenyl ether-aniline benzoxazine resins, benzophenone benzoxazine resins, biphenyl benzoxazine resins, bisphenol AF-aniline benzoxazine resins, bisphenol A-methylaniline benzoxazine resins, phenol-diaminodiphenylmethane benzoxazine resins, triphenylmethanebenzoxazine resins, and phenolphthalein benzoxazine resins. Examples of the commercially available benzoxazine resin include BF-BXZ, BS-BXZ, and BA-BXZ (manufactured by Konishi Chemical Ind. Co., Ltd.).

The phenol resin is exemplified by resins obtained by condensation of phenols such as phenol, cresol, xylenol, t-butylphenol, nonylphenol, cashew oil, lignin, resorcin, and catechol with aldehydes such as formaldehyde, acetaldehyde, and furfural, and examples include novolak resins and resol resins. The novolak resin can be obtained by reaction of phenol with formaldehyde in the same amount or in an excess amount of the phenol in the presence of an acid catalyst such as oxalic acid. The resol resin can be obtained by reaction of phenol with formaldehyde in the same amount or in an excess amount of the formaldehyde in the presence of a base catalyst such as sodium hydroxide, ammonia, or an organic amine. Examples of the commercially available phenol resin include "SUMILITERESIN (registered trademark)" (manufactured by Sumitomo Bakelite Co., Ltd.), Resitop (manufactured by Gunei Chemical Industry Co., Ltd.), and "AV Light (registered trademark)" (manufactured by Asahi Organic Chemicals Industry).

The urea resin is exemplified by a resin obtained by condensation of urea and formaldehyde. Examples of the commercially available urea resin include UA-144 (manufactured by Sunbake Co., Ltd.).

The melamine resin is exemplified by a resin obtained by polycondensation of melamine and formaldehyde. Examples of the commercially available melamine resin include "Nikalac (registered trademark)" (manufactured by SANWA Chemical Co., Ltd.).

The thermosetting polyimide resin is exemplified by a resin in which at least a main structure contains an imide ring, and a terminal or main chain has one or more groups selected from a phenylethynyl group, a nadimide group, a maleimide group, an acetylene group, and other groups. Examples of the commercially available polyimide resin include PETI-330 (manufactured by Ube Industries, Ltd.).

Among these thermosetting resins, an epoxy resin at least containing the epoxy compound (D) is preferably used because the resin advantageously has excellent balance of mechanical characteristics and causes small hardening shrinkage. In particular, a preferred epoxy resin at least contains a glycidylamine epoxy compound having a plurality of functional groups as the epoxy compound (D). The epoxy resin at least containing a glycidylamine epoxy compound having a plurality of functional groups has a high multi-cross-linking density, can improve the heat resistance and the compressive strength of a carbon fiber-reinforced composite material, and thus is preferred.

Examples of the glycidylamine epoxy compound having a plurality of functional groups include tetraglycidyl-diaminodiphenylmethane, triglycidylaminophenol, triglycidylaminocresol, N,N-diglycidylaniline, N,N-diglycidyl-o-toluidine, N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. These compounds can be typically obtained by addition of epichlorohydrin to a phenoxyaniline derivative and cyclization of the adduct with an alkali compound. A compound having a higher molecular weight has a higher viscosity, and thus N,N-diglycidyl-4-phenoxyaniline is particularly preferably used from the viewpoint of handling properties.

Examples of the phenoxyaniline derivative specifically include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphtyloxyphenoxy)aniline, 4-(1-naphtyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy)aniline.

Examples of the commercially available tetraglycidyl-diaminodiphenylmethane include "SUMI-EPOXY (registered trademark)" ELM434 (manufactured by Sumitomo Chemical Co., Ltd.), YH4341, (manufactured by Tohto Kasei Co., Ltd.), "Araldite (registered trademark)" MY720 (manufactured by Huntsman Advanced Materials), and "ER (registered trademark) 604" (manufactured by Mitsubishi Chemical-Corporation). Examples of the triglycidylaminophenol and the triglycidylaminocresol include "SUMI-EPOXY (registered trademark)" ELM100 (manufactured by Sumitomo Chemical Co., Ltd.), "Araldite (registered trademark)" MY0510, "Araldite (registered trademark)" MY0600 (manufactured by Huntsman Advanced Materials), and "jER (registered trademark)" 630 (manufactured by Mitsubishi Chemical Corporation).

Among them, the glycidylamine epoxy compound having a plurality of functional groups is preferably an aromatic epoxy compound (D1) having at least one glycidylamine skeleton and three or more epoxy groups.

An epoxy resin containing the glycidylamine aromatic epoxy compound (D1) having three or more epoxy groups has an effect of increasing the heat resistance, and the glycidylamine aromatic epoxy compound (D1) is preferably contained in a ratio of 30 to 100% by mass and more preferably 50% by mass or more in the epoxy resin. A resin containing the glycidylamine aromatic epoxy compound in a ratio of 30% by mass or more yields a carbon fiber reinforced composite material having higher compressive strength and good heat resistance, and thus such a ratio is preferred.

When used, such an epoxy compound (D) may contain a hardener and a catalyst such as an acid and a base, as necessary. For example, a Lewis acid such as halogenated boron complexes and p-toluenesulfonate and a polyamine hardener such as diaminodiphenylsulfone, diaminodiphenylmethane, derivatives thereof, and isomers thereof are preferably used to harden an epoxy resin.

The hardener used in the prepreg of the present invention is preferably a latent hardener (E). Here, the latent hardener is a hardener for the thermosetting resin of the present invention. The hardener is activated by heat to react with a reactive group such as an epoxy group, and the reaction is preferably activated at 70° C. or more. Here, the activation at 70° C. means that a reaction initiation temperature is 70° C. The reaction initiation temperature (hereinafter called activation temperature) can be determined by differential scanning calorimetry (DSC), for example. Specifically, to 100 parts by mass of a bisphenol A epoxy compound having an epoxy equivalent of about 184 to 194, 10 parts by mass of a hardener to be evaluated is added to prepare an epoxy resin composition; the epoxy resin composition is analyzed by differential scanning calorimetry to give an exothermic curve; and the point of intersection of a tangent line at an inflection point of the exothermic curve with a tangent line of the base line is determined as the reaction initiation temperature.

The latent hardener (E) is preferably an aromatic amine hardener (E1) or dicyandiamide or a derivative thereof (E2). The aromatic amine hardener (E1) may be any aromatic amines that are used as the epoxy resin hardener, and specific examples include 3,3'-diaminodiphenyl sulfone (3,3'-DDS), 4,4'-diaminodiphenyl sulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane-3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and 2,4,6-tris(dimethylaminomethyl)phenol 2-ethylhexanoate. These aromatic amine hardeners may be used singly or as a mixture of two or more of them.

Examples of the commercially available aromatic amine hardener (E1) include SEIKACURE S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co., Ltd.), 3,3'-DAS (manufactured by Mitsui Chemicals, Inc.), Lonzacure (registered trademark) M-DEA (manufactured by Lonza), "Lonzacure (registered trademark)" M-DIPA (manufactured by Lonza), "Lonzacure (registered trademark)" M-MIPA (manufactured by Lonza), and "Lonzacure (registered trademark)" DETDA 80 (manufactured by Lonza).

The dicyandiamide or derivatives thereof (E2) is a compound prepared by reaction of at least one of the amino group, the imino group, and the cyano group, and examples include o-tolylbiguanide, diphenylbiguanide, and products of prereaction of the amino group, the imino group, or the cyano group of dicyandiamide with an epoxy group of an epoxy compound to be used in the epoxy resin composition.

Examples of the commercially available dicyandiamide or derivatives thereof (E2) include DICY-7 and DICY-15 (manufactured by Japan Epoxy Resin Co., Ltd.).

As the hardener except the aromatic amine hardener (E1) and the dicyandiamide or derivatives thereof (E2), amines such as alicyclic amines, phenol compounds, acid anhydrides, polyaminoamides, organic acid hydrazides, and isocyanates may be used in combination with the aromatic diamine hardener.

The phenol compound used as the latent hardener (E) may be any phenol compounds exemplified as the matrix resin.

A preferred combination of the sizing agent of the present invention and the aromatic amine hardener (E1) is as below. The sizing agent and the aromatic amine hardener (E1) are mixed so that the amine equivalent/epoxy equivalent rate of the sizing agent to be applied and the aromatic amine hardener (E1) would be 0.9, and the glass transition point is determined immediately after the mixing and after storage in an environment at a temperature of 25° C. and a humidity of 60% for 20 days. A preferred combination of the sizing agent and the aromatic amine hardener (E1) has an increase in glass transition point of 25° C. or less after 20 days. When the combination having an increase in glass transition point of 25° C. or less is used to produce a prepreg, the reaction of the outer layer of the sizing agent with the inside of a matrix resin is suppressed, and this suppresses the deterioration of mechanical characteristics such as tensile strength of a carbon fiber reinforced composite material produced after the prepreg is stored for a long period of time. Such a combination is thus preferred. The increase in glass transition point is more preferably 15° C. or less. The increase in glass transition point is even more preferably 10° C. or less. The glass transition point can be determined by differential scanning calorimetry (DSC).

A preferred combination of the sizing agent of the present invention and the dicyandiamide (E2) is as below. The sizing agent and the dicyandiamide (E2) are mixed so that the amine equivalent/epoxy equivalent rate of the sizing agent to be applied and the dicyandiamide (E2) would be 1.0, and the glass transition point is determined immediately after the mixing and after storage in an environment at a temperature of 25° C. and a humidity of 60% for 20 days. A preferred combination of the sizing agent and the dicyandiamide (E2) has an increase in glass transition point of 10° C. or less after 20 days. When the combination having an increase in glass transition point of 10° C. or less is used to produce a prepreg, the reaction of the outer layer of the sizing agent with the inside of a matrix resin is suppressed, and this suppresses the deterioration of mechanical characteristics such as tensile strength of a carbon fiber reinforced composite material produced after the prepreg is stored for a long period of time. Such a combination is thus preferred. The increase in glass transition point is more preferably 8° C. or less.

The hardeners are preferably contained in a total amount so as to give an amount of an active hydrogen group ranging from 0.6 to 1.2 equivalents and more preferably ranging from 0.7 to 0.9 equivalent relative to 1 equivalent of epoxy group in all the epoxy resin components. Here, the active hydrogen group is a functional group that can react with the epoxy group of a hardener component. If the amount of an active hydrogen group is less than 0.6 equivalent, a hardened product may have insufficient reaction rate, heat resistance, and elastic modulus, and a fiber-reinforced composite material to be produced may have insufficient glass transition temperature and strength. If the amount of an active hydrogen group is more than 1.2 equivalents, a hardened product has sufficient reaction rate, glass transition temperature, and elastic modulus but has insufficient plastic deformability, and thus a carbon fiber-reinforced composite material to be produced may have insufficient impact resistance.

An epoxy resin as the thermosetting resin may contain a hardening accelerator (F) in order to accelerate the hardening.

Examples of the hardening accelerator (F) include urea compounds, tertiary amines and salts thereof, imidazole and salts thereof, triphenylphosphine and derivatives thereof, metal carboxylates, and Lewis acids, Bronsted acids, and salts thereof. Among them, the urea compound (F1) is suitably used from the viewpoint of the balance between storage stability and catalytic ability.

In particular, when used as the hardening accelerator (F), the urea compound (F1) is preferably combined with the dicyandiamide or derivatives thereof (E2) as the latent hardener (E).

Examples of the urea compound (F1) include N,N-dimethyl-N'-(3,4-dichlorophenyl)urea, toluene bis(dimethylurea), 4,4'-methylene bis(phenyldimethylurea), and 3-phenyl-1,1-dimethylurea. Examples of the commercially available urea compound include DCMU99 (manufactured by Hodogaya Chemical Co., Ltd.) and "Omicure (registered trademark)" 24, 52, and 94 (manufactured by Emerald Performance Materials, LLC).

The urea compound (F1) is preferably contained in an amount of 1 to 4 parts by mass relative to 100 parts by mass of all the epoxy resin components. If the urea compound (F1) is contained in an amount of less than 1 part by mass, a reaction may insufficiently proceed to give a hardened product having insufficient elastic modulus and heat resistance. If the urea compound is contained in an amount of more than 4 parts by mass, the self-polymerization of an epoxy compound interferes with the reaction between the epoxy compound and a hardener, and thus the hardened product may have insufficient toughness or a lower elastic modulus.

In addition, the composition may contain such an epoxy resin and a hardener or a prereacted product of some of them. The technique may be effective in viscosity control or storage stability improvement.

The prepreg of the present invention preferably contains a thermoplastic resin in order to control toughness or flowability. From the viewpoint of heat resistance, the prepreg more preferably contains at least one thermoplastic resin selected from polysulfone, polyether sulfone, polyether imide, polyimide, polyamide, polyamide imide, polyphenylene ether, a phenoxy resin, and polyolefin. The prepreg may contain an oligomer of the thermoplastic resin. The prepreg may also contain an elastomer, a filler, and other additives. The thermoplastic resin is preferably contained in the thermosetting resin constituting a prepreg. For an epoxy resin as the thermosetting resin, the thermoplastic resin may contain, for example, a thermoplastic resin soluble in the epoxy resin or organic particles such as rubber particles and thermoplastic resin particles. The thermoplastic resin soluble in the epoxy resin is preferably a thermoplastic resin having a functional group that can form a hydrogen bond and should provide an effect of improving the adhesion between the resin and carbon fibers.

The thermoplastic resin soluble in an epoxy resin and having a functional group capable of forming a hydrogen bond may be a thermoplastic resin having an alcoholic hydroxy group, a thermoplastic resin having an amide bond, and a thermoplastic resin having a sulfonyl group.

Examples of the thermoplastic resin having an alcoholic hydroxy group include polyvinyl acetal resins such as polyvinyl formal and polyvinyl butyral, polyvinyl alcohol, and phenoxy resins. Examples of the thermoplastic resin having an amide bond include polyamide, polyimide, and polyvinylpyrrolidone. Examples of the thermoplastic resin having a sulfonyl group include polysulfone. The polyamide, the polyimide, and the polysulfone may have a functional group such as an ether bond and a carbonyl group on the main chain. The polyamide may have a substituent on the nitrogen atom of an amido group.

Examples of the commercially available thermoplastic resin soluble in an epoxy resin and having a functional group capable of forming a hydrogen bond include Denka. Butyral (manufactured by Denki Kagaku Kogyo K.K.) and "Vinylec (registered trademark)" (manufactured by Chisso Corporation) as a polyvinyl acetal resin, "UCAR (registered trademark)" PKHP (manufactured by Union Carbide Corp.) as a phenoxy resin, "Macromelt (registered trademark)" (manufactured by Henkel Hakusui Corporation) and "Alanine (registered trademark)" (manufactured by Toray Industries Inc.) as a polyamide resin, "Ultem (registered trademark)" (manufactured by SABIC Innovative Plastics Japan) and "Matrimid (registered trademark)" 5218 (manufactured by Ciba) as polyimide, "SUMIKAEXCEL (registered trademark)" (manufactured by Sumitomo Chemical Co., Ltd.), "UDEL (registered trademark)"; and "RADEL (registered trademark)" (manufactured by Solvay Advanced Polymers) as polysulfone, and "Luviskol (registered trademark)" (manufactured by BASF Japan) as polyvinylpyrrolidone.

An acrylic resin, which has high compatibility with an epoxy resin, is suitably used in order to control flowability, for example, to increase flowability. Examples of the commercially available acrylic resin include "Dianal (registered trademark)" BR series (manufactured by Mitsubishi Rayon Co., Ltd.), "Matsumoto Microsphere (registered trademark)" M, M100, and M500 (manufactured by Matsumoto Yushi-Seiyaku Co., Ltd.), and "Nanostrength (registered trademark)" E40F, M22N, and M52N (manufactured by Arkema Inc.).

In particular, polyethersulfone and polyetherimide can exert such an effect without impairing heat resistance and thus are preferred. Usable examples of the polyethersulfone include "SUMIKAEXCEL" (registered trademark) 3600P, "SUMIKAEXCEL" (registered trademark) 5003P, "SUMIKAEXCEL" (registered trademark) 5200P, "SUMIKAEXCEL" (registered trademark, manufactured by Sumitomo Chemical Co., Ltd.) 7200P, "Virantage" (registered trademark) PESU VW-10200, "Virantage" (registered trademark) PESU VW-10700 (registered trademark, manufactured by Solvay Advanced Polymers), and "Ultrason" (registered trademark) 2020SR (manufactured by BASF). Usable examples of the polyetherimide include "Ultem" (registered trademark) 1000, "Ultem" (registered trademark) 1010, and "Ultem" (registered trademark) 1040 (manufactured by SABIC Innovative Plastics Japan).

Such a thermoplastic resin is preferably uniformly dissolved or finely dispersing as particles in the epoxy resin composition so as not to interfere with a production process of the prepreg, specifically, not to interfere with impregnation properties.

The thermoplastic resin to be dissolved in the epoxy resin composition is preferably added in an amount of 1 to 40 parts by mass and more preferably 1 to 25 parts by mass relative to 100 parts by mass of the epoxy resin. The thermoplastic resin to be dispersed is preferably added in an amount of 10 to 40 parts by mass and more preferably 15 to 30 parts by mass relative to 100 parts by mass of the epoxy resin. A thermoplastic resin added in an amount less than the amount above may insufficiently achieve the effect of improving toughness. A thermoplastic resin added in an amount more than the range may deteriorate the impregnation properties, tuck and drape properties, and heat resistance.

In order to improve properties of the matrix resin of the present invention, in addition to the thermoplastic resins above, a thermosetting resin except the epoxy resins, an elastomer, a filler, rubber particles, thermoplastic resin particles, inorganic particles, and other additives may be added.

The epoxy resin preferably used in the present invention may contain rubber particles. The rubber particles are preferably cross-linked rubber particles and core-shell rubber particles obtained by graft polymerization of the surface of cross-linked rubber particles with a different polymer from the viewpoint of handling properties and the like.

Examples of the commercially available cross-linked rubber particles include FX501P (manufactured by JSR Corporation) containing a cross-linked product of a carboxyl-modified butadiene-acrylonitrile copolymer, CX-MN series (manufactured by Nippon Shokubai Co., Ltd.) containing acrylic rubber microparticles, and YR-500 series (manufactured by Nippon Steel Chemical Co., Ltd.).

Examples of the commercially available core-shell rubber particles include "PARALOID (registered trademark)" EXL-2655 (manufactured by Kureha Chemical Industry Co., Ltd.) containing a butadiene-alkyl methacrylate-styrene copolymer, "STAPHYLOID (registered trademark)" AC-3355 and TR-2122 (manufactured by Takeda Pharmaceutical Company Limited) containing an acrylate-methacrylate copolymer, and "PARALOID (registered trademark)" EXL-2611 and EXL-3387 (manufactured by Rohm & Haas) and "Kane Ace (registered trademark)" MX (manufactured by Kaneka Corporation) containing a butyl acrylate-methyl methacrylate copolymer.

The thermoplastic resin particles may be the same as the various thermoplastic resins exemplified above. Specifically, the polyamide particles and the polyimide particles are preferably used. Among the polyamides, nylon 12, nylon 6, nylon 11, nylon 6/12 copolymer, and a nylon (epoxy-modified nylon) modified with an epoxy compound are preferred because the nylons can impart particularly good adhesive strength with a thermosetting resin, thus provide a carbon fiber reinforced composite material having high delamination strength at the time of drop impact, and achieve high improvement effect of impact resistance. Examples of the commercially available polyamide particles include SP-500 and SP-10 (manufactured by Toray Industries Inc.) and "Orgasol (registered trademark)" (manufactured by Arkema Inc.).

As for the shape, the thermoplastic resin particles may be spherical particles, nonspherical particles, or porous particles. The spherical particles are preferred for the reasons below. In other words, the particles do not deteriorate the flow characteristics of a resin, and thus the resin has excellent viscoelasticity. In addition, the spherical particles have no starting point of a stress concentration and impart high impact resistance. In the present invention, the epoxy resin composition may contain particles of inorganic substances such as silica, alumina, smectite, and synthetic mica to an extent not impairing the effect of the present invention in order to control flowability, for example, to optimize the viscosity of the epoxy resin composition.

In order to increase the contact probability of carbon fibers with each other and to improve the electric conductivity of a carbon fiber-reinforced composite material, the prepreg of the present invention is also preferably mixed with a conductive filler. Examples of such a conductive filler include carbon blacks, carbon nanotubes, vapor-grown carbon fibers (VGCFs), fullerenes, metal nanoparticles, carbon particles, metal-plated thermoplastic resin particles exemplified above, and metal-plated thermosetting resin particles exemplified above, and these fillers may be used singly or in combination. Among them, the carbon blacks and the carbon particles, which are inexpensive and provide high effect, are suitably used. Examples of the carbon black include furnace black, acetylene black, thermal black, channel black, and Ketjenblack, and these carbon blacks may be used as a mixture of two or more of them. Specific examples of the carbon particles include "Bell Pearl (registered trademark)" C-600, C-800, and C-2000 (manufactured by Kanebo, Ltd.) and "NICABEADS (registered trademark)" ICB, PC, and MC (manufactured by Nippon Carbon Co., Ltd.). Specific examples of the metal-plated thermosetting resin particles include "Micropearl (registered trademark)" AU215 produced by plating divinyibenzene polymer particles with nickel and further plating the particles with gold.

Next, a process for producing the prepreg of the present invention will be described.

The prepreg of the present invention is prepared by impregnating sizing agent-coated carbon fiber bundles with a thermosetting resin composition as a matrix resin. The prepreg can be prepared, for example, by a wet method of dissolving a matrix resin in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat or a method of once preparing a coating film of a matrix resin composition on a release paper or the like, next superimposing the film on each side or one side of sizing agent-coated carbon fiber bundles, and applying heat and pressure to the film to impregnate the sizing agent-coated carbon fiber bundles with the matrix resin. The hot melting method is preferred because no solvent remains in the prepreg.

The method for forming a carbon fiber reinforced composite material by using the prepreg of the present invention is exemplified by a method of stacking prepregs and thermally hardening a matrix resin while applying pressure to the laminate.

Examples of the method of applying heat and pressure include press molding, autoclave molding, bagging molding, a wrapping tape method, and internal pressure molding. To specifically produce sporting goods, the wrapping tape method and the internal pressure molding are preferably employed. For aircraft application necessitating a high quality and high performance laminated composite material, the autoclave molding is preferably employed. To produce various vehicle exteriors, the press molding is preferably employed.

The prepreg of the present invention preferably has a carbon fiber mass fraction of 40 to 90% by mass and more preferably 50 to 80% by mass. A prepreg having an excessively low carbon fiber mass fraction yields a composite material having an excess mass, and this may impair excellent specific strength and specific modulus that are advantages of a fiber-reinforced composite material. A prepreg having an excessively high carbon fiber mass fraction causes poor impregnation of a matrix resin composition, and a composite material to be produced is likely to contain many voids; which may greatly deteriorate mechanical characteristics of the composite material.

In the present invention, in addition to the method of using a prepreg, a carbon fiber reinforced composite material can be produced by any molding method such as a hand lay-up method, RTM, "SCRIMP (registered trademark)", filament winding, a pultrusion method, and a resin film infusion method, which are appropriately selected for a purpose. Any of the molding method can be employed to produce a fiber-reinforced composite material containing the sizing agent-coated carbon fibers and a hardened product of the thermosetting resin composition.

The carbon fiber reinforced composite material of the present invention is preferably used for aircraft structural members, windmill blades, automotive outer panel, computer applications such as IC trays and casings (housings) of notebook computers, and sporting goods such as golf shafts, bats, and rackets for tennis and badminton.

EXAMPLES

The present invention will next be specifically described with reference to examples, but the invention is not limited to these examples.

(1) X-Ray Photoelectron Spectroscopy for Sizing Agent Surface of Sizing Agent-Coated Carbon Fibers In the present invention, the peak ratio of (a) and (b) on the surface of a sizing agent of sizing agent-coated carbon fibers was determined by X-ray photoelectron spectroscopy using $AlK\alpha_{1,2}$ as the X-ray source in accordance with the procedure below. Sizing agent-coated carbon fibers were cut into 20-mm pieces, and the pieces were spread and arranged on a copper sample holder. $AlK\alpha_{1,2}$ was used as the X-ray source, and the measurement was carried out while the inside of a sample chamber was maintained at $1 \times 10^{-8}$ Torr. The measurement was carried out at a photoelectron takeoff angle of 15°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(2) Washing of Sizing Agent of Sizing Agent-Coated Carbon Fibers

In 50 ml of acetone, 2 g of sizing agent-coated carbon fibers were immersed and subjected to ultrasonic cleaning for 30 minutes three times. Subsequently, the carbon-fibers were immersed in 50 ml of methanol and subjected to ultrasonic cleaning for 30 minutes once, and were dried.

(3) X-Ray Photoelectron Spectroscopy of Sizing Agent-Coated Carbon Fibers at 400 eV In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers and sizing agent-coated carbon fibers from which the sizing agent was washed were cut into 20-mm pieces, and the pieces were spread and arranged on a copper sample holder. Saga synchrotron radiation was used as an X-ray source, and the measurement was carried out at an excitation energy of 400 eV while the inside of a sample chamber was maintained at $1 \times 10^{-8}$ Torr. The measurement was carried out at a photoelectron takeoff angle of 55°. As the correction for the peak associated with electrification during measurement, the binding energy value of the main peak of $C_{1s}$ was set to 286.1 eV, first. At this time; the $C_{1s}$ peak area was determined by drawing a straight base line in a range from 282 to 296 eV. The straight base line from 282 to 296 eV for calculating the $C_{1s}$ peak area was defined as the origin point: (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(4) Strand Tensile Strength and Elastic Modulus of Carbon Fiber Bundles

The strand tensile strength and the strand elastic modulus of carbon fiber bundles were determined by the test method of resin-impregnated strand described in JIS-R-7608 (2004) in accordance with the procedure below. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions were at normal pressure at a temperature of 125° C. for 30 minutes. Ten strands of carbon fiber bundles were tested, and mean values were calculated as the strand tensile strength and the strand elastic modulus.

(5) Surface Oxygen Concentration (O/C) of Carbon Fibers

The surface oxygen concentration (O/C) of carbon fibers was determined by X-ray photoelectron spectroscopy in accordance with the procedure below. First, a solvent was used to remove dust adhering to the surface of carbon fibers, then the carbon fibers were cut into about 20-mm pieces, and the pieces were spread on a copper sample holder. Next, the sample holder was set in a sample chamber, and the inside of the sample chamber was maintained at $1 \times 10^{-8}$ Torr. $AlK\alpha_{1,2}$ was used as the X-ray source, and the measurement was carried out at a photoelectron takeoff angle of 90°. As the correction value of the peak associated with electrification during measurement, the binding energy value of the main peak (peak top) of $C_{1s}$ was set to 284:6 eV. The $C_{1s}$ peak area was determined by drawing a straight base line in a range from 282 to 296 eV. The $O_{1s}$ peak area was determined by drawing a straight base line in a range from 528 to 540 eV. Here, the surface oxygen concentration is determined as an atom number ratio, using a sensitivity correction value inherent in an apparatus, from the ratio of the $O_{1s}$ peak area and the $C_{1s}$ peak area. The X-ray photoelectron spectrometer used was ESCA-1600 manufactured by Ulvac-Phi, Inc., and the sensitivity correction value inherent in the apparatus was 2.33.

(6) Surface Carboxy Group Concentration (COOH/C) and Surface Hydroxy Group Concentration (COH/C) of Carbon Fibers A surface hydroxy group concentration (COH/C) was determined by chemical modification X-ray photoelectron spectroscopy in accordance with the procedure below.

First, carbon fiber bundles from which a sizing agent and the like had been removed with a solvent were cut into pieces, and the pieces were spread and arranged on a platinum sample holder. The pieces were exposed to a dry nitrogen gas containing 0.04 mol/liter of trifluoroacetic anhydride gas at room temperature for 10 minutes, undergoing chemical modification treatment. Then, the treated pieces were mounted on an X-ray photoelectron spectrometer at a photoelectron takeoff angle of 35°. $AlK\alpha_{1,2}$ was used as the X-ray source, and the inside of the sample chamber was maintained at a degree of vacuum of $1 \times 10^{-8}$ Torr. As the correction for the peak associated with electrification during measurement, the binding energy value of the main peak of $C_{1s}$ was set to 284.6 eV, first. The $C_{1s}$ peak area $[C_{1s}]$ was determined by drawing a straight base line in a range from 282 to 296 eV, and $F_{1s}$ peak area $[F_{1s}]$ was determined by drawing a straight base line in a range from 682 to 695 eV. The reaction rate r was determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C=\{[F_{1s}]/(3k[C_{1s}]-2[F_{1s}])r\} \times 100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

A surface carboxy group concentration (COOH/C) was determined by chemical modification X-ray photoelectron spectroscopy in accordance with the procedure below. First, carbon fiber bundles from which a sizing agent and the like had been removed with a solvent were cut into pieces, and the pieces were spread and arranged on a platinum sample holder. The pieces were exposed to air containing 0.02 mol/liter of trifluoroethanol gas, 0.001 mol/liter of dicyclohexylcarbodiimide gas, and 0.04 mol/liter of pyridine gas at 60° C. for 8 hours, undergoing chemical modification treatment. Then, the treated pieces were mounted on a X-ray photoelectron spectrometer at photoelectron takeoff angle of 35°. $AlK\alpha_{1,2}$ was used as the X-ray source, and the inside of the sample chamber was maintained at a degree of vacuum of $1 \times 10^{-8}$ Torr. As the correction for the peak associated with electrification during measurement, the binding energy value of the main peak of $C_{1s}$ was set to 284.6 eV, first. The $C_{1s}$ peak area $[C_{1s}]$ was determined by drawing a straight base line in a range from 282 to 296 eV, and the $F_{1s}$ peak area $[F_{1s}]$ was determined by drawing a straight base line in a range from 682 to 695 eV. The reaction rate r was determined from $C_{1s}$ peak splitting of polyacrylic acid simultaneously subjected to chemical modification treatment, and the residual rate m of a dicyclohexylcarbodiimide derivative was determined from $O_{1s}$ peak splitting.

The surface carboxy group concentration COOH/C is expressed by the value calculated in accordance with the equation below.

$$COOH/C=\{[F_{1s}]/(3k[C_{1s}]-(2+13m)[F_{1s}])r\} \times 100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

(7) Epoxy Equivalent of Sizing Agent and Epoxy Equivalent of Sizing Agent Applied onto Carbon Fibers The epoxy equivalent of a sizing agent was determined by dissolving a sizing agent from which a solvent was removed in N,N-dimethylformamide, then cleaving the epoxy group with hydrochloric acid, and carrying out acid-base titration. The epoxy equivalent of a sizing agent applied onto carbon fibers was determined by immersing sizing agent-coated carbon fibers in N,N-dimethylformamide, carrying out ultrasonic cleaning to extract the sizing agent from the fibers, then cleaving the epoxy group with hydrochloric acid, and carrying out acid-base titration.

(8) Increase in Glass Transition Point

When aromatic amine hardeners (E-1 and E-2) were used as a hardener, a sizing agent and the latent hardener (5) were mixed so as to give an amine equivalent/epoxy equivalent ratio of 0.9, and the glass transition temperature of the prepared mixture was determined with a differential scanning calorimeter (DSC) in accordance with JIS K7121 (1987). Into a sealable sample container having a volume of 50 μl, 3 to 10 mg of a sample (test piece) was charged, then the temperature was raised at a rate of temperature rise of 10° C./min from 30 to 350° C., and the glass transition temperature was determined. The measurement equipment used here was a differential scanning calorimeter (DSC) manufactured by TA Instruments.

Specifically, in a steplike change area in the DSC curve obtained, a temperature at the intersection point of a straight line vertically equidistant from straight lines extending from base lines, and a curve in the steplike change area of glass transition was regarded as the glass transition temperature.

Next, the prepared mixture was stored in an environment at a temperature of 25° C. and a humidity of 60% for 20 days, and the glass transition temperature was determined by the procedure above. An increase in temperature from the initial state was regarded as the increase in glass transition point (corresponding to "ΔTg with a hardener" in Tables).

When dicyandiamide (E-3) was used as the hardener, a sizing agent and the latent hardener (E) were mixed so as to give an amine equivalent/epoxy equivalent ratio of 1.0, and the glass transition temperature of the mixture was determined in the same manner as the above.

Next, the prepared mixture was stored in an environment at a temperature of 25° C. and a humidity of 60% for 20 days, and the glass transition temperature was determined by the procedure. An increase in temperature from the initial state was regarded as the increase in glass transition point.

(9) Method of Determining Adhesion Amount of Sizing Agent

About 2 g of sizing agent-coated carbon fiber bundles were weighed (W1) (to the fourth decimal place) and then placed in an electric furnace (a volume of 120 cm$^3$) set at a temperature of 450° C. for 15 minutes in a nitrogen stream of 50 mL/min, and consequently the sizing agent was completely thermally decomposed. Next, the carbon fiber bundles were transferred into a container in a dry nitrogen stream of 20 liter/min, then cooled for 15 minutes, and weighed (W2) (to the fourth decimal place). The adhesion amount of the sizing agent was calculated in accordance with the equation, W1−W2. The adhesion amount of the sizing agent was converted into a value (round off the number to the second decimal place) relative to 100 parts by mass of the carbon fiber bundles to be parts by mass of the sizing agent coated. The measurement was carried out twice, and the mean value was regarded as the parts by mass of the sizing agent.

(10) Measurement of Interfacial Shear Strength (IFSS)

The interfacial shear strength (IFSS) was determined in accordance with the procedures (I) to (IV).

(I) Preparation of Resin

Into corresponding containers, 100 parts by mass of bisphenol A epoxy compound "jER (registered trademark)" 828 (manufactured by Mitsubishi Chemical Corporation) and 14.5 parts by mass of m-phenylenediamine (manufactured by Sigma-Aldrich Japan) were placed. Then, in order to reduce the viscosity of jER828 and to dissolve m-phenylenediamine, each was heated at a temperature of 75° C. for 15 minutes. Then, both were mixed, and the mixture was degassed in vacuo at a temperature of 80° C. for about 15 minutes.

(II) Fixation of Single Carbon Fiber onto Special Mold

From carbon fiber bundles, a single fiber was taken out, and both ends of the single fiber were fixed onto the longitudinal ends of a dumbbell mold while a constant tension was applied to the single fiber. Then, in order to remove water on the carbon fiber and the mold, the single fiber and the mold were subjected to vacuum drying at a temperature of 80° C. for 30 minutes or more. The dumbbell mold was made of silicone rubber and had a cast molding shape with a central width of 5 mm, a length of 25 mm, an end width of 10 mm, and a total length of 150 mm.

(III) From Casting to Hardening of Resin

Into the mold after vacuum drying in accordance with the procedure (II), the resin prepared in accordance with the procedure (I) was cast. By using an oven, the temperature of the mold was raised at a rate of temperature rise of 1.5° C./min to 75° C., and the temperature was maintained for 2 hours. Next, the temperature was raised at a rate of temperature rise of 1.5° C./min to 125° C., and the temperature was maintained for 2 hours. Then, the temperature was dropped at a rate of temperature drop of 2.5° C./min to 30° C. Subsequently, the mold was removed to give a test piece.

(IV) Measurement of Interfacial Shear Strength (IFSS)

To the test piece obtained in the procedure (III), a tensile force was applied in a fiber axis direction (longitudinal direction) to cause a distortion of 12%, and the number N of fiber breakages was determined in a central region of 22 mm on the test piece. Next, an average length of broken fibers 1a was calculated in accordance with the equation, 1a (μm) =22×1,000 (μm)/N. Then, from the average length of broken fibers 1a, a critical fiber length 1c was calculated in accordance with the equation, 1c (μm)=(4/3)×1a (μm). The strand tensile strength σ and the diameter d of a single carbon fiber were determined, and an interfacial shear strength, IFSS, was calculated as an index of the adhesive strength between carbon fibers and a resin interface in accordance with the equation below. In Examples, the test result was the average of results of the measurement number n=5.

Interfacial shear strength IFSS (MPa)=σ(MPa)×$d$ (μm)/(2×1$c$)(μm)

A test piece having an IFSS value of 43 MPa or more was evaluated as ⊚; a test piece having an IFSS value of 40 MPa or more and less than 43 MPa was evaluated as ○; a test piece having an IFSS value of 30 MPa or more and less than 40 MPa was evaluated as Δ; and a test piece having an IFSS value of less than 30 MPa was evaluated as x. ⊚ and ○ are a preferred range in the present invention.

(11) Definition of 0° of Fiber-Reinforced Composite Material

As described in JIS K7017 (1999), the fiber direction of a unidirectional fiber-reinforced composite material is regarded as an axis direction; the axis direction is defined as a 0° axis; and a direction orthogonal to the axis is defined as 90°.

(12) Measurement of 0° Tensile Strength (C) of Fiber-Reinforced Composite Material A unidirectional prepreg within 24 hours after preparation was cut into pieces with a predetermined size, and six prepreg pieces were stacked in one direction. The stacked prepreg pieces were subjected to vacuum bagging and hardened at a temperature of 180° C. and a pressure of 6 kg/cm$^2$ for 2 hours in an autoclave, thus yielding a unidirectional reinforced material (carbon fiber reinforced composite material). The unidirectional reinforced material was cut into a piece with a width of 12.7 mm and a length of 230 mm, and to each end, a glass fiber-reinforced plastic tab with a width of 1.2 mm and a length of 50 mm was bonded, thus yielding a test piece. The test piece obtained in this manner was subjected to a tensile test at a crosshead speed of 1.27 mm/min with a universal tester manufactured by Instron.

In the present invention, the 0° tensile strength value (c) MPa was divided by the strand strength value determined in (4) to indicate a strength efficiency (%) in accordance with the equation below.

Strength efficiency=tensile strength/((mass per unit area of $CF$/190)×$Vf$/100×strand strength)×100

Mass per unit area of CF=190 g/m²
Vf=56%

A test piece having a strength efficiency of 83% or more was evaluated as ⊚; a test piece having a strength efficiency of 80% or more and less than 83% was evaluated as ○; a test piece having a strength efficiency of 78% or more and less than 80% was evaluated as Δ; and a test piece having a strength efficiency of less than 78% was evaluated as x. ⊚ and ○ are a preferred range in the present invention.

(13) 0° Tensile Strength (d) of Prepreg after Storage

A prepreg was stored at a temperature of 25° C. and a humidity of 60% for 20 days, and then the 0° tensile strength (d) MPa of the prepreg was determined in the same manner as in (12). The relation between the 0° tensile strength (c) MPa of a prepreg hardened within 24 hours after preparation determined in (12) and the 0.0° tensile strength (d) MPa of a prepreg hardened after storage, that is, the decreasing rate of tensile strength was calculated in accordance with Equation (1).

$$((c)-(d))/(c)(\%) \tag{1}$$

A prepreg with a strength decreasing rate of less than 3% was evaluated as ⊚; a prepreg with a strength decreasing rate of 3% or more and less than 5% was evaluated as ○; a prepreg with a strength decreasing rate of 5% or more and less than 8% was evaluated as Δ; and a prepreg with a strength decreasing rate of 8% or more was evaluated as x. ⊚ and ○ are a preferred range in the present invention.

(14) Ratio of Aliphatic Epoxy Compound (A) Extracted

From sizing agent-coated carbon fibers, 0.1 g of a sample was weighed, and the sample was cut into a length of several centimeters. The cut sample was immersed in 10 mL of a mixed solution Of acetonitrile and chloroform (a volume ratio of 9/1), and ultrasonic cleaning was performed for 20 minutes, thus extracting a sizing agent in the mixed solution of acetonitrile and chloroform. From the solution of extract, 5 mL of the solution was collected, and nitrogen purge was carried out to remove the solvent. To the residue after the solvent removal, 0.2 mL of a mixed solution of acetonitrile and chloroform (a volume ratio of 9/1) was added, and a sample for analysis was prepared. An aliphatic epoxy compound (A) was analyzed by liquid chromatography in the following conditions:

Analytical column: Chromolith Performance RP-18e (4.6×100 mm)
Mobile phase: a water/acetonitrile system was used; from the start of analysis, to 7 minutes, the mobile phases were changed from water/acetonitrile=60%/40% to acetonitrile 100%; to 12 minutes, acetonitrile 100% was maintained; then to 12.1 minutes, the mobile phase was changed to water/acetonitrile=60%/40%; and to 17 minutes, water/acetonitrile=60%/40% was maintained.
Flow rate: 2.5 mL/min
Column temperature: 45° C.
Detector: evaporative light scattering detector (ELSD)
Detector temperature: 60° C.

(15) Surface Tensions of Aliphatic Epoxy Compound (A) and Aromatic Epoxy Compound (B1) at 125° C.

A surface tension was determined by using automatic surface tensiometer DY-500 manufactured by Kyowa Interface Science Co., Ltd. and a heater stage system as a stage for controlling the temperature of a liquid surface. In a glass container, a sizing solution containing each component alone was placed and was heated to 125° C. The apparatus was set to surface tension measurement mode, and a platinum plate was used to determine a surface tension in a static condition by the Wilhelmy method. The measurement was carried out three times, and a mean value was regarded as a surface tension at 125° C.

(16) Average Roughness (Ra) of Surface of Carbon Fibers

The average roughness (Ra) of the surface of carbon fibers was determined under an atomic force microscope (AFM). Carbon fibers were cut into pieces having a length of several millimeters, then the fiber pieces were fixed onto a substrate (silicon wafer) with a silver paste, and a three-dimensional surface shape image of the central part of each single fiber was observed under an atomic force microscope (AFM). The atomic force microscope used was NanoScope IIIa with Dimension 3000 stage system manufactured by Digital Instruments, and the observation was performed in the following observation conditions:

Scan mode: tapping mode
Probe: silicon cantilever
Scan field: 0.6 μm×0.6 μm
Scan speed: 0.3 Hz
Number of pixels: 512×512
Measurement environment: at room temperature in the atmosphere The materials and the components shown below were used in each example and each comparative example.

Component (A): A-1 to A-5
A-1: "Denacol (registered trademark)" EX-810 (manufactured by Nagase ChemteX Corporation)
Diglycidyl ether of ethylene glycol
Epoxy equivalent: 113 g/mol, the number of epoxy groups: 2
A-2: "Denacol (registered trademark)" EX-614 (manufactured by Nagase ChemteX Corporation)
Sorbitol polyglycidyl ether
Epoxy equivalent: 167 g/mol, the number of epoxy groups: 4
The number of hydroxy groups: 2
A-3: "Denacol (registered trademark)" EX-411 (manufactured by Nagase ChemteX Corporation)
Pentaerythritol polyglycidyl ether
Epoxy equivalent: 229 g/mol, the number of epoxy groups: 4
A-4: "Denacol (registered trademark)" EX-521 (manufactured by Nagase ChemteX Corporation)
Polyglycerol polyglycidyl ether
Epoxy equivalent: 183 g/mol, the number of epoxy groups: 3 or more, surface tension at 125°: 37 mJ/m²
A-5: "EPICLON (registered trademark)" HP7200 (manufactured by DIC Corporation)
Dicyclopentadiene epoxy compound
Epoxy equivalent: 255 to 260 g/eq., surface tension at 125°: 22 mJ/m²

Component (B1): B-1 to B-6
B-1: "jER (registered trademark)" 152 (manufactured by Mitsubishi Chemical Corporation)
Glycidyl ether of phenol novolac
Epoxy equivalent: 175 g/eq., the number of epoxy groups: 3, surface tension at 125°: 40 mJ/m²
B-2: "EPICLON (registered trademark)" N660 (manufactured by DIC Corporation)
Cresol novolac epoxy resin Epoxy equivalent: 210 g/eq., the number of epoxy groups: 3; surface tension at 125°: 37 mJ/m$^2$ B-3: "jER (registered trademark)" 828 (manufactured by Mitsubishi Chemical Corporation)
Diglycidyl ether of bisphenol A
Epoxy equivalent: 189 g/eq., the number of epoxy groups; 2, surface tension at 125°: 38 mJ/m$^2$ B-4: "jER (registered trademark)" 1001 (manufactured by Mitsubishi Chemical Corporation)
Diglycidyl ether of bisphenol A
Epoxy equivalent: 475 g/eq., the number of epoxy groups 2, surface tension at 125°: 38 mJ/m$^2$ B-5: "Denacol (registered trademark)" EX-731 (manufactured by Nagase ChemteX Corporation)
N-Glycidylphthalimide
Epoxy equivalent: 216 g/eq., the number of epoxy groups: 1
The number of imido groups: 1

B-6: "jER (registered trademark)" 807 (manufactured by Mitsubishi Chemical Corporation)
Diglycidyl ether of bisphenol F
Epoxy equivalent: 167 g/eq., the number of epoxy groups: 2, surface tension at 125°: 40 mJ/m$^2$ Epoxy Compound (D1): D-1 to D-3
D-1: tetraglycidyldiaminodiphenylmethane, "SUMI-EPOXY (registered trademark)" ELM434 (manufactured by Sumitomo Chemical Co., Ltd.)
Epoxy equivalent: 120 g/eq.

D-2: triglycidyl-p-aminophenol, "Araldite (registered trademark) "MY0500 (manufactured by Huntsman Advanced Materials)
Epoxy equivalent: 110 g/eq.

D-3: triglycidyl-m-aminophenol, "Araldite (registered trademark) "MY0600 (manufactured by Huntsman Advanced Materials)
Epoxy equivalent: 106 g/eq.

Epoxy Compound (D) (Except D1): D-4 to D-7
D-4: "jER (registered trademark)" 828 (manufactured by Mitsubishi Chemical Corporation)
Diglycidyl ether of bisphenol A
Epoxy equivalent: 189 g/eq.

D-5: "EPICLON (registered trademark)" N830 (manufactured by DIC Corporation)
Diglycidyl ether of bisphenol F
Epoxy equivalent: 172 g/eq.

D-6: "EPICLON (registered trademark)" HP7200L (manufactured by DIC Corporation)
Dicyclopentadiene epoxy resin
Epoxy equivalent: 247 g/eq:

D-7: "jER (registered trademark)" 1007 (manufactured by Mitsubishi Chemical Corporation)
Bisphenol A epoxy resin
Epoxy equivalent: 1975 g/eq.

Latent Hardener Component (E): E-1 to E-3
E-1: "SEIKACURE (registered trademark)" S (4,4'-diaminodiphenylsulfone, manufactured by Wakayama Seika Kogyo Co., Ltd.).
E-2: 3,3'-DAS (3,3'-diaminodiphenylsulfone, manufactured by Mitsui Fine Chemical Inc.)
E-3: DICY-7 (dicyandiamide, manufactured by Japan Epoxy Resin Co., Ltd.)

Hardening Assistant Component (F): F-1
F-1: DCMU99 (N,N-dimethyl-N'-(3,4-dichlorophenyl)urea, manufactured by Hodogaya Chemical Co., Ltd.)

Thermoplastic Resin
"Vinylec (registered trademark)" K (polyvinyl acetal resin, manufactured by Chisso Corp.)
"SUMIKAEXCEL (registered trademark)" 5003P (polyethersulfone, manufactured by Sumitomo Chemical Co., Ltd.)

Example 1

Example includes Process I, Process II, and Process III.

Process I: Process for Producing Carbon Fibers as Raw Material

A copolymer made from 99% by mol of acrylonitrile and 1% by mol of itaconic acid was dry-wet spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/l as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.15, the surface carboxy group concentration COOH/C was 0.005, and the surface hydroxy group concentration COH/C was 0.018. The carbon fibers had a surface roughness (Pa) of 3.0 nm. The obtained carbon fibers were regarded as carbon fibers A.

Process II: Process for Bonding Sizing Agent to Carbon Fibers

An aqueous dispersion emulsion containing 20 parts by mass of (B-1) as a component (B1), 20 parts by mass of a component (C), and 10 parts by mass of an emulsifier was prepared, and then 50 parts by mass of (A-4) was mixed as a component (A) to prepare a sizing solution. The component (C) used was a condensate of 2 mol of an adduct of bisphenol A with 2 mol of EO, 1.5 mol of maleic acid, and 0.5 mol of sebacic aid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent except the solvent in the sizing solution is as shown in Table 1. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0% by mass relative to the sizing agent-coated carbon fibers. Subsequently, the epoxy equivalent of the sizing agent applied onto the carbon fibers, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), the amount of the aliphatic epoxy compound (A) (A-4 in this example) extracted from the sizing agent-coated carbon fibers were determined. The results are listed in Table 1. The result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III: Production, Molding, and Evaluation of Prepreg

In a kneader, 10 parts by mass of SUMIKAEXCEL 5003P was added to 80 parts by mass of (D-1) as a component (D1) and 20 parts by mass of (D-4) as a component (D), and the whole was dissolved. Then, 40 parts by mass of 4,4'-diaminodiphenylsulfone (E-1) as a hardener component (E) was added, and the whole was kneaded, yielding an epoxy resin composition for a carbon fiber reinforced composite material.

The obtained epoxy resin composition was applied onto a release paper with a knife coater so as to give a resin mass per unit area of 52 g/m$^2$, thus yielding a resin film. The resin film was superimposed on each side of sizing agent-coated carbon fibers (a mass per unit area of 190 g/m$^2$) arranged in one direction, and heat and pressure were applied with a heat roll at a temperature of 100° C. and a pressure of 1 atm to impregnate the sizing agent-coated carbon fibers with the epoxy resin composition, thus yielding a prepreg. Next, the 0° tensile test at the initial state and the 0° tensile test after long-term storage were carried out. Table 1 shows the results. The result revealed a sufficiently high 0° tensile strength efficiency at the initial state and a small decreasing rate of the tensile strength after 20 days.

Examples 2 to 8

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the component (B1) shown in Table 1 was used as the sizing agent.

Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. All of the epoxy equivalent of the sizing agent, the chemical composition of the sizing agent surface, ΔTg, and the extraction amount of the aliphatic epoxy compound (A) were as expected, and the TFSS measurement also revealed a sufficiently high adhesiveness. Table 1 shows the results.

Process III: Production, Molding, and Evaluation of Prepreg

A prepreg was produced, molded, and evaluated in the same manner as in Example 1. The result revealed a sufficiently high 0° tensile strength efficiency at the initial state and a small decreasing rate of the tensile strength after 20 days. Table 1 shows the results.

TABLE 1

| | | | Example 1 | Example 2 | Example 3 | Example 4 | Example 5 | Example 6 | Example 7 | Example 8 |
|---|---|---|---|---|---|---|---|---|---|---|
| Carbon fibers | | Carbon fibers | A | A | A | A | A | A | A | A |
| Sizing agent | (A) | A-1 EX-810 | | | | | | | | |
| | | A-2 EX-614 | | | | | | | | |
| | | A-3 EX-411 | | | | | | | | |
| | | A-4 EX-521 | 50 | 50 | 50 | 50 | 50 | 50 | 50 | 50 |
| | | Total amount | 50 | 50 | 50 | 50 | 50 | 50 | 50 | 50 |
| | (B1) | B-1 jER152 | 20 | | | | | | | |
| | | B-2 N660 | | 20 | | | | | | |
| | | B-3 jRE828 | | | 20 | | | | 10 | 10 |
| | | B-4 jER1001 | | | | 20 | | | 10 | |
| | | B-5 EX-731 | | | | | 20 | | | |
| | | B-6 jER807 | | | | | | 20 | | 10 |
| | | Total amount | 20 | 20 | 20 | 20 | 20 | 20 | 20 | 20 |
| | (C) | C-1 Aromatic polyester | 20 | 20 | 20 | 20 | 20 | 20 | 20 | 20 |
| | Others | — Emulsifier (nonionic surfactant) | 10 | 10 | 10 | 10 | 10 | 10 | 10 | 10 |
| | | — Accelerator (DBU p-toluenesulfonate) | | | | | | | | |
| | Ratio | A/B1 (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 270 | 265 | 320 | 270 | 250 | 290 | 260 |
| Matrix resin | Epoxy resin (D1) | D-1 SUMI-EPOXY ELM434 | 80 | 80 | 80 | 80 | 80 | 80 | 80 | 80 |
| | | D-2 Araldite MY0500 | | | | | | | | |
| | | D-3 Araldite MY0600 | | | | | | | | |
| | | Total amount | 80 | 80 | 80 | 80 | 80 | 80 | 80 | 80 |
| | Epoxy resin (except D1) | D-4 jER828 | 20 | 20 | 20 | 20 | 20 | 20 | 20 | 20 |
| | | D-5 EPICLON830 | | | | | | | | |
| | | Total amount | 20 | 20 | 20 | 20 | 20 | 20 | 20 | 20 |
| | Ratio | D1/D (% by mass) | 80 | 80 | 80 | 80 | 80 | 80 | 80 | 80 |
| | Hardener (E) | E-1 4,4'-diaminodiphenylsulfone | 40 | 40 | 40 | 40 | 40 | 40 | 40 | 40 |
| | | E-2 3,3'-diaminodiphenylsulfone | | | | | | | | |
| | Thermoplastic resin | — SUMIKAEXCEL 5003P | 10 | 10 | 10 | 10 | 10 | 10 | 10 | 10 |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
| Evaluation item | Sizing agent-coated carbon fibers | Epoxy equivalent of sizing agent (g/eq.) | 420 | 440 | 430 | 530 | 450 | 410 | 470 | 420 |
|  |  | X-ray photoelectron spectroscopy analysis of sizing agent surface (a)/(b) | 0.65 | 0.66 | 0.64 | 0.71 | 0.58 | 0.63 | 0.67 | 0.63 |
|  |  | Extracted aliphatic epoxy compound (A) (parts by mass/100 parts by mass of sizing agent-coated carbon fibers) | 0.25 | 0.25 | 0.25 | 0.25 | 0.25 | 0.25 | 0.25 | 0.25 |
|  |  | ΔTg with a hardener | 19 | 18 | 20 | 18 | 27 | 20 | 19 | 20 |
|  |  | Interfacial adhesion: IFSS (MPa) | 43 ◎ | 43 ◎ | 44 ◎ | 41 ○ | 49 ○ | 46 ◎ | 43 ◎ | 44 ◎ |
|  | Carbon fiber reinforced composite material | 0° Tensile test (0 day): strength efficiency (%) | 81 ◎ | 83 ◎ | 84 ◎ | 82 ○ | 81 ○ | 84 ◎ | 83 ◎ | 81 ◎ |
|  |  | 0° Tensile test (strength decreasing rate after 20 days) | ◎ | ◎ | ◎ | ◎ | ○ | ◎ | ◎ | ◎ |

Examples 9 to 13

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as Example 1 except that the component (A) shown in Table 2 was used as the sizing agent. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. All of the epoxy equivalent of the sizing agent, the chemical composition of the sizing agent surface, ΔTg, and the extraction amount of the aliphatic epoxy compound (A) were as expected, and the IFSS measurement also revealed a sufficiently high adhesiveness. Table 2 shows the results.

Process III: Production, Molding, and Evaluation of Prepreg

A prepreg was produced, molded, and evaluated in the same manner as in Example 1. The result revealed a sufficiently high 0° tensile strength efficiency at the initial state and a small decreasing rate of the tensile strength after 20 days. Table 2 shows the results.

TABLE 2

|  |  |  |  | Example 9 | Example 10 | Example 11 | Example 12 | Example 13 |
|---|---|---|---|---|---|---|---|---|
| Carbon fibers |  |  | Carbon fibers | A | A | A | A | A |
| Sizing agent | (A) | A-1 | EX-810 | 50 |  |  | 25 |  |
|  |  | A-2 | EX-614 |  | 50 |  |  | 25 |
|  |  | A-3 | EX-411 |  |  | 50 |  |  |
|  |  | A-4 | EX-521 |  |  |  | 25 | 25 |
|  |  |  | Total amount | 50 | 50 | 50 | 50 | 50 |
|  | (B1) | B-1 | jER152 |  |  |  |  |  |
|  |  | B-2 | N660 |  |  |  |  |  |
|  |  | B-3 | jRE828 | 20 | 20 | 20 | 20 | 20 |
|  |  | B-4 | jER1001 |  |  |  |  |  |
|  |  | B-5 | EX-731 |  |  |  |  |  |
|  |  | B-6 | jER807 |  |  |  |  |  |
|  |  |  | Total amount | 20 | 20 | 20 | 20 | 20 |
|  | (C) | C-1 | Aromatic polyester | 20 | 20 | 20 | 20 | 20 |
|  | Others | — | Emulsifier (nonionic surfactant) | 10 | 10 | 10 | 10 | 10 |
|  |  | — | Accelerator (DBU p-toluenesulfonate) |  |  |  |  |  |
|  | Ratio | A/B1 | (A) (% by mass) | 71 | 71 | 71 | 71 | 71 |
|  |  |  | (B1) (% by mass) | 29 | 29 | 29 | 29 | 29 |
|  |  |  | (A) (% by mass) | 50 | 50 | 50 | 50 | 50 |
|  |  |  | (B) (% by mass) | 50 | 50 | 50 | 50 | 50 |
|  |  | Epoxy equivalent (g/eq.) |  | 255 | 290 | 270 | 260 | 275 |

TABLE 2-continued

|  |  |  |  | Example 9 | Example 10 | Example 11 | Example 12 | Example 13 |
|---|---|---|---|---|---|---|---|---|
| Matrix resin | Epoxy resin (D1) | D-1 | SUMI-EPOXY ELM434 | 80 | 80 | 80 | 80 | 80 |
|  |  | D-2 | Araldite MY0500 |  |  |  |  |  |
|  |  | D-3 | Araldite MY0600 |  |  |  |  |  |
|  |  |  | Total amount | 80 | 80 | 80 | 80 | 80 |
|  | Epoxy resin (except D1) | D-4 | jER828 | 20 | 20 | 20 | 20 | 20 |
|  |  | D-5 | EPICLON830 |  |  |  |  |  |
|  |  |  | Total amount | 20 | 20 | 20 | 20 | 20 |
|  | Ratio |  | D1/D (% by mass) | 80 | 80 | 80 | 80 | 80 |
|  | Hardener (E) | E-1 | 4,4'-diaminodiphenylsulfone | 40 | 40 | 40 | 40 | 40 |
|  |  | E-2 | 3,3'-diaminodiphenylsulfone |  |  |  |  |  |
|  | Thermoplastic resin | — | SUMIKAEXCEL 5003P | 10 | 10 | 10 | 10 | 10 |
| Evaluation item | Sizing agent-coated carbon fibers |  | Epoxy equivalent of sizing agent (g/eq.) | 415 | 475 | 440 | 420 | 450 |
|  |  |  | X-ray photoelectron spectroscopy analysis of sizing agent surface (a)/(b) | 0.56 | 0.60 | 0.70 | 0.60 | 0.62 |
|  |  |  | Extracted aliphatic epoxy compound (A) (parts by mass/100 parts by mass of sizing agent-coated carbon fibers) | 0.25 | 0.25 | 0.25 | 0.25 | 0.25 |
|  |  |  | ΔTg with a hardener | 16 | 21 | 15 | 17 | 21 |
|  |  |  | Interfacial adhesion: IFSS (MPa) | 40 | 43 | 41 | 43 | 44 |
|  |  |  |  | ○ | ◎ | ○ | ◎ | ◎ |
|  | Carbon fiber reinforced composite material |  | 0° Tensile test (0 day): strength efficiency (%) | 81 | 83 | 82 | 83 | 81 |
|  |  |  |  | ○ | ◎ | ○ | ◎ | ◎ |
|  |  |  | 0° Tensile test (strength decreasing rate after 20 days) | ◎ | ○ | ◎ | ◎ | ○ |

Examples 14 to 18

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that the sizing agent had the mass ratio shown in Table 3. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. All of the epoxy equivalent of the sizing agent, the chemical composition of the sizing agent surface, ATg, and the extraction amount of the aliphatic epoxy compound (A) were as expected, and the IFSS measurement revealed a moderate adhesiveness. Table 3 shows the results.

Process III: Production, Molding, and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 3 shows the results.

TABLE 3

|  |  |  |  |  | Example 14 | Example 15 | Example 16 | Example 17 | Example 18 |
|---|---|---|---|---|---|---|---|---|---|
| Carbon fibers |  |  | Carbon fibers |  | A | A | A | A | A |
| Sizing agent | (A) |  | A-1 | EX-810 |  |  |  |  |  |
|  |  |  | A-2 | EX-614 |  |  |  |  |  |
|  |  |  | A-3 | EX-411 |  |  |  |  |  |
|  |  |  | A-4 | EX-521 | 37 | 35 | 40 | 55 | 60 |
|  |  |  |  | Total amount | 37 | 35 | 40 | 55 | 60 |
|  | (B1) |  | B-1 | jER152 |  |  |  |  |  |
|  |  |  | B-2 | N660 |  |  |  |  |  |
|  |  |  | B-3 | jRE828 | 35 | 45 | 30 | 15 | 15 |
|  |  |  | B-4 | jER1001 |  |  |  |  |  |
|  |  |  | B-5 | EX-731 |  |  |  |  |  |
|  |  |  | B-6 | jER807 |  |  |  |  |  |
|  |  |  |  | Total amount | 33 | 45 | 30 | 15 | 15 |
|  | (C) |  | C-1 | Aromatic polyester | 20 | 10 | 20 | 20 | 20 |
|  | Others |  | — | Emulsifier (nonionic surfactant) | 10 | 10 | 10 | 10 | 5 |
|  |  |  | — | Accelerator (DBU p-toluenesulfonate) |  |  |  |  |  |

TABLE 3-continued

|  |  |  |  | Example 14 | Example 15 | Example 16 | Example 17 | Example 18 |
|---|---|---|---|---|---|---|---|---|
|  | Ratio | A/B1 | (A) (% by mass) | 53 | 44 | 57 | 79 | 80 |
|  |  |  | (B1) (% by mass) | 47 | 56 | 43 | 21 | 20 |
|  |  |  | (A) (% by mass) | 37 | 35 | 40 | 55 | 60 |
|  |  |  | (B) (% by mass) | 63 | 65 | 60 | 45 | 40 |
|  |  |  | Epoxy equivalent (g/eq.) | 265 | 230 | 265 | 260 | 245 |
| Matrix resin | Epoxy resin (D1) | D-1 | SUMI-EPOXY ELM434 | 80 | 80 | 80 | 80 | 80 |
|  |  | D-2 | Araldite MY0500 |  |  |  |  |  |
|  |  | D-3 | Araldite MY0600 |  |  |  |  |  |
|  |  |  | Total amount | 80 | 80 | 80 | 80 | 80 |
|  | Epoxy resin (except D1) | D-4 | jER828 | 20 | 20 | 20 | 20 | 20 |
|  |  | D-5 | EPICLON830 |  |  |  |  |  |
|  |  |  | Total amount | 20 | 20 | 20 | 20 | 20 |
|  | Ratio |  | D1/D (% by mass) | 80 | 80 | 80 | 80 | 80 |
|  | Hardener (E) | E-1 | 4,4'-diaminodiphenylsulfone | 40 | 40 | 40 | 40 | 40 |
|  |  | E-2 | 3,3'-diaminodiphenylsulfone |  |  |  |  |  |
|  | Thermoplastic resin | — | SUMIKAEXCEL 5003P | 10 | 10 | 10 | 10 | 10 |
| Evaluation item | Sizing agent-coated carbon fibers |  | Epoxy equivalent of sizing agent (g/eq.) | 430 | 370 | 430 | 430 | 400 |
|  |  |  | X-ray photoelectron spectroscopy analysis of sizing agent surface (a)/(b) | 0.77 | 0.79 | 0.76 | 0.66 | 0.57 |
|  |  |  | Extracted aliphatic epoxy compound (A) (parts by mass/100 parts by mass of sizing agent-coated carbon fibers) | 0.13 | 0.12 | 0.15 | 0.28 | 0.3 |
|  |  |  | ΔTg with a hardener | 17 | 16 | 18 | 21 | 22 |
|  |  |  | Interfacial adhesion: IFSS (MPa) | 41 ○ | 40 ○ | 45 ◎ | 45 ◎ | 45 ◎ |
|  | Carbon fiber reinforced composite material |  | 0° Tensile test (0 day): strength efficiency (%) | 82 ○ | 81 ○ | 83 ◎ | 84 ◎ | 83 ◎ |
|  |  |  | 0° Tensile test (strength decreasing rate after 20 days) | ◎ | ◎ | ◎ | ○ | ○ |

Example 19

Process I: Process for Producing Carbon Fibers as Raw Material

Carbon fibers were produced in the same manner as in Example 1.

Process II: Process for Bonding Sizing Agent to Carbon Fibers

In DMF, 55 parts by mass of (A-4) as the component (A), 22.5 parts by mass of (B-3) as the component (B1), and 20 parts by mass of the component (C) were dissolved to yield a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent except the solvent in the sizing solution is as shown in Table 4. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 parts by mass relative to 100 parts by mass of the surface-treated carbon fibers. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III: Production, Molding, and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 4 shows the results.

Example 20

Process I: Process for Producing Carbon Fibers as Raw Material

Carbon fibers were produced in the same manner as in Example 1.

Process II: Process for Bonding Sizing Agent to Carbon Fibers

In DMF, 60 parts by mass of (A-4) as the component (A) and 60 parts by mass of (B-3) as the component (B1) were dissolved to yield a sizing solution. The epoxy equivalent of the sizing agent except the solvent in the sizing solution is as shown in Table 4. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III: Production, Molding, and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 4 shows the results.

Example 21

Process I: Process for Producing Carbon Fibers as Raw Material

Carbon fibers were produced in the same manner as in Example 1.

Process II: Process for Bonding Sizing Agent to Carbon Fibers

A sizing solution was prepared in the same manner as in Example 1. The epoxy equivalent of the sizing agent except the solvent in the sizing solution is as shown in Table 4. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 0.6 part by mass relative to 100 parts by mass of the surface-treated carbon fibers. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III: Production, Molding, and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 4 shows the results.

Example 22

Process I: Process for Producing Carbon Fibers as Raw Material

A copolymer made from 99% by mol of acrylonitrile and 1% by mol of itaconic acid was dry-wet spun and burned to give carbon fibers having a total filament number of 24,000, a total fineness of 490 tex, a specific gravity of 1.8, a strand tensile strength of 6.3 GPa, and a strand tensile elastic modulus of 330 GPa. Next, the carbon fibers were subjected to electrolytic surface treatment using an aqueous ammonium hydrogen carbonate solution having a concentration of 0.1 mol/l as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.20, the surface carboxylic acid concentration COOH/C was 0.008, and the surface hydroxy group concentration COH/C was 0.030. The carbon fibers had a surface roughness (Ra) of 3.0 nm. The obtained carbon fibers were regarded as carbon fibers B.

Process II: Process for Bonding Sizing Agent to Carbon Fibers

Sizing agent-coated carbon fiber bundles were prepared in the same manner as in Example 3. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III: Production, Molding, and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 4 shows the results.

Example 23

Process I: Process for Producing Carbon Fibers as Raw Material

Carbon fibers were prepared in the same manner as in Example 1 except that an aqueous sulfuric acid solution having a concentration of 0.05 mol/l was used as the electrolytic solution, and the electrolytic surface treatment was carried out at a quantity of electricity of 10 coulomb per gram of carbon fibers. At this time, the surface oxygen concentration O/C was 0.09, the surface carboxylic acid concentration COOH/C was 0.004, and the surface hydroxy group concentration COH/C was 0.003. The carbon fibers had a surface roughness (Ra) of 2.9 nm. The obtained carbon fibers were regarded as carbon fibers C.

Process II: Process for Bonding-Sizing Agent to Carbon Fibers

Sizing agent-coated carbon fiber bundles were prepared in the same manner as in Example 3. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a moderate adhesiveness.

Process III: Production, Molding, and Evaluation of Prepreg

A prepreg was produced, molded, and evaluated in the same manner as in Example 1. The result revealed a good 0° tensile strength efficiency at the initial state and a moderately small decreasing rate of the tensile strength after 20 days. Table 4 shows the results.

Example 24

Process I: Process for Producing Carbon Fibers as Raw Material

A copolymer made from 99% by mol of acrylonitrile and 1% by mol of itaconic acid was wet spun and burned to give carbon fibers having a total filament, number of 12,000, a total fineness of 800 tex, a specific gravity of 1.8, a strand tensile strength of 3.9 GPa, and a strand tensile elastic modulus of 240 GPa. Next, the carbon fibers were subjected to electrolytic surface treatment using an aqueous ammonium hydrogen carbonate solution having a concentration of 0.1 mol/L as an electrolytic solution at a quantity of electricity of 40 coulomb per gram of carbon fibers. The electrolytic surface-treated carbon fibers were subsequently washed with water and dried in hot air at a temperature of 150° C. to yield carbon fibers as a raw material. At this time, the carbon fibers had a surface roughness (Ra) of 39 nm, a surface oxygen concentration O/C of 0.14, a surface carboxy group concentration COOH/C of 0.005, and a surface hydroxy group concentration COH/C of 0.018. The obtained carbon fibers were regarded as carbon fibers F.

Process II: Process for Bonding Sizing Agent to Carbon Fibers

Sizing agent-coated carbon fiber bundles were prepared in the same manner as in Example 3. As shown in Table 4, the result indicated that all of the epoxy equivalent of the sizing agent, the chemical composition of the sizing agent surface, ΔTg, and the extraction amount of the aliphatic epoxy compound (A) were as expected. The IFSS measurement also revealed a good adhesiveness.

Process III: Production, Molding, and Evaluation of Prepreg

A prepreg was produced, molded, and evaluated in the same manner as in Example 1. The result revealed a good 0° tensile strength efficiency at the initial state and a moderately small decreasing rate of the tensile strength after 20 days. Table 4 shows the results.

Example 25

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that DBU p-toluenesulfonate (U-CAT SA506 manufactured by San-Agro Ltd.) was used as an adhesion promoting component in the sizing agent and the mass ratio was as shown in Table 4. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. All of the epoxy equivalent of the sizing agent, the chemical composition of the sizing agent surface, ΔTg, and the extraction amount of the aliphatic epoxy compound (A) were as expected, and the IFSS measurement revealed a good adhesiveness. Table 4 shows the results.

Process III: Production, Molding and Evaluation of Prepreg

A prepreg was produced, molded, and evaluated in the same manner as in Example 1. The result revealed a moderate 0° tensile strength efficiency at the initial state and a moderately small decreasing rate of the tensile strength after 20 days. Table 4 shows the results.

Table 4is as follows:

TABLE 4

| | | | | Example 19 | Example 20 | Example 21 | Example 22 | Example 23 | Example 24 | Example 25 |
|---|---|---|---|---|---|---|---|---|---|---|
| Carbon fibers | | | Carbon fibers | A | A | A | B | C | F | A |
| Sizing agent | (A) | A-1 | EX-810 | | | | | | | |
| | | A-2 | EX-614 | | | | | | | |
| | | A-3 | EX-411 | | | | | | | |
| | | A-4 | EX-521 | | | | | | | |
| | | | Total amount | 55 | 60 | 50 | 50 | 50 | 50 | 50 |
| | (B1) | B-1 | jER152 | | | | | | | |
| | | B-2 | N660 | | | | | | | |
| | | B-3 | jRE828 | 22.5 | 40 | 20 | 20 | 20 | 20 | 20 |
| | | B-4 | jER1001 | | | | | | | |
| | | B-5 | EX-731 | | | | | | | |
| | | B-6 | jER807 | | | | | | | |
| | | | Total amount | 22.5 | 40 | 20 | 20 | 20 | 20 | 20 |
| | (C) | C-1 | Aromatic polyester | 22.5 | | 20 | 20 | 20 | 20 | 20 |
| | Others | — | Emulsifier (nonionic surfactant) | | | 10 | 10 | 10 | 10 | 8 |
| | | — | Accelerator (DBU p-toluenesulfonate) | | | | | | | |
| | Ratio | A/B1 | (A) (% by mass) | 71 | 60 | 71 | 71 | 71 | 71 | 71 |
| | | | (B1) (% by mass) | 29 | 40 | 29 | 29 | 29 | 29 | 29 |
| | | | (A) (% by mass) | 55 | 60 | 50 | 50 | 50 | 50 | 50 |
| | | | (B) (% by mass) | 45 | 40 | 50 | 50 | 50 | 50 | 48 |
| | | | Epoxy equivalent (g/eq.) | 240 | 185 | 265 | 265 | 265 | 265 | 265 |
| Matrix resin | Epoxy resin (D1) | D-1 | SUMI-EPOXY ELM434 | 80 | 80 | 80 | 80 | 80 | 80 | 80 |
| | | D-2 | Araldite MY0500 | | | | | | | |
| | | D-3 | Araldite MY0600 | | | | | | | |
| | | | Total amount | 80 | 80 | 80 | 80 | 80 | 80 | 80 |
| | Epoxy resin (except D1) | D-4 | jER828 | 20 | 20 | 20 | 20 | 20 | 20 | 20 |
| | | D-5 | EPICLON830 | | | | | | | |
| | | | Total amount | 20 | 20 | 20 | 20 | 20 | 20 | 20 |
| | Ratio | | D1/D (% by mass) | 80 | 80 | 80 | 80 | 80 | 80 | 80 |
| | Hardener (E) | E-1 | 4,4'-diaminodiphenylsulfone | 40 | 40 | 40 | 40 | 40 | 40 | 40 |
| | | E-2 | 3,3'-diaminodiphenylsulfone | | | | | | | |

TABLE 4-continued

|  |  |  | Example 19 | Example 20 | Example 21 | Example 22 | Example 23 | Example 24 | Example 25 |
|---|---|---|---|---|---|---|---|---|---|
| Evaluation item | Thermoplastic resin | SUMIKAEXCEL 5003P | 10 | 10 | 10 | 10 | 10 | 10 | 10 |
|  | Sizing agent-coated carbon fibers | Epoxy equivalent of sizing agent (g/eq.) | 439 | 280 | 460 | 430 | 430 | 430 | 440 |
|  |  | X-ray photoelectron spectroscopy analysis of sizing agent surface (a)/(b) | 0.70 | 0.81 | 0.82 | 0.67 | 0.53 | 0.64 | 0.64 |
|  |  | Extracted aliphatic epoxy compound (A) (parts by mass/100 parts by mass of sizing agent-coated carbon fibers) | 0.28 | 0.3 | 0.1 | 0.25 | 0.25 | 0.24 | 0.25 |
|  |  | ΔTg with a hardener | 20 | 25 | 18 | 20 | 20 | 20 | 24 |
|  |  | Interfacial adhesion: IFSS (MPa) | 45 ◎ | 45 ◎ | 44 ◎ | 50 ◎ | 40 ○ | 46 ◎ | 46 ◎ |
|  | Carbon fiber reinforced composite material | 0° Tensile test (0 day): strength efficiency (%) | 83 ◎ | 84 ◎ | 82 ○ | 84 ◎ | 90 ◎ | 84 ◎ | 82 ○ |
|  |  | 0° Tensile test (strength decreasing rate after 20 days) | ◎ | ○ | ◎ | ◎ | ◎ | ◎ | ○ |

Examples 26 to 31

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fiber bundles were prepared in the same manner as in Example 3. All of the epoxy equivalent of the sizing agent, the chemical composition of the sizing agent surface, ATg, and the extraction amount of the aliphatic epoxy compound (A) were as expected, and the IFSS measurement also revealed a good adhesiveness. Table 5 shows the results.

Process III: Production, Molding, and Evaluation of Prepreg

A prepreg was produced, molded, and evaluated in the same manner as in Example 1 except that the mass ratio was as shown in Table 5 and the epoxy compounds (D1, except D1) and the hardener were used as shown in Table 5. The result revealed a moderate 0° tensile strength efficiency at the initial state and a moderately small decreasing rate of the tensile strength after 20 days. Table 5 shows the results.

TABLE 5

|  |  |  |  | Example 26 | Example 27 | Example 28 | Example 29 | Example 30 | Example 31 |
|---|---|---|---|---|---|---|---|---|---|
| Carbon fibers |  |  | Carbon fibers | A | A | A | A | A | A |
| Sizing agent | (A) | A-1 | EX-810 |  |  |  |  |  |  |
|  |  | A-2 | EX-614 |  |  |  |  |  |  |
|  |  | A-3 | EX-411 |  |  |  |  |  |  |
|  |  | A-4 | EX-521 | 50 | 50 | 50 | 50 | 50 | 50 |
|  |  |  | Total amount | 50 | 50 | 50 | 50 | 50 | 50 |
|  | (B1) | B-1 | jER152 |  |  |  |  |  |  |
|  |  | B-2 | N660 |  |  |  |  |  |  |
|  |  | B-3 | jRE828 | 20 | 20 | 20 | 20 | 20 | 20 |
|  |  | B-4 | jER1001 |  |  |  |  |  |  |
|  |  | B-5 | EX-731 |  |  |  |  |  |  |
|  |  | B-6 | jER807 |  |  |  |  |  |  |
|  |  |  | Total amount | 20 | 20 | 20 | 20 | 20 | 20 |
|  | (C) | C-1 | Aromatic polyester | 20 | 20 | 20 | 20 | 20 | 20 |
|  | Others | — | Emulsifier (nonionic surfactant) | 10 | 10 | 10 | 10 | 10 | 10 |
|  |  | — | Accelerator (DBU p-toluenesulfonate) |  |  |  |  |  |  |
|  | Ratio |  | A/B1 (A) (% by mass) | 71 | 71 | 71 | 71 | 71 | 71 |
|  |  |  | (B1) (% by mass) | 29 | 29 | 29 | 29 | 29 | 29 |
|  |  |  | (A) (% by mass) | 50 | 50 | 50 | 50 | 50 | 50 |
|  |  |  | (B) (% by mass) | 50 | 50 | 50 | 50 | 50 | 50 |
|  |  |  | Epoxy equivalent (g/eq.) | 265 | 265 | 265 | 265 | 265 | 265 |
| Matrix resin | Epoxy resin (D1) | D-1 | SUMI-EPOXY ELM434 | 80 |  |  | 80 |  |  |
|  |  | D-2 | Araldite MY0500 |  | 80 |  |  | 80 |  |
|  |  | D-3 | Araldite MY0600 |  |  | 80 |  |  | 80 |
|  |  |  | Total amount | 80 | 80 | 80 | 80 | 80 | 80 |
|  | Epoxy resin (except D1) | D-4 | jER828 | 20 | 20 | 20 |  |  |  |
|  |  | D-5 | EPICLON830 |  |  |  | 20 | 20 | 20 |
|  |  |  | Total amount | 20 | 20 | 20 | 20 | 20 | 20 |
|  | Ratio |  | D1/D (% by mass) | 80 | 80 | 80 | 80 | 80 | 80 |
|  | Hardener (E) | E-1 | 4,4'-diaminodiphenylsulfone |  | 40 | 40 | 40 | 40 | 40 |
|  |  | E-2 | 3,3'-diaminodiphenylsulfone | 40 |  |  |  |  |  |

TABLE 5-continued

|  |  |  | Example 26 | Example 27 | Example 28 | Example 29 | Example 30 | Example 31 |
|---|---|---|---|---|---|---|---|---|
|  | Thermoplastic resin — | SUMIKAEXCEL 5003P | 10 | 10 | 10 | 10 | 10 | 10 |
| Evaluation item | Sizing agent-coated carbon fibers | Epoxy equivalent of sizing agent (g/eq.) | 430 | 430 | 430 | 430 | 430 | 430 |
|  |  | X-ray photoelectron spectroscopy analysis of sizing agent surface (a)/(b) | 0.64 | 0.64 | 0.64 | 0.64 | 0.64 | 0.64 |
|  |  | Extracted aliphatic epoxy compound (A) (parts by mass/100 parts by mass of sizing agent-coated carbon fibers) | 0.25 | 0.25 | 0.25 | 0.25 | 0.25 | 0.25 |
|  |  | ΔTg with a hardener | 18 | 20 | 20 | 20 | 20 | 20 |
|  |  | Interfacial adhesion: IFSS (MPa) | 44 ◎ | 44 ◎ | 44 ◎ | 44 ◎ | 44 ◎ | 44 ◎ |
|  | Carbon fiber reinforced composite material | 0° Tensile test (0 day): strength efficiency (%) | 80 ○ | 82 ○ | 83 ◎ | 86 ◎ | 83 ◎ | 84 ◎ |
|  |  | 0° Tensile test (strength decreasing rate after 20 days) | ○ | ◎ | ◎ | ◎ | ◎ | ◎ |

Comparative Examples 1 to 3

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that the mass ratio of the sizing agent was as shown in Table 6. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Prepreg

A prepreg was produced, molded, and evaluated in the same manner as in Example 1. The result revealed a moderately small decreasing rate of the tensile strength after 20 days but a low 0° tensile strength efficiency at the initial state.

Comparative Example 4

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that the mass ratio of the sizing agent was as shown in Table 6. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O. The ΔTg was also out of the range in the present invention. The IFSS measurement revealed a sufficiently high adhesiveness.

Process III: Production, Molding, and Evaluation of Prepreg

A prepreg was produced, molded, and evaluated in the same manner as in Example 1. The result revealed a good 0° tensile strength efficiency at the initial state but a large decreasing rate of the 0° tensile strength after 20 days.

Comparative Examples 5 and 6

Process I: Process for Producing Carbon Fibers as Paw Material

Carbon fibers were produced in the same manner as in Example 1.

Process II: Process for Bonding Sizing Agent to Carbon Fibers

Sizing agent-coated carbon fibers were obtained in the same manner as in Example 3 except that no aromatic epoxy compound (B1) was used but an aliphatic epoxy compound (A) alone was used as the epoxy compound in the sizing agent. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point (ΔTg) of a mixture of the sizing agent and a latent hardener (E), and the amount of the aliphatic epoxy compound (A) extracted from the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O. The ΔTg was also out of the range in the present invention. The IFSS measurement revealed a sufficiently high adhesiveness.

Process III: Production, Molding, and Evaluation of Prepreg

A prepreg was produced, molded, and evaluated in the same manner as in Example 1. The result revealed a high 0° tensile strength efficiency at the initial state but a large decreasing rate of the tensile strength after 20 days.

Comparative Examples 7 and 8

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that no aliphatic epoxy compound (A) was used but an aromatic epoxy compound (B1) alone was used as the epoxy compound in the sizing agent. Subsequently, the epoxy equivalent of the sizing agent, the X-ray photoelectron spectrum of the sizing agent surface, the interfacial shear strength (IFSS) of the sizing agent-coated carbon fibers, and the temperature increase of glass transition point (ΔTg) of a mixture of the sizing agent and a latent hardener (F) were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Melding, and Evaluation of Prepreg

A prepreg was produced, molded, and evaluated in the same manner as in Example 1. The result revealed a small decreasing rate of the tensile strength after 20 days but an insufficient tensile strength efficiency at the initial state.

Comparative Example 9

Process I: Process for Producing Carbon Fibers as Raw Material

Carbon fibers were produced in the same manner as in Example 1.

Process II: Process for Bonding Sizing Agent to Carbon Fibers

An aqueous solution of (A-4) was prepared as the component (A) and was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 0.50 part by mass relative to 100 parts by mass of the surface-treated carbon fibers. Subsequently, an aqueous dispersion emulsion containing 20 parts by mass of (B-3) as the component (B1), 20 parts by mass of the component (C), and 10 parts by mass of an emulsifier was prepared. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The sizing agent was applied onto the carbon fibers coated with the component (A) by immersing, and the coated carbon fibers were then treated with heat at a temperature of 210° C. for 75 seconds to yield sizing agent-coated carbon fiber bundles. The adhesion amount of the sizing agent was adjusted so as to be 0.50 part by mass relative to 100 parts by mass of the surface-treated carbon fibers. The epoxy equivalent of the sizing agent used and the temperature increase of glass transition point of a mixture with a hardener were determined at the first step and the second step, and the results are shown in Table as first step result/second step result. Subsequently, the epoxy equivalent of the sizing agent, the X-ray photoelectron spectrum of the sizing agent surface, the interfacial shear strength (IFSS) of the sizing agent-coated carbon fibers, and the amount of the aliphatic epoxy compound (A) extracted from the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (206.1 eV) assigned to C—O, and the ratio was out of the range in the present invention. The IFSS measurement revealed a sufficiently high adhesiveness.

Process III: Production, Molding, and Evaluation of Prepreg

A prepreg was produced, molded, and evaluated in the same manner as in Example 1. The result revealed a small decreasing rate of the tensile strength after 20 days but an insufficient tensile strength efficiency at the initial state.

TABLE 6

| | | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Carbon fibers | | Carbon fibers | | A | A | A | A | A | A | A | A | A |
| Sizing agent | (A) | A-1 | EX-810 | | | | | | 50 | | | |
| | | A-2 | EX-614 | | | | | | | | | |
| | | A-3 | EX-411 | | | | | | | | | |
| | | A-4 | EX-521 | 20 | 30 | 50 | 70 | 100 | 50 | | | 50 |
| | | | Total amount | 20 | 30 | 50 | 70 | 100 | 100 | 0 | 0 | 50 |
| | (B1) | B-1 | jER152 | | | | | | | | | |
| | | B-2 | N660 | | | | | | | | | |

TABLE 6-continued

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| | B-3 | jRE828 | 35 | 60 | 50 | 12 | | | 45 | 22.5 | 20 |
| | B-4 | jER1001 | | | | | | | | | |
| | B-5 | EX-731 | | | | | | | | | |
| | B-6 | jER807 | | | | | | | | 22.5 | |
| | | Total amount | 35 | 60 | 50 | 12 | 0 | 0 | 45 | 45 | 20 |
| (C) Others | C-1 | Aromatic polyester | 35 | 5 | | 12 | | | 45 | 45 | 20 |
| | — | Emulsifier (nonionic surfactant) | 10 | 5 | | 6 | | | 10 | 10 | 10 |
| | — | Accelerator (DBU p-toluenesulfonate) | | | | | | | | | |
| Ratio | A/B1 | (A) (% by mass) | 36 | 33 | 50 | 85 | 100 | 100 | 0 | 0 | 71 |
| | | (B1) (% by mass) | 64 | 67 | 50 | 15 | 0 | 0 | 100 | 100 | 29 |
| | | (A) (% by mass) | 20 | 30 | 50 | 70 | 100 | 100 | 0 | 0 | 50 |
| | | (B) (% by mass) | 80 | 70 | 50 | 30 | 0 | 0 | 100 | 100 | 50 |
| | | Epoxy equivalent (g/eq.) | 270 | 210 | 230 | 224 | 180 | 180 | 420 | 400 | 180/470 |
| Matrix resin | Epoxy resin (D1) | D-1 SUMI-EPOXY ELM434 | 80 | 80 | 80 | 80 | 80 | 80 | 80 | 80 | 80 |
| | | D-2 Araldite MY0500 | | | | | | | | | |
| | | D-3 Araldite MY0600 | | | | | | | | | |
| | | Total amount | 80 | 80 | 80 | 80 | 80 | 80 | 80 | 80 | 80 |
| Epoxy resin (except D1) | D-4 | jER828 | 20 | 20 | 20 | 20 | 20 | 20 | 20 | 20 | 20 |
| | D-5 | EPICLON830 | | | | | | | | | |
| | | Total amount | 20 | 20 | 20 | 20 | 20 | 20 | 20 | 20 | 20 |
| Ratio | | D1/D (% by mass) | 80 | 80 | 80 | 80 | 80 | 80 | 80 | 80 | 80 |
| Hardener (E) | E-1 | 4,4'-diaminodiphenylsulfone | 40 | 40 | 40 | 40 | 40 | 40 | 40 | 40 | 40 |
| | E-2 | 3,3'-diaminodiphenylsulfone | | | | | | | | | |
| Thermoplastic resin | | SUMIKAEXCEL 5003P | 10 | 10 | 10 | 10 | 10 | 10 | 10 | 10 | 10 |
| Evaluation item | Sizing agent-coated carbon fibers | Epoxy equivalent of sizing agent (g/eq.) | 430 | 320 | 330 | 350 | 270 | 260 | 900 | 700 | 450 |
| | | X-ray photoelectron spectroscopy analysis of sizing agent surface (a)/(b) | 0.91 | 0.93 | 0.91 | 0.49 | 0.29 | 0.26 | 1.01 | 0.99 | 0.98 |
| | | Extracted aliphatic epoxy compound (A) (parts by mass/100 parts by mass of sizing agent-coated carbon fibers) | 0.04 | 0.1 | 0.25 | 0.4 | 0.7 | 0.7 | — | — | 0.25 |
| | | ΔTg with a hardener | 15 | 17 | 18 | 26 | 32 | 26 | 10 | 10 | 32/10 |
| | | Interfacial adhesion: IFSS (MPa) | 34 | 34 | 36 | 45 | 46 | 41 | 25 | 24 | 44 |
| | | | Δ | Δ | Δ | ◎ | ◎ | ○ | X | X | ◎ |
| | Carbon fiber reinforced composite material | 0° Tensile test (0 day): strength efficiency (%) | 78 | 79 | 79 | 84 | 83 | 82 | 75 | 75 | 77 |
| | | | Δ | Δ | Δ | ◎ | ◎ | ○ | X | X | X |
| | | 0° Tensile test (strength decreasing rate after 20 days) | ◎ | ◎ | ◎ | X | X | X | ◎ | ◎ | ◎ |

Examples 32 to 35

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fiber bundles were prepared in the same manner as in Example 3. All of the epoxy equivalent of the sizing agent, the chemical composition of the sizing agent surface, ΔTg, and the extraction amount of the aliphatic epoxy compound (A) were as expected, and the IFSS measurement revealed a good adhesiveness. Table 7 shows the results.

Process III: Production, Molding, and Evaluation of Prepreg

A prepreg was produced, molded, and evaluated in the same manner as in Example 1 except that the mass ratio was as shown in Table 7 and the epoxy compounds (D1-except D1), the hardener (E-3), the hardening accelerator (F-1), and the thermoplastic resin were used as shown in Table 7. The result revealed a moderate 0° tensile strength efficiency at the initial state and a moderately small decreasing rate of the tensile strength after 20 days. Table 7 shows the results:

Examples 36 and 37

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fiber bundles were prepared in the same manner as in Example 3. All of the epoxy equivalent of the sizing agent, the chemical composition of the sizing agent surface, ΔTg, and the extraction amount of the aliphatic epoxy compound (A) were as expected, and the IFSS measurement revealed a good adhesiveness. Table 7 shows the results.

Process III: Production, Molding, and Evaluation of Prepreg

A prepreg was produced, molded, and evaluated in the same manner as in Example 1 except that the mass ratio was as shown in Table 7 and the epoxy compound (except D1) the hardener (E-3), the hardening accelerator (F-1), and the thermoplastic resin were used as shown in Table 7. The result revealed a moderate 0° tensile strength efficiency at the initial state and a moderately small decreasing rate of the tensile strength after 20 days. Table 7 shows the results.

Comparative Examples 10 and 11

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that no aromatic epoxy compound (B1) was used but an aliphatic epoxy compound (A) alone was used as the epoxy compound in the sizing agent. Subsequently, the epoxy equivalent of the sizing agent, the X-ray photoelectron spectrum of the sizing agent surface, the interfacial shear strength (IFSS) of the sizing agent-coated carbon fibers, the temperature increase of glass transition point ($\Delta$Tg) of a mixture of the sizing agent and a latent hardener (E), and the amount of the aliphatic epoxy compound (A) extracted from the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Prepreg

A prepreg was produced, molded, and evaluated in the same manner as in Example 1 except that the mass ratio was as shown in Table 7 and the epoxy compounds (D1, except D1), the hardener (E-3), the hardening accelerator (F-1), and the thermoplastic resin were used as shown in Table 7. The result revealed a moderate 0° tensile strength efficiency at the initial state and a large decreasing rate of the tensile strength after 20 days.

Comparative Examples 12 and 13

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 3 except that no aliphatic epoxy compound (A) was used but an aromatic epoxy compound (B1) alone was used as the epoxy compound in the sizing agent. Subsequently, the epoxy equivalent of the sizing agent, the X-ray photoelectron spectrum of the sizing agent surface, the interfacial shear strength (IFSS) of the sizing agent-coated carbon fibers, and the temperature increase of glass transition point ($\Delta$Tg) of a mixture of the sizing agent and a latent hardener (3) were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Prepreg

A prepreg was produced, molded, and evaluated in the same manner as in Example 1 except that the mass ratio was as shown in Table 7 and the epoxy compounds (D1, except D1), the hardener (3-3), the hardening accelerator (F-1), and the thermoplastic resin were used as shown in Table 7. The result revealed a small decreasing rate of the tensile strength after 20 days but an insufficient tensile strength efficiency at the initial state.

TABLE 7

| | | | Example 32 | Example 33 | Example 34 | Example 35 | Example 36 | Example 37 | Comparative Example 10 | Comparative Example 11 | Comparative Example 12 | Comparative Example 13 |
|---|---|---|---|---|---|---|---|---|---|---|---|---|
| Carbon fibers | | Carbon fibers | A | A | A | A | A | A | A | A | A | A |
| Sizing agent | (A) | A-1 EX-810 | | | | | | | | | | |
| | | A-2 EX-614 | | | | | | | | | | |
| | | A-3 EX-411 | 50 | 50 | 50 | 50 | 50 | 50 | 100 | 100 | | |
| | | A-4 EX-521 | | | | | | | | | | |
| | | Total amount | 50 | 50 | 50 | 50 | 50 | 50 | 100 | 100 | 0 | 0 |
| | (B1) | B-1 jER152 | 20 | 20 | 20 | 20 | 20 | 20 | | | 45 | 45 |
| | | B-2 N660 | | | | | | | | | | |
| | | B-3 jRE828 | | | | | | | | | | |
| | | B-4 jER1001 | | | | | | | | | | |
| | | B-5 EX-731 | | | | | | | | | | |
| | | B-6 jER807 | | | | | | | | | | |
| | | Total amount | 20 | 20 | 20 | 20 | 20 | 20 | 0 | 0 | 45 | 45 |
| | | | 20 | 20 | 20 | 20 | 20 | 20 | | | 45 | 45 |
| | | | 10 | 10 | 10 | 10 | 10 | 10 | | | 10 | 10 |
| | (C) | C-1 Aromatic polyester | | | | | | | | | | |
| | Others | — Emulsifier (nonionic surfactant) | | | | | | | | | | |
| | | — Accelerator (DBU p-toluenesulfonate) | | | | | | | | | | |
| | Ratio | A/B1 | 71 | 71 | 71 | 71 | 71 | 71 | 100 | 100 | 0 | 0 |
| | | (B1) (% by mass) | 29 | 29 | 29 | 29 | 29 | 29 | 0 | 0 | 100 | 100 |
| | | (A) (% by mass) | 50 | 50 | 50 | 50 | 50 | 50 | 100 | 100 | 0 | 0 |
| | | (B) (% by mass) | 50 | 50 | 50 | 50 | 50 | 50 | 0 | 0 | 100 | 100 |
| | | Epoxy equivalent (g/eq.) | 265 | 265 | 265 | 265 | 265 | 265 | 180 | 180 | 420 | 420 |
| Matrix resin | Epoxy resin (D1) | D-1 SUMI-EPOXY ELM434 | 60 | 60 | 60 | 60 | | | 60 | | 60 | |
| | | D-2 Araldite MY0500 | 40 | 40 | 40 | 40 | | | 40 | | 40 | |
| | | D-3 Araldite MY0600 | | | | | | | | | | |
| | | Total amount | 100 | 100 | 100 | 100 | | | 100 | | 100 | |
| | Epoxy resin (except D1) | D-4 jER828 | | | 40 | 40 | 40 | 40 | 40 | 40 | | 40 |
| | | D-6 HP7200L | | | 60 | 60 | 30 | 30 | 60 | 30 | | 30 |
| | | D-7 jER1007 | | | | | 30 | 30 | | 30 | | 30 |
| | Ratio | D1/D | | | | | | | | | | |
| | Hardener (E) | E-1 4,4′-diaminodiphenylsulfone | 5 | 5 | 5 | 5 | 5 | 5 | 5 | 5 | 5 | 5 |
| | | E-3 DICY | 3 | 3 | 3 | 3 | 3 | 3 | 3 | 3 | 3 | 3 |
| | Hardening assistant (F) | F-1 DCMU99 | | | | | | | | | | |
| | Thermoplastic resin | Vinylec K | 7 | 4 | 7 | 4 | 7 | 4 | | | | |
| | | SUMIKAEXCEL 5003P | | | | | | | 10 | 10 | 10 | |
| Evaluation item | Sizing agent-coated carbon fibers | Epoxy equivalent of sizing agent (g/eq.) | 430 | 430 | 430 | 430 | 430 | 430 | 270 | 270 | 900 | 900 |
| | | X-ray photoelectron spectroscopy analysis of sizing agent surface (a)/(b) | 0.64 | 0.64 | 0.64 | 0.64 | 0.64 | 0.64 | 0.29 | 0.29 | 1.01 | 1.01 |
| | | Extracted aliphatic epoxy compound (A) (parts by mass/100 parts by mass of sizing agent-coated carbon fibers) | 0.25 | 0.25 | 0.25 | 0.25 | 0.25 | 0.25 | 0.7 | 0.7 | — | — |
| | | ΔTg with a hardener | 7 | 7 | 7 | 7 | 7 | 7 | 11 | 11 | 5 | 5 |

TABLE 7-continued

| | | Example 32 | Example 33 | Example 34 | Example 35 | Example 36 | Example 37 | Comparative Example 10 | Comparative Example 11 | Comparative Example 12 | Comparative Example 13 |
|---|---|---|---|---|---|---|---|---|---|---|---|
| Carbon fiber reinforced composite material | Interfacial adhesion: IFSS (MPa) | 44 | 44 | 44 | 44 | 44 | 44 | 46 | 46 | 25 | 25 |
| | 0° Tensile test (0 day): strength efficiency (%) | ◎ | ◎ | ◎ | ◎ | ◎ | ◎ | ◎ | ◎ | X | X |
| | | 86 | 85 | 87 | 86 | 86 | 85 | 87 | 87 | 70 | 78 |
| | 0° Tensile test (strength decreasing rate after 20 days) | ◎ | ◎ | ◎ | ◎ | ◎ | ◎ | △ | △ | △ | △ |
| | | ◎ | ◎ | ◎ | ◎ | ◎ | ◎ | ◎ | ◎ | ◎ | ◎ |

Example 38

Example includes Process I, Process II, and Process III.

Process I: Process for Producing Carbon Fibers as Raw Material

A copolymer made from 99% by mol of acrylonitrile and 1% by mol of itaconic acid was dry-wet spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/l as an electrolytic solution at a quantity of electricity of 50 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.14, the surface carboxy group concentration COOH/C was 0.004, and the surface hydroxy group concentration COH/C was 0.018. The carbon fibers had a surface roughness (Ra) of 2.9 nm. The obtained carbon fibers were regarded as carbon fibers D.

Process II: Process for Bonding Sizing Agent to Carbon Fibers

An aqueous dispersion emulsion containing 20 parts by mass of (B-1) as the component (B1), 20 parts by mass of a component (C), and 10 parts by mass of an emulsifier was prepared, and then 55 parts by mass of (A-4) was mixed as the component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent except the solvent in the sizing solution is as shown in Table 8. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 0.7% by mass relative to the sizing agent-coated carbon fibers. Subsequently, the epoxy equivalent of the sizing agent applied onto the carbon fibers, the X-ray photoelectron spectrum of the sizing agent surface, the interfacial shear strength (IFSS) of the sizing agent-coated carbon fibers, and the storage stability of the sizing agent-coated carbon fibers were determined. The results are listed in Table 8. The result indicated that both the epoxy equivalent of the sizing agent and the chemical composition of the sizing agent surface were as expected. The IFSS measurement revealed a sufficiently high adhesiveness, and the sizing agent-coated carbon fibers were ascertained to have the stability during storage.

Process III: Production, Molding, and Evaluation of Prepreg

In a kneader, 10 parts by mass of SUMIKAEXCEL 5003P was added to 80 parts by mass of (D-1) as the component (D1) and 20 parts by mass of (D-4) as the component (except D1), and the whole was dissolved. Then, 40 parts by mass of 4,4'-diaminodiphenyl sulfone (E-1) as the hardener component (E) was added, and the whole was kneaded, yielding an epoxy resin composition for a carbon fiber reinforced composite material.

The obtained epoxy resin composition was applied onto a release paper with a knife coater so as to give a resin mass per unit area of 52 g/m$^2$, thus yielding a resin film. The resin film was superimposed on each side of sizing agent-coated carbon fibers (a mass per unit area of 190 g/m$^2$) arranged in one direction, and heat and pressure were applied with a heat roll at a temperature of 100° C. and a pressure of 1 atm to impregnate the sizing agent-coated carbon fibers with the epoxy resin composition, thus yielding a prepreg. Next, the 0° tensile test at the initial state and the 0° tensile test after long-term storage were carried out. Table 8 shows the results. The result revealed a sufficiently high 0° tensile strength efficiency at the initial state and a small decreasing rate of the tensile strength after 20 days.

Examples 39 to 44

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that the component (B1) shown in Table 8 was used as the sizing agent. Subsequently, the epoxy equivalent of the sizing agent, the X-ray photoelectron spectrum of the sizing agent surface, the interfacial shear strength (IFSS) of the sizing agent-coated carbon fibers, and the storage stability of the sizing agent-coated carbon fibers were determined. Both the epoxy equivalent of the sizing agent and the chemical composition of the sizing agent surface were as expected. The IFSS measurement revealed a sufficiently high adhesiveness, and the sizing agent-coated carbon fibers were ascertained to have the stability during storage. Table 8 shows the results.

Process III: Production, Molding, and Evaluation of Prepreg

A prepreg was produced, molded, and evaluated in the same manner as in Example 38. The result revealed a sufficiently high 0° tensile strength efficiency at the initial state and a small decrease in the tensile strength efficiency after 20 days. Table 8 shows the results.

Examples 45 and 46

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that the adhesion amount of the sizing agent was as shown in Table 8. Subsequently, the epoxy equivalent of the sizing agent, the X-ray photoelectron spectrum of the sizing agent surface, the interfacial shear strength (IFSS) of the sizing agent-coated carbon fibers, and the storage stability of the sizing agent-coated carbon fibers were determined. Both the epoxy equivalent of the sizing agent and the chemical composition of the sizing agent surface were as expected. The IFSS measurement revealed a sufficiently high adhesiveness, and the sizing agent-coated carbon fibers were ascertained to have the stability during storage. Table 8 shows the results.

Process III: Production, Molding, and Evaluation of Prepreg

A prepreg was produced, molded, and evaluated in the same manner as in Example 38. The result revealed a sufficiently high 0° tensile strength efficiency at the initial state and a small decrease in the tensile strength efficiency after 20 days. Table 8 shows the results.

Example 47

Process I: Process for Producing. Carbon Fibers as Raw Material

Carbon fibers were produced in the same manner as in Example 38 except that an aqueous sulfuric acid solution having a concentration of 0.05 mol/l was used as the electrolytic solution, and the electrolytic surface treatment was carried out at a quantity of electricity of 8 coulomb per gram of carbon fibers. At this time, the surface oxygen concentration O/C was 0.08, the surface carboxy group concentration COOH/C was 0.003, and the surface hydroxy group concentration COH/C was 0.003. The carbon fibers had a surface roughness (Ra) of 2.9 nm. The obtained carbon fibers were regarded as carbon fibers E.

Process II: Process for Bonding Sizing Agent to Carbon Fibers

Sizing agent-coated carbon fibers were obtained in the same manner as in Example 38. Subsequently, the epoxy equivalent of the sizing agent, the X-ray photoelectron spectrum of the sizing agent surface, the interfacial shear strength (IFSS) of the sizing agent-coated carbon fibers, and the storage stability of the sizing agent-coated carbon fibers were determined. Both the epoxy equivalent of the sizing agent and the chemical composition of the sizing agent surface were as expected. The IFSS measurement revealed a sufficiently high adhesiveness, and the sizing agent-coated carbon fibers were ascertained to have the stability during storage. Table 8 shows the results.

Process III: Production, Molding, and Evaluation of Prepreg

A prepreg was produced, molded, and evaluated in the same manner as in Example 38. The result revealed a sufficiently high 0 tensile strength efficiency at the initial state and a small decrease in the tensile strength efficiency after 20 days. Table 8 shows the results.

TABLE 8

| | | | Example 38 | Example 39 | Example 40 | Example 41 | Example 42 | Example 43 | Example 44 | Example 45 | Example 46 | Example 47 |
|---|---|---|---|---|---|---|---|---|---|---|---|---|
| Carbon fibers | | Carbon fibers | D | D | D | D | D | D | D | D | D | E |
| Sizing agent | (A) | A-5 HP7200 | 55 | 55 | 55 | 55 | 55 | 55 | 55 | 55 | 55 | 55 |
| | | A-4 EX-521 | | | | | | | | | | |
| | | Total amount | 55 | 55 | 55 | 55 | 55 | 55 | 55 | 55 | 55 | 55 |
| | (B1) | B-1 jER152 | 20 | | | | | | | 20 | 20 | 20 |
| | | B-2 N660 | | 20 | | | | | | | | |
| | | B-3 jRE828 | | | 20 | | | 10 | 10 | | | |
| | | B-4 jER1001 | | | | | 20 | 10 | | | | |
| | | B-5 jER807 | | | | 20 | | | | | | |
| | | Total amount | 20 | 20 | 20 | 20 | 20 | 20 | 10 | 20 | 20 | 20 |
| | (C) | C-1 Aromatic polyester | 15 | 15 | 15 | 15 | 15 | 15 | 15 | 15 | 15 | 15 |
| | Others | — Emulsifier (nonionic surfactant) | 10 | 10 | 10 | 10 | 10 | 10 | 10 | 10 | 10 | 10 |
| | Ratio | A/B1 (A) (% by mass) | 73 | 73 | 73 | 73 | 73 | 73 | 73 | 73 | 73 | 73 |
| | | (B1) (% by mass) | 27 | 27 | 27 | 27 | 27 | 27 | 27 | 27 | 27 | 27 |
| | | (A) (% by mass) | 55 | 55 | 55 | 55 | 55 | 55 | 55 | 55 | 55 | 55 |
| | | (B) (% by mass) | 45 | 45 | 45 | 45 | 45 | 45 | 45 | 45 | 45 | 45 |
| | | Epoxy equivalent (g/eq.) | 240 | 250 | 250 | 290 | 240 | 270 | 240 | 240 | 240 | 240 |
| | | Adhesion amount of sizing agent (% by mass) | 0.7 | 0.7 | 0.7 | 0.7 | 0.7 | 0.7 | 0.7 | 1.2 | 0.4 | 0.7 |
| Matrix resin | Epoxy compound (D1) | D-1 SUMI-EPOXY ELM434 | 80 | 80 | 80 | 80 | 80 | 80 | 80 | 80 | 80 | 80 |
| | | D-2 Araldite MY0500 | | | | | | | | | | |
| | | D-3 Araldite MY0600 | | | | | | | | | | |
| | | Total amount | 80 | 80 | 80 | 80 | 80 | 80 | 80 | 80 | 80 | 80 |
| | Epoxy compound (except D1) | D-4 jER828 | 20 | 20 | 20 | 20 | 20 | 20 | 20 | 20 | 20 | 20 |
| | | D-5 EPICLON830 | | | | | | | | | | |
| | Ratio | D1/D (% by mass) | 80 | 80 | 80 | 80 | 80 | 80 | 80 | 80 | 80 | 80 |
| | Hardener (E) | E-1 4,4′-diaminodiphenylsulfone | 20 | 20 | 20 | 20 | 20 | 20 | 20 | 20 | 20 | 20 |
| | | E-2 3,3′-diaminodiphenylsulfone | 40 | 40 | 40 | 40 | 40 | 40 | 40 | 40 | 40 | 40 |
| | Thermoplastic resin | — SUMIKAEXCEL 5003P | 10 | 10 | 10 | 10 | 10 | 10 | 10 | 10 | 10 | 10 |
| Evaluation item | Sizing agent-coated carbon fibers | Epoxy equivalent of sizing agent (g/eq.) | 390 | 405 | 405 | 475 | 390 | 440 | 390 | 410 | 380 | 390 |
| | | X-ray photoelectron spectroscopy analysis of sizing agent surface (a)/(b) | 0.63 | 0.64 | 0.62 | 0.69 | 0.61 | 0.65 | 0.61 | 0.65 | 0.65 | 0.65 |
| | | Extracted aliphatic epoxy compound (A) (parts by mass) | 0.14 | 0.14 | 0.14 | 0.14 | 0.14 | 0.14 | 0.14 | 0.4 | 0.05 | 0.14 |
| | | ΔTg with a hardener | 20 | 19 | 21 | 19 | 21 | 20 | 21 | 19 | 19 | 19 |
| | | Interfacial adhesion: IFSS (MPa) | 43 | 42 | 43 | 40 | 45 | 42 | 41 | 42 | 41 | 39 |
| | | stability | ◎ | ○ | ◎ | ○ | ◎ | ○ | ○ | ○ | ○ | ○ |
| | | 0° Tensile test (0 day): strength | ○ | ○ | ○ | ○ | ○ | ○ | ○ | ○ | ○ | ○ |
| | Carbon fiber reinforced composite material | 0° Tensile test efficiency (%) | 84 | 84 | 85 | 83 | 85 | 84 | 84 | 84 | 84 | 80 |
| | | 0° Tensile test (strength decreasing rate after 20 days) | ○ | ◎ | ◎ | ○ | ◎ | ◎ | ◎ | ○ | ○ | ◎ |
| | | | ◎ | ◎ | ◎ | ◎ | ◎ | ◎ | ◎ | ○ | ○ | ◎ |

(Examples 48 to 51)

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected, and the IFSS measurement revealed a moderate adhesiveness. Table 9 shows the results.

Process III: Production, Molding, and Evaluation of Prepreg

A prepreg was produced, molded, and evaluated in the same manner as in Example 38 except that the epoxy compounds (D1, except D1) and the hardener (E) were used as shown in Table 9. The result revealed a sufficiently high 0° tensile strength efficiency at the initial state and a small decrease in the tensile strength efficiency after 20 days. Table 9 shows the results.

TABLE 9

| | | | | Example 48 | Example 49 | Example 50 | Example 51 |
|---|---|---|---|---|---|---|---|
| Carbon fibers | | | Carbon fibers | D | D | D | D |
| Sizing agent | (A) | A-5 | HP7200 | | | | |
| | | A-4 | EX-521 | 55 | 55 | 55 | 55 |
| | | | Total amount | 55 | 55 | 55 | 55 |
| | (B1) | B-1 | jER152 | 20 | 20 | 20 | 20 |
| | | B-2 | N660 | | | | |
| | | B-3 | jRE828 | | | | |
| | | B-4 | jER1001 | | | | |
| | | B-6 | jER807 | | | | |
| | | | Total amount | 20 | 20 | 20 | 20 |
| | (C) | C-1 | Aromatic polyester | 15 | 15 | 15 | 15 |
| | Others | — | Emulsifier (nonionic surfactant) | 10 | 10 | 10 | 10 |
| | Ratio | A/B1 | (A) (% by mass) | 73 | 73 | 73 | 73 |
| | | | (B1) (% by mass) | 27 | 27 | 27 | 27 |
| | | | (A) (% by mass) | 55 | 55 | 55 | 55 |
| | | | (B) (% by mass) | 45 | 45 | 45 | 45 |
| | | | Epoxy equivalent (g/eq.) | 240 | 240 | 240 | 240 |
| | | | Adhesion amount of sizing agent (% by mass) | 0.7 | 0.7 | 0.7 | 0.7 |
| Matrix resin | Epoxy compound (D1) | D-1 | SUMI-EPOXY ELM434 | 80 | | | |
| | | D-2 | Araldite MY0500 | | 80 | | |
| | | D-3 | Araldite MY0600 | | | 80 | |
| | | | Total amount | 80 | 80 | 80 | 80 |
| | Epoxy compound (except D1) | D-4 | jER828 | 20 | 20 | 20 | |
| | | D-5 | EPICLON830 | | | | 20 |
| | | | Total amount | 20 | 20 | 20 | 20 |
| | Ratio | | D1/D (% by mass) | 80 | 80 | 80 | 80 |
| | Hardener (E) | E-1 | 4,4'-diaminodiphenylsulfone | | 40 | 40 | 40 |
| | | E-2 | 3,3'-diaminodiphenylsulfone | 40 | | | |
| | Thermoplastic resin | — | SUMIKAEXCEL 5003P | 10 | 10 | 10 | 10 |
| Evaluation item | Sizing agent-coated carbon fibers | | Epoxy equivalent of sizing agent (g/eq.) | 390 | 390 | 390 | 390 |
| | | | X-ray photoelectron spectroscopy analysis of sizing agent surface (a)/(b) | 0.63 | 0.63 | 0.63 | 0.63 |
| | | | Extracted aliphatic epoxy compound (A) (parts by mass) | 0.14 | 0.14 | 0.14 | 0.14 |
| | | | ΔTg with a hardener | 22 | 20 | 20 | 20 |
| | | | Interfacial adhesion IFSS (MPa) | 43 | 43 | 43 | 43 |
| | | | | ◎ | ◎ | ◎ | ◎ |
| | | | stability | ○ | ○ | ○ | ○ |
| | Carbon fiber reinforced composite material | | 0° Tensile test (0 day): strength efficiency (%) | 83 | 83 | 83 | 83 |
| | | | | ◎ | ◎ | ◎ | ◎ |
| | | | 0° Tensile test (strength decreasing rate after 20 days) | ○ | ◎ | ◎ | ◎ |

Reference Example 1

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that (A-5) was used as the component (A) in the sizing agent. Subsequently, the epoxy equivalent of the sizing agent, the X-ray photoelectron spectrum of the sizing agent surface, the interfacial shear strength (IFSS) of the sizing agent-coated carbon fibers, and the storage stability were determined.

Process III: Production, Molding, and Evaluation of Prepreg

A prepreg was produced, molded, and evaluated in the same manner as in Example 38.

Comparative Example 14

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that no component (A) was used as the sizing agent and the other components were used in the ratio shown in Table 10. Subsequently, the epoxy equivalent of the sizing agent, the X-ray photoelectron spectrum of the sizing agent surface, the interfacial shear strength (IFSS) of the sizing agent-coated carbon fibers, and the storage stability were determined. In the $C_{1s}$ core spectrum of the surface of the sizing agent analyzed by X-ray photoelectron spectroscopy at a photoelectron takeoff angle of 15, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. No bleed out of the sizing agent was observed, but the IFSS measurement revealed a low adhesiveness.

Process III: Production, Molding, and Evaluation of Prepreg

A prepreg was produced, molded, and evaluated in the same manner as in Example 38. The result revealed a moderately small decreasing rate of the tensile strength after 20 days but a low 0° tensile strength efficiency at the initial state.

Comparative Example 15

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that no aromatic epoxy compound (B1) was used but an aliphatic epoxy compound (A) alone was used as the epoxy compound in the sizing agent, and the adhesion amount of the sizing agent was 0.3% by mass. Subsequently, the epoxy equivalent of the sizing agent, the X-ray photoelectron spectrum of the sizing agent surface, the interfacial shear strength (IFSS) of the sizing agent-coated carbon fibers, and the storage stability were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. No bleed out of the sizing agent was observed, and the IFSS measurement revealed a sufficiently high adhesiveness.

Process III: Production, Molding, and Evaluation of Prepreg

A prepreg was produced, molded, and evaluated in the same manner as in Example 38. The result revealed a high 0° tensile strength efficiency at the initial state but a large decreasing rate of the tensile strength after 20 days.

Comparative Example 16

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that the ratio of the sizing agent was as shown in Table 10. Subsequently, the epoxy equivalent of the sizing agent, the X-ray photoelectron spectrum of the sizing agent surface, the interfacial shear strength (IFSS) of the sizing agent-coated carbon fibers, and the storage stability were determined. The chemical composition of the sizing agent surface was as expected, and no bleed out of the sizing agent was observed, but the IFSS measurement revealed a low adhesiveness.

Process III: Production, Molding, and Evaluation of Prepreg

A prepreg was produced, molded, and evaluated in the same manner as in Example 38. The result revealed a small decreasing rate of the tensile strength after 20 days but an insufficient tensile strength efficiency at the initial state.

Comparative Example 17

Process I: Process for Producing Carbon Fibers as Raw Material

Carbon fibers were produced in the same manner as in Example 38.

Process II: Process for Bonding Sizing Agent to Carbon Fibers

Sizing agent-coated carbon fibers were obtained in the same manner as in Example 38 except that the ratio of the sizing agent was as shown in Table 10. Subsequently, the epoxy equivalent of the sizing agent, the X-ray photoelectron spectrum of the sizing agent surface, the interfacial shear strength (IFSS) of the sizing agent-coated carbon fibers, and the storage stability were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1.0V) assigned to C—O, and the ratio was out of the range in the present invention. No bleed out of the sizing agent was observed, and the IFSS measurement revealed a high adhesiveness.

Process III: Production, Molding, and Evaluation of Prepreg

A prepreg was produced, molded, and evaluated in the same manner as in Example 38. The result revealed a sufficient tensile strength efficiency at the initial state. However, the tensile strength greatly reduced after 20 days.

Comparative Example 18

Process I: Process for Producing Carbon Fibers as Raw Material

Carbon fibers were produced in the same manner as in Example 38.

Process II: Process for Bonding Sizing Agent to Carbon Fibers

An aqueous solution of (A-4) was prepared as the component (A) and was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 0.40% by mass relative to the sizing agent-coated carbon fibers. Subsequently, an aqueous dispersion emulsion containing 20 parts by mass of (B-1) as the component (B1), 15 parts by mass of a component (C), and 10 parts by mass of an emulsifier was prepared. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The sizing agent was applied onto the carbon fibers coated with the component (A) by immersing, and the coated carbon fibers were then treated with heat at a temperature of 210° C. for 75 seconds to yield sizing agent-coated carbon fiber bundles. The adhesion amount of the sizing agent was adjusted so as to be 0.30% by mass relative to the sizing agent-coated carbon fibers. The epoxy equivalent of the sizing agent used and the temperature increase of glass transition point of a mixture with a hardener were determined at the first step and the second step, and the results are shown in Table as first step result/second step result. Subsequently, the epoxy equivalent of the sizing agent, the X-ray photoelectron spectrum of the sizing agent surface, the interfacial shear strength (IFSS) of the sizing agent-coated carbon fibers, and the storage stability were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. It was revealed that the storage stability and the adhesiveness determined by IFSS were sufficiently high.

Process III: Production, Molding, and Evaluation of Prepreg

A prepreg was produced, molded, and evaluated in the same manner as in Example 38. The result revealed a small decreasing rate of the tensile strength after 20 days but an insufficient tensile strength efficiency at the initial state.

TABLE 10

| | | | | Reference Example 1 | Comparative Example 14 | Comparative Example 15 | Comparative Example 16 | Comparative Example 17 | Comparative Example 18 |
|---|---|---|---|---|---|---|---|---|---|
| Carbon fibers | | | Carbon fibers | A | A | A | A | A | A |
| Sizing agent | (A) | A-5 | HP7200 | 55 | | | | | |
| | | A-4 | EX-521 | | | 100 | 30 | 70 | 55 |
| | | | Total amount | 55 | 0 | 100 | 30 | 70 | 55 |
| | (B1) | B-1 | jER152 | 20 | 50 | | 30 | 12 | 20 |
| | | B-2 | N660 | | | | | | |
| | | B-3 | jRE828 | | | | | | |
| | | B-4 | jER1001 | | | | | | |
| | | B-6 | jER807 | | | | | | |
| | | | Total amount | 20 | 50 | 0 | 30 | 12 | 20 |
| | (C) | C-1 | Aromatic polyester | 15 | 30 | | 30 | 12 | 15 |
| | Others | — | Emulsifier (nonionic surfactant) | 10 | 20 | | 10 | 6 | 10 |
| | Ratio | A/B1 | (A) (% by mass) | 73 | 0 | 100 | 50 | 85 | 73 |
| | | | (B1) (% by mass) | 27 | 100 | 0 | 50 | 15 | 27 |
| | | | (A) (% by mass) | 55 | 0 | 100 | 30 | 70 | 55 |
| | | | (B) (% by mass) | 45 | 100 | 0 | 30 | 30 | 45 |
| | | | Epoxy equivalent (g/eq.) | 280 | 350 | 180 | 300 | 220 | 350 + 180 |
| | | | Adhesion amount of sizing agent (% by mass) | 0.7 | 0.7 | 0.3 | 0.7 | 0.7 | 0.4 + 0.3 |
| Matrix resin | Epoxy compound (D1) | D-1 | SUMI-EPOXY ELM434 | 80 | 80 | 80 | 80 | 80 | 80 |
| | | D-2 | Araldite MY0500 | | | | | | |
| | | D-3 | Araldite MY0600 | | | | | | |
| | | | Total amount | 80 | 80 | 80 | 80 | 80 | 80 |

TABLE 10-continued

|  |  |  | Reference Example 1 | Comparative Example 14 | Comparative Example 15 | Comparative Example 16 | Comparative Example 17 | Comparative Example 18 |
|---|---|---|---|---|---|---|---|---|
|  | Epoxy compound (except D1) | D-4 jER828<br>D-5 EPICLON830 | 20 | 20 | 20 | 20 | 20 | 20 |
|  |  | Total amount | 20 | 20 | 20 | 20 | 20 | 20 |
|  | Ratio |  D1/D (% by mass) | 80 | 80 | 80 | 80 | 80 | 80 |
|  | Hardener (E) | E-1 4,4'-diaminodiphenylsulfone<br>E-2 3,3'-diaminodiphenylsulfone | 40 | 40 | 40 | 40 | 40 | 40 |
|  | Thermoplastic resin | — SUMIKAEXCEL 5003P | 10 | 10 | 10 | 10 | 10 | 10 |
| Evaluation item | Sizing agent-coated carbon fibers | Epoxy equivalent of sizing agent (g/eq.) | 460 | 600 | 285 | 470 | 350 | 400 |
|  |  | X-ray photoelectron spectroscopy analysis of sizing agent surface (a)/(b) | 0.65 | 0.99 | 0.29 | 0.83 | 0.49 | 0.98 |
|  |  | Extracted aliphatic epoxy compound (A) (parts by mass) | 0.14 | 0 | 0.13 | 0.05 | 0.25 | 0.13 |
|  |  | ΔTg with a hardener | 15 | 10 | 32 | 17 | 19 | 20 |
|  |  | Interfacial adhesion IFSS (MPa) | 25 | 24 | 46 | 30 | 43 | 44 |
|  |  |  | X | X | ◎ | Δ | ◎ | ◎ |
|  |  | stability | X | ○ | ○ | ○ | ○ | ○ |
|  | Carbon fiber reinforced composite material | 0° Tensile test (0 day): strength efficiency (%) | 75 | 75 | 83 | 78 | 83 | 77 |
|  |  |  | X | X | ◎ | X | ◎ | X |
|  |  | 0° Tensile test (strength decreasing rate after 20 days) | ◎ | ◎ | X | ◎ | Δ | ◎ |

Example 52

In 50 ml of acetone, 2 g of the sizing agent-coated carbon fibers obtained in Example 1 were immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agent remaining after the cleaning were determined. The results are as shown in Table 11.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy of 284.6 eV assigned to CHx, C—C, and C═C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) are as shown in Table 11.

Examples 53 to 56

In the same manner as in Example 52, the sizing agent-coated carbon fibers obtained in Example 3, Example 9, Example 15, and Example 18 were used, and X-ray photoelectron spectroscopic analysis was carried out by using an X ray at 400 eV before and after the cleaning; The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 11 shows the results.

Comparative Example 19

In the same manner as in Example 52, the sizing agent-coated carbon fibers obtained in Comparative Example 5 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and CC and (b) is the height (cps) of a component at a binding energy (286.1 eV) assigned to C—O in the $C_{1s}$ core spectrum. Table 11 shows the results, which indicates a large (II/I) ratio. This revealed that no inclined structure was achieved in the sizing agent.

Comparative Example 20

In the same manner as in Example 52, the sizing agent-coated carbon fibers obtained in Comparative Example 7 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 11 shows the results, which indicates a large (II/I) ratio. This revealed that no inclined structure was achieved in the sizing agent.

Comparative Example 21

In the same manner as in Example 52, the sizing agent-coated carbon fibers obtained in Comparative Example 9 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 11 shows the results, which indicates a small (II/I) ratio.

TABLE 11

|  |  | Example 52 | Example 53 | Example 54 | Example 55 | Example 56 | Comparative Example 19 | Comparative Example 20 | Comparative Example 21 |
|---|---|---|---|---|---|---|---|---|---|
| Sizing agent-coated carbon fibers | | Example 1 | Example 3 | Example 9 | Example 15 | Example 18 | Comparative Example 5 | Comparative Example 7 | Comparative Example 9 |
| | Adhesion amount of sizing agent after cleaning of sizing agent | 0.18 | 0.18 | 0.18 | 0.18 | 0.18 | 0.18 | 0.12 | 0.18 |
| XPS (400 eV) | (I) | 0.67 | 0.67 | 0.57 | 0.8 | 0.58 | 0.29 | 1.01 | 0.98 |
| | (II)/(I) | 0.7 | 0.7 | 0.8 | 0.74 | 0.74 | 1 | 1 | 0.3 |

INDUSTRIAL APPLICABILITY

The sizing agent-coated carbon fibers and the process for producing the sizing agent-coated carbon fibers of the present invention achieve excellent adhesion, provide a prepreg having long-term stability and high-order processability, and thus are preferably applied to woven fabrics and prepregs. The prepreg and the carbon fiber reinforced composite material of the present invention are lightweight but excellent in strength and elastic modulus and thus are suitably used in various fields including aircraft members, spacecraft members, automobile members, ship members, constructional materials, and sporting goods.

The invention claimed is:

1. Sizing agent-coated carbon fibers comprising:
a sizing agent coating that includes:
an aliphatic epoxy compound (A) that has three or more epoxy groups and at least one hydroxy group in a molecule,
an aromatic epoxy compound (B1) as a type of aromatic compound (B), and
an aromatic ester compound (C1); and
carbon fibers coated with the sizing agent,
wherein
the sizing agent contains the aliphatic epoxy compound (A) in an amount of 35 to 65% by mass relative to the total amount of the sizing agent exclusive of solvent;
the sizing agent contains the aliphatic epoxy compound (A) and the aromatic epoxy compound (B1) in a mass ratio (A)/(B1) of 52/48 to 80/20;
the sizing agent contains the aromatic ester compound (C1) in an amount of 2 to 35% by mass relative to the total amount of the sizing agent exclusive of solvent;
each of the aliphatic epoxy compound (A) and the aromatic epoxy compound (B1) has a surface tension of 35 to 45 mJ/m$^2$ at 125° C.;
the sizing agent-coated carbon fibers have an (a)/(b) ratio of 0.50 to 0.90, wherein (a) is a height (cps) of a component at a binding energy (284.6 eV) assigned to CHx, C—C, and C═C and (b) is a height (cps) of a component at a binding energy (286.1 eV) assigned to C—C in a $C_{1s}$ core spectrum of a surface of the sizing agent applied onto the carbon fibers analyzed by X-ray photoelectron spectroscopy using AlKα$_{1,2}$ as an X-ray source at a photoelectron takeoff angle of 15°; and
the carbon fibers have a surface carboxy group concentration COOH/C of 0.003 to 0.015 and a surface hydroxy group concentration COH/C of 0.001 to 0.050 determined by chemical modification X-ray photoelectron spectroscopy.

2. The sizing agent-coated carbon fibers according to claim 1, wherein when the sizing agent-coated carbon fibers are subjected to ultrasonication in a mixed solvent of acetonitrile and chloroform to extract the applied sizing agent, the aliphatic epoxy compound (A) is extracted in a ratio of 0.3 part by mass or less relative to 100 parts by mass of the sizing agent-coated carbon fibers.

3. The sizing agent-coated carbon fibers according to claim 1, wherein the sizing agent applied onto the carbon fibers has an epoxy equivalent of 350 to 550 g/eq.

4. The sizing agent-coated carbon fibers according to claim 1, wherein the sizing agent contains the aromatic compound (B) in an amount of 35 to 60% by mass relative to a total amount of the sizing agent except a solvent.

5. The sizing agent-coated carbon fibers according to claim 1, wherein the aliphatic epoxy compound (A) is a polyether polyepoxy compound having three or more epoxy groups in a molecule and/or a polyol polyepoxy compound having three or more epoxy groups in a molecule.

6. The sizing agent-coated carbon fibers according to claim 1, wherein the aromatic epoxy compound (B1) is a bisphenol A epoxy compound or a bisphenol F epoxy compound.

7. The sizing agent-coated carbon fibers according to claim 1, wherein relation (III):

$$0.50 \leq (I) \leq 0.90 \text{ and } 0.6 < (II)/(I) < 1.0 \quad \text{(III)}$$

is satisfied where (I) is a value of (a)/(b) of a surface of the sizing agent-coated carbon fibers before ultrasonication, (II) is the value of (a)/(b) of the surface of the sizing agent-coated carbon fibers of which an adhesion amount of the sizing agent is reduced to 0.09 to 0.20% by mass by ultrasonic cleaning of the sizing agent-coated carbon fibers in an acetone solvent, (a) is the height (cps) of a component at a binding energy (284.6 eV) assigned to CHx, C—C, and C═C, and (b) is the height (cps) of a component at a binding energy (286.1 eV) assigned to C—O in a $C_{1s}$ core spectrum of the sizing agent-coated carbon fibers analyzed by X-ray photoelectron spectroscopy using an X-ray at 400 eV at a photoelectron takeoff angle of 55°.

8. The sizing agent-coated carbon fibers according to claim 1, wherein the aliphatic epoxy compound (A) adheres onto the carbon fibers in an amount of 0.2 to 2.0% by mass relative to the sizing agent-coated carbon fibers.

9. Sizing agent-coated carbon fibers comprising:
a sizing agent that includes:
an aliphatic epoxy compound (A) that has three or more epoxy groups and at least one hydroxy group in a molecule, an aromatic epoxy compound (B1) as a type of aromatic compound (B), and
an aromatic ester compound (C1) having no epoxy group in a molecule as a type of aromatic compound (B); and
carbon fibers coated with the sizing agent,
wherein
the sizing agent contains the aliphatic epoxy compound (A) in an amount of 35 to 65% by mass relative to the total amount of the sizing agent exclusive of solvent;
the sizing agent contains the aliphatic epoxy compound (A) and the aromatic epoxy compound (B1) in a mass ratio (A)/(B1) of 52/48 to 80/20;
the sizing agent contains the aromatic ester compound (C1) in an amount of 2 to 35% by mass relative to the total amount of the sizing agent exclusive of solvent;
each of the aliphatic epoxy compound (A) and the aromatic epoxy compound (B1) has a surface tension of 35 to 45 mJ/m$^2$ at 125° C.;
the aromatic ester compound (C1) is a condensate of an unsaturated dibasic acid and an alkylene oxide adduct of a bisphenol; and
the sizing agent-coated carbon fibers have an (a)/(b) ratio of 0.50 to 0.90, wherein (a) is a height (cps) of a component at a binding energy (284.6 eV) assigned to CHx, C—C, and C=C and (b) is a height (cps) of a component at a binding energy (286.1 eV) assigned to C—C in a C$_1$ core spectrum of a surface of the sizing agent applied onto the carbon fibers analyzed by X-ray photoelectron spectroscopy using ALKα$_{1,2}$ as an X-ray source at a photoelectron takeoff angle of 15°.

10. The sizing agent-coated carbon fibers according to claim 1, wherein the aromatic ester compound (C1) is a condensate of maleic acid, sebacic acid, and an ethylene oxide adduct of bisphenol A.

11. The sizing agent-coated carbon fibers according to claim 9, wherein the aromatic ester compound (C1) is a condensate of maleic acid, sebacic acid, and an ethylene oxide adduct of bisphenol A.

12. The sizing agent-coated carbon fibers according to claim 1, wherein the sizing agent coating includes an innermost region adjacent to the carbon fiber and an outermost region away from the carbon fiber, and the aliphatic epoxy compound (A) is present in a larger amount in the innermost region, while the aromatic compound (B1) is present in a larger amount in the outermost region.

13. The sizing agent-coated carbon fibers according to claim 9, wherein the sizing agent coating includes an innermost region adjacent to the carbon fiber and an outermost region away from the carbon fiber, and the aliphatic epoxy compound (A) is present in a larger amount in the innermost region, while the aromatic compound (B1) is present in a larger amount in the outermost region.

14. The sizing agent-coated carbon fibers according to claim 1, wherein the aliphatic epoxy compound (A) and the aromatic epoxy compound (B1) have surface tensions which differ by 3 mJ/m$^2$ at 125° C. or less.

15. The sizing agent-coated carbon fibers according to claim 9, wherein the aliphatic epoxy compound (A) and the aromatic epoxy compound (B1) have surface tensions which differ by 3 mJ/m$^2$ at 125° C. or less.

* * * * *